United States Patent
Takahashi

(10) Patent No.: US 10,917,656 B2
(45) Date of Patent: Feb. 9, 2021

(54) IMAGE PROCESSING DEVICE AND METHOD

(71) Applicant: Sony Corporation, Tokyo (JP)

(72) Inventor: Yoshitomo Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/569,668

(22) Filed: Sep. 13, 2019

(65) Prior Publication Data

US 2020/0007887 A1  Jan. 2, 2020

Related U.S. Application Data

(63) Continuation of application No. 14/422,473, filed as application No. PCT/JP2013/075226 on Sep. 19, 2013, now Pat. No. 10,516,894.

(30) Foreign Application Priority Data

Sep. 28, 2012  (JP) ................................ 2012-218304

(51) Int. Cl.
*H04N 19/513* (2014.01)
*H04N 19/597* (2014.01)
(Continued)

(52) U.S. Cl.
CPC ......... *H04N 19/513* (2014.11); *H04N 19/172* (2014.11); *H04N 19/176* (2014.11);
(Continued)

(58) Field of Classification Search
None
See application file for complete search history.

(56) References Cited

U.S. PATENT DOCUMENTS 9,635,356 B2 * 4/2017 Li ........................... H04N 19/51
2007/0064800 A1    3/2007 Ha
(Continued)

FOREIGN PATENT DOCUMENTS

EP        2700228 A1     2/2014
JP     2010-516158 A     5/2010
(Continued)

OTHER PUBLICATIONS

Gerhard Tech, et al., "3D-HEVC Test Model 1", Joint Collaborative Team on 3D Video Coding Extension Development of ITU-T SG 16 WP 3 and ISO/IEC JTC 1/SC 29/WG 11 [JCT3V-A 1005_d0], Jul. 2012, 83 Pages.
(Continued)

*Primary Examiner* — William C Vaughn, Jr.
*Assistant Examiner* — Joseph Daniel A Towe
(74) *Attorney, Agent, or Firm* — Xsensus LLP

(57) ABSTRACT

An image processing device including a predicted vector generation section configured to generate a predicted vector for use in encoding of a motion vector (MV) of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, an MV encoding section configured to encode the MV of the current block using the predicted vector generated by the predicted vector generation section, and an encoding section configured to generate an encoded stream by encoding the image in units having a hierarchical structure.

12 Claims, 42 Drawing Sheets

(51) Int. Cl.
*H04N 19/58* (2014.01)
*H04N 19/52* (2014.01)
*H04N 19/172* (2014.01)
*H04N 19/176* (2014.01)
*H04N 19/30* (2014.01)
*H04N 19/53* (2014.01)

(52) U.S. Cl.
CPC ............ *H04N 19/30* (2014.11); *H04N 19/52* (2014.11); *H04N 19/53* (2014.11); *H04N 19/58* (2014.11); *H04N 19/597* (2014.11)

(56) References Cited

U.S. PATENT DOCUMENTS

| | | | |
|---|---|---|---|
| 2008/0170618 | A1 | 7/2008 | Choi et al. |
| 2010/0111183 | A1 | 5/2010 | Jeon et al. |
| 2012/0008688 | A1 | 1/2012 | Tsai et al. |
| 2012/0027089 | A1 | 2/2012 | Chien et al. |
| 2012/0224634 | A1* | 9/2012 | Yamori ................ H04N 19/513 375/240.16 |
| 2012/0236941 | A1 | 9/2012 | Lin et al. |
| 2012/0269270 | A1 | 10/2012 | Chen et al. |
| 2012/0269271 | A1 | 10/2012 | Chen et al. |
| 2012/0320981 | A1 | 12/2012 | Shimada et al. |
| 2013/0188719 | A1* | 7/2013 | Chen ................... H04N 19/46 375/240.16 |
| 2013/0265388 | A1 | 10/2013 | Zhang et al. |
| 2013/0272408 | A1 | 10/2013 | Chen et al. |
| 2013/0343459 | A1 | 12/2013 | Bici et al. |
| 2014/0044179 | A1 | 2/2014 | Li et al. |
| 2014/0085415 | A1* | 3/2014 | Bici ..................... H04N 19/597 348/43 |
| 2014/0086327 | A1* | 3/2014 | Ugur ................... H04N 19/52 375/240.16 |

FOREIGN PATENT DOCUMENTS

| | | |
|---|---|---|
| JP | 2010-525724 A | 7/2010 |
| JP | 2012-182616 A | 9/2012 |
| WO | 2012/124121 A1 | 9/2012 |
| WO | 2012/145670 A1 | 10/2012 |

OTHER PUBLICATIONS

Chinese Office Action dated Sep. 27, 2018, issued in Chinese Patent Application No. 201380049112.X.

Combined Chinese Office Action and Search Report dated Aug. 25, 2017 in Patent Application No. 201380049112.X.

Extended European Search Report dated Apr. 21, 2016 in Patent Application No. 13840430.6.

Yoshitomo Takahashi et al., "Descriptions of 3D Video Coding Proposal (HEVC-Compatible Category) by Sony", 98. MPEG Meeting; Geneva; (Motion Picture Expert Group or ISO/IEC JTC1/SC29/WG11), No. M22566, XP030051129, Nov. 22, 2011, 36 pages.

International Search Report dated Dec. 24, 2013 in PCT/JP2013/075226.

Jicheng An, et al., "3D-CE5.h related: Inter-view motion prediction for HEVC-based 3D video coding" Joint Collaborative Team on 3D Video Coding Extension Development of ITU-T SG 16 WP 3 and ISO/IEC JTC 1/SC 29/WG 11 (JCT2-A0049), Jul. 2012, 7 Pages.

Yoshiya Yamamoto, et al., "3D-CE5.h related: Simplification of AMVP" Joint Collaborative Team on 3D Video Coding Extension Development of ITU-T SG 16 WP 3 and ISO/IEC JTC 1/SC 29/WG 11 [JCT2-A0014], Jul. 2012, 3 Pages.

* cited by examiner

FIG. 35

```xml
<?xml version="1.0"?>
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011 DASH-MPD.xsd"
  type="static"
  mediaPresentationDuration="PT02:56S"
  minBufferTime="PT1.2S"
  profiles="urn:mpeg:dash:profile:isoff-on-demand:2011">

<BaseURL>http://cdn1.example.com/</BaseURL>
  <BaseURL>http://cdn2.example.com/</BaseURL>

<Period>
    <!--English Audio-->
    <AdaptationSet mimeType="audio/mp4" codecs="mp4a.0x40" lang="en" subsegmentAlignment="true" subsegmentStartsWithSAP="1">
      <ContentProtection schemeIdUri="urn:uuid:706D9958-6580-5244-4D48-6581645722I"/>
      <Representation id="1" bandwidth="64000">
        <BaseURL>765741234S.mp4</BaseURL>
      </Representation>
      <Representation id="2" bandwidth="32000">
        <BaseURL>34638434348.mp4</BaseURL>
      </Representation>
    </AdaptationSet>
    <!--Video-->
    <AdaptationSet mimeType="video/mp4" codecs="avc1.4d0228" subsegmentAlignment="true" subsegmentStartsWithSAP="2">
      <ContentProtection schemeIdUri="urn:uuid:706D9958-6580-5244-4D48-6581645722I"/>
      <Representation id="5" bandwidth="256000" width="320" height="240"/>
        <BaseURL>866345473.mp4</BaseURL>
      </Representation>
      <Representation id="7" bandwidth="512000" width="320" height="240">
        <BaseURL>5663634.mp4</BaseURL>
      </Representation>
      <Representation id="8" bandwidth="1024000" width="640" height="480">
        <BaseURL>562485736.mp4</BaseURL>
      </Representation>
      <Representation id="9" bandwidth="1384000" width="640" height="480">
        <BaseURL>41325645.mp4</BaseURL>
      </Representation>
      <Representation id="A" bandwidth="1536000" width="1280" height="720">
        <BaseURL>89045625.mp4</BaseURL>
      </Representation>
      <Representation id="B" bandwidth="2048000" width="1280" height="720">
        <BaseURL>283367745734.mp4</BaseURL>
      </Representation>
    </AdaptationSet>
  </Period>
</MPD>
```

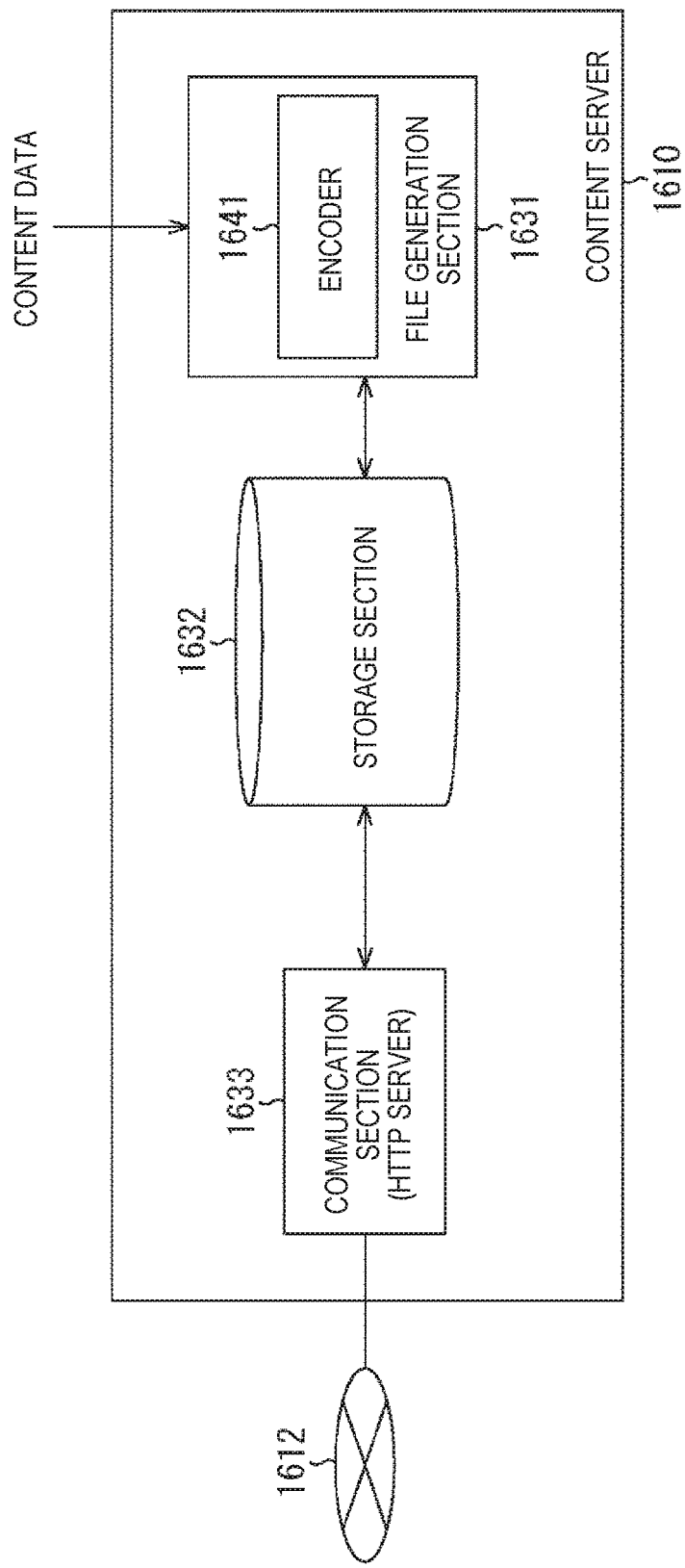

IMAGE PROCESSING DEVICE AND METHOD

CROSS-REFERENCE TO RELATED APPLICATIONS

The present application is a continuation of U.S. application Ser. No. 14/422,473, filed Feb. 19, 2015, which is based on PCT filing PCT/JP2013/075226, filed Sep. 19, 2013, and claims priority to JP 2012-218304, filed Sep. 28, 2012, the entire contents of each are incorporated herein by reference.

TECHNICAL FIELD

The present disclosure relates to an image processing device and method and more particularly to an image processing device and method configured to enable the encoding efficiency of encoding or decoding of a motion vector (MV) in a multi-view image to be improved.

Recently, devices for compressing and encoding an image by adopting an encoding scheme of handling image information digitally and performing compression by an orthogonal transform such as a discrete cosine transform and motion compensation using image information-specific redundancy for the purpose of information transmission and accumulation with high efficiency when the image information is handled digitally have become widespread. Moving Picture Experts Group (MPEG), H.264, MPEG-4 Part 10 (Advanced Video Coding) (hereinafter referred to as H.264/AVC), and the like are examples of such encoding schemes.

Therefore, for the purpose of improving encoding efficiency compared to H.264/AVC, standardization of an encoding scheme referred to as high efficiency video coding (HEVC) by Joint Collaboration Team-Video Coding (JCTVC), which is a joint standardizing organization of International Telecommunication Union Telecommunication Standardization Sector (ITU-T) and International Organization for Standardization (ISO)/International Electrotechnical Commission (IEC), is currently in progress.

In the current draft of HEVC, schemes for improving the encoding performance of a non-base view by changing a coding unit (CU) level as a three-dimensional (3D) extension are being investigated (Non-Patent Literature 1).

As one tool for such a scheme, there is inter-view motion prediction (IVMP) in which encoded vectors of different views serve as candidates for a predicted vector of a non-base view.

CITATION LIST

Non-Patent Literature

Non-Patent Literature 1: Gerhard Tech, Krzysztof Wegner, Ying Chen, Sehoon Yea, "3D-HEVC Test Model Description draft 1," JCT3V-A1005_d0, Joint Collaborative Team on 3D Video Coding Extension Development of ITU-T SG16 WP3 and ISO/IEC JTC1/SC29/WG11 1th Meeting: Stockholm, SE, 16-20 Jul. 2012

SUMMARY OF INVENTION

Technical Problem

However, in IVMP, it is possible to set an MV of a reference prediction unit (PU) as a candidate for a predicted vector of a current PU only when a reference picture order count (POC) of the MV of the current PU is the same as a reference POC of an MV of a reference PU of a view different from a current view.

The present disclosure has been made in view of the above circumstances, and enables the encoding efficiency of encoding or decoding of an MV in a non-base view to be improved.

Solution to Problem

An image processing device according to a first aspect of the present disclosure includes a predicted vector generation section configured to generate a predicted vector for use in encoding of a motion vector (MV) of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, an MV encoding section configured to encode the MV of the current block using the predicted vector generated by the predicted vector generation section, and an encoding section configured to generate an encoded stream by encoding the image in units having a hierarchical structure.

The predicted vector generation section may generate the predicted vector by scaling the MV of the reference block according to a reference image picture order count (POC) of the current block and a reference image POC of the reference block and employing the scaled MV as a candidate for the predicted vector.

A transmission section configured to transmit the MV of the current block encoded by the MV encoding section and the encoded stream generated by the encoding section may be further included.

A first image processing method according to the present disclosure includes generating, by an image processing device, a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, encoding, by the image processing device, the MV of the current block using the generated predicted vector, and generating, by the image processing device, an encoded stream by encoding the image in units having a hierarchical structure.

A second image processing device according to the present disclosure includes a predicted vector generation section configured to generate a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, an MV decoding section configured to decode the MV of the current block using the predicted vector generated by the predicted vector generation section, and a decoding section configured to generate an image by decoding an encoded stream encoded in units having a hierarchical structure.

The predicted vector generation section may generate the predicted vector by scaling the MV of the reference block according to a reference image POC of the current block and a reference image POC of the reference block and employing the scaled MV as a candidate for the predicted vector.

A reception section configured to receive the encoded stream and the encoded MV of the current block may be further included.

An image processing method according to a second aspect of the present disclosure includes generating, by an image processing device, a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, decoding, by the image processing device, the MV of the current block using the generated predicted vector, and generating, by the image processing device, an image by decoding an encoded stream encoded in units having a hierarchical structure.

In the first aspect of the present disclosure, a predicted vector for use in encoding of an MV of a current block is generated by scaling the MV of a reference block, which is a block of a position shifted from a position of the current block in an image of a different view, by a disparity obtained from a periphery of the current block in an image of a non-base view according to a reference destination of the current block and a reference destination of the reference block. Therefore, the MV of the current block is encoded using the generated predicted vector, and an encoded stream is generated by encoding the image in units having a hierarchical structure.

In the second aspect of the present disclosure, a predicted vector is generated for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block.

Also, the above-described image processing device may be an independent device or an inner block constituting one image encoding device or image decoding device.

Advantageous Effects of Invention

According to the first aspect of the present disclosure, it is possible to encode an image. In particular, it is possible to improve the encoding efficiency of encoding or decoding of an MV in a multi-view image.

According to the second aspect of the present disclosure, it is possible to decode an image. In particular, it is possible to improve the encoding efficiency of encoding or decoding of an MV in a multi-view image.

BRIEF DESCRIPTION OF DRAWINGS

FIG. 35 is an explanatory diagram illustrating a specific example of media presentation description (MPD).

FIG. 36 is a functional block diagram illustrating a configuration of a content server of the content reproduction system.

DESCRIPTION OF EMBODIMENTS

Hereinafter, modes (hereinafter referred to as embodiments) for carrying out the present disclosure will be described. Also, the description will be given in the following order.

1. Outlines of conventional technology and present technology
2. First embodiment (multi-view image encoding device)
3. Second embodiment (multi-view image decoding device)
4. Third embodiment (computer)
5. Application example
6. Application example of scalable encoding
7. Sixth embodiment (set/unit/module/processor)
8. Application example of content reproduction system of MPEG-dynamic adaptive streaming over hypertext transfer protocol (HTTP) (DASH)
9. Application example of wireless communication system of wireless fidelity (Wi-Fi) standard

1. Outlines of Conventional Technology and Present Technology

[Description of Conventional Technology]

As one scheme of improving the encoding performance of a non-base view, there is IVMP in which an encoded vector of a different view serves as a candidate for a predicted vector of the non-base view.

IVMP will be described with reference to FIG. 1. In an example of FIG. 1, the vertical axis represents a view, a view V0 represents a base view and a view V1 represents a non-base view. The horizontal axis represents times T1 to T4.

The base view V0 is already encoded. Then, motion prediction and compensation of a current PU (Curr PU) of an image of time T3 of the non-base view V1 are performed and MVs of directions L0 and L1 are obtained. At this time, a POC of an image of time T1 of the same view V1 is Ref 1 (Ref POC=1), a POC of an image of time T2 is Ref 0 (Ref POC=0), and a POC of an image of time T4 is Ref 0 (Ref POC=0).

An MV of the direction L0 of the obtained current PU indicates an image of Ref 0 (Ref POC=0) of time T2, and an MV of the direction L1 indicates an image of Ref 0 (Ref POC=0) of time T4.

In IVMP, it is possible to add the MV of the current PU to an MV encoded in the base view, in addition to an MV serving as a candidate in the conventional AMVP, as a candidate for a predicted vector obtained at the time of encoding.

That is, because there is a correlation in motion in the base view V0 and the non-base view V1, each of MVs $MV_{L0}$ and $MV_{L1}$ of a reference PU (Cor PU) in the base view V0 of the same time for the current PU in the non-base view V1 can serve as one candidate for the predicted vector. Here, the reference PU of the base view V0 refers to a PU of a position shifted by a disparity vector from the same position as that of a PU in an image of the non-base view after the disparity vector is found from among MVs of PUs around a current PU (that is, neighboring PUs that neighbor the current PU).

Figure 1:
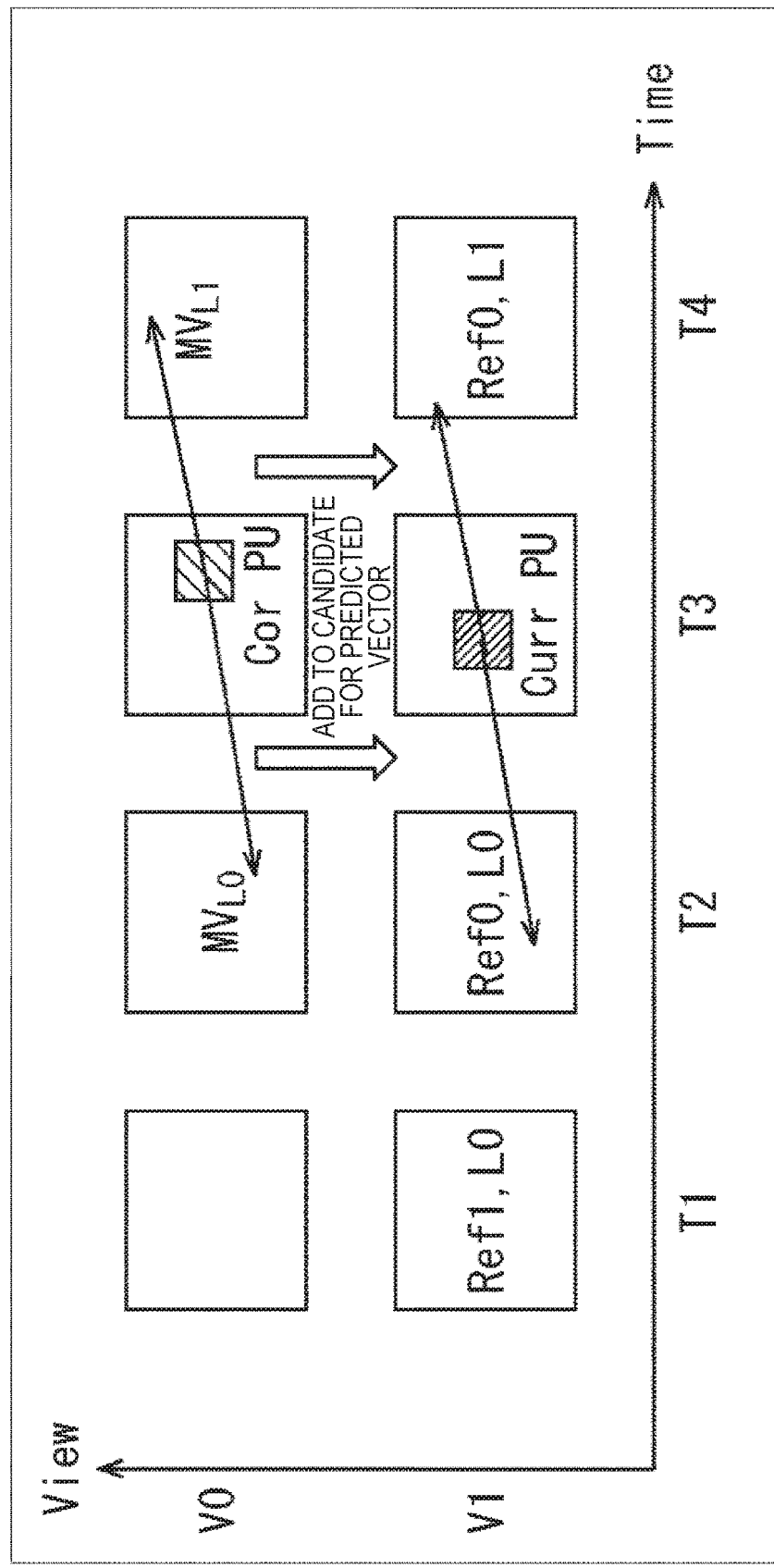
FIG. 1 is a diagram illustrating an IVMP as conventional technology.

However, as illustrated in FIG. 1, this is only the case in which times T2 and T4 of an image in which MVs $MV_{L0}$ and $MV_{L1}$ of the reference PU in the base view V0 are referred to are the same as times T2 and T4 of an image in which an MV of the current PU in the non-base view V1 is referred to.

That is, it is possible to designate the MV of the reference PU as a candidate for a predicted MV of the current PU only when a Ref POC (Ref 0) of the current PU is the same as a Ref POC (Ref 0) of the reference PU.

Figure 2:
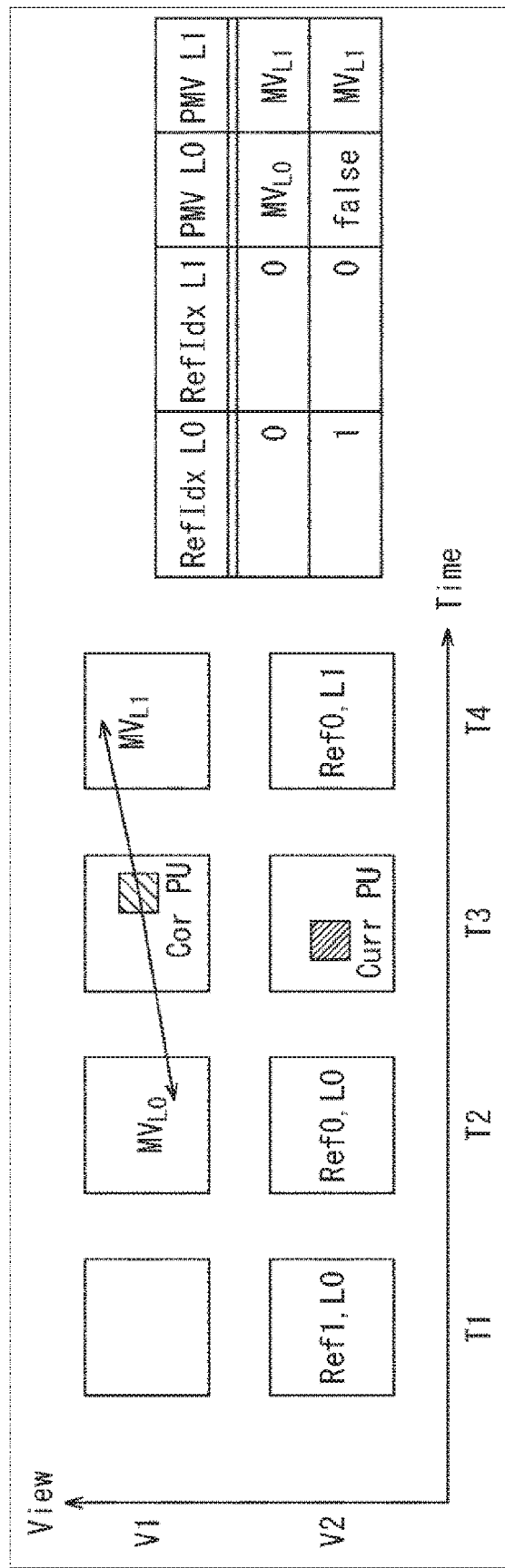
FIG. 2 is a diagram illustrating an IVMP as conventional technology.

Accordingly, as illustrated in FIG. 2, the case in which each of ReFIdx L0 and ReFIdx L1 of MVs $MV_{L0}$ and $MV_{L1}$ of the reference PU of time T3 in the base view V0 is 0 is considered.

In this case, when ReFIdx L0 of the MV of the current PU of time T3 of the non-base view V1 is 1 and ReFIdx L1 is 0, a Ref POC of a predicted vector PMV L1 of the current PU is the same as that of the MV $MV_{L1}$ of the reference PU. Therefore, the MV $MV_{L1}$ of the reference PU of time T3 in the base view V0 can be used as a candidate for the predicted vector of the current PU.

However, because a Ref POC of the predicted vector PMV L0 of the current PU is different from that of the MV $MV_{L0}$ of the reference PU, the MV $MV_{L0}$ of the reference PU is unavailable (false) and the MV $MV_{L0}$ of the reference PU is not designated as the predicted vector. That is, there is a correlation between a view and a non-base view as described above, but encoding efficiency is degraded because it is difficult to generate a predicted vector having a high correlation.

Therefore, in the present technology, the MV of the reference PU is scaled and the scaled MV serves as a candidate for the predicted vector of the current PU when the Ref POC (Ref 0) of the current PU is different from the Ref POC (Ref 0) of the reference PU in a different view.

Figure 3:
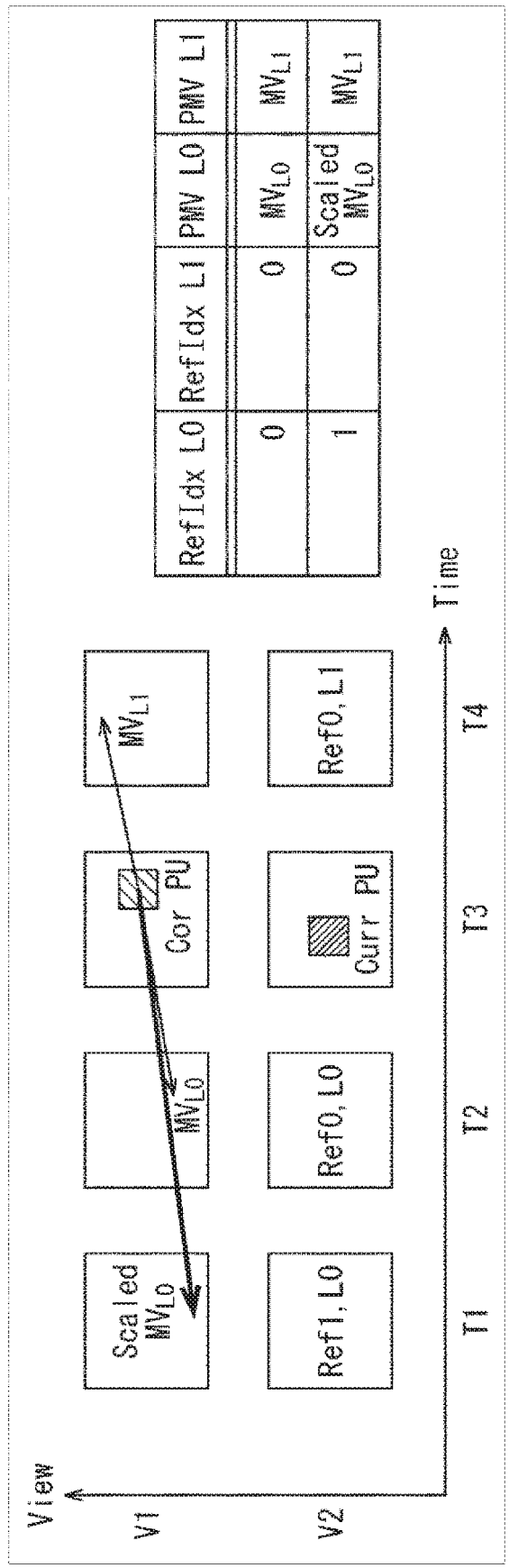
FIG. 3 is a diagram illustrating an outline of the present technology.

For example, in the example of FIG. 3, as in the example of FIG. 2, a Ref POC of the predicted vector PMV L0 of the current PU is different from that of the MV $MV_{L0}$ of the reference PU. Therefore, in the present technology, the MV $MV_{L0}$ of the reference PU is scaled according to reference destinations of the current PU and the reference PU. That is, the MV $MV_{L0}$ of the reference PU is scaled according to a distance between the Ref POCs of the current PU and the reference PU, and the scaled $MV_{L0}$ is used as a candidate for the predicted vector of the current PU.

Thereby, it is possible to improve the encoding efficiency of an MV because a predicted vector having a high correlation can be generated.

That is, because camera characteristics are slightly different in different views, pictures to be referred to may be different even for MVs of the same object. In this case, there is a significant effect in the improvement of encoding efficiency because MVs having a high correlation can be scaled and used without making the MVs unavailable.

2. First Embodiment

[Configuration Example of Multi-View Image Encoding Device]

Figure 4:
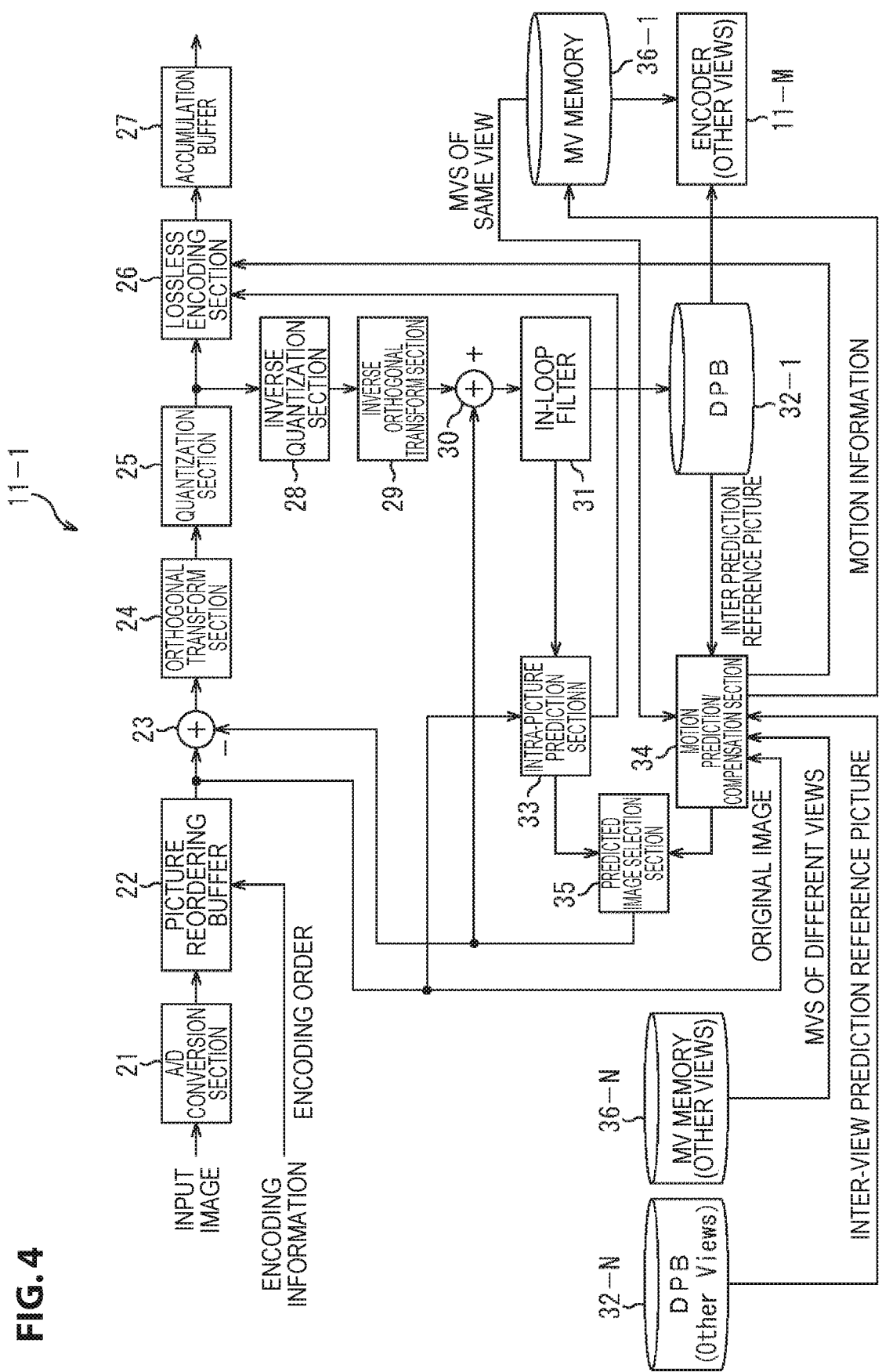
FIG. 4 is a block diagram illustrating a main configuration example of an encoder constituting a multi-view image encoding device to which the present technology is applied.

FIG. 4 illustrates a configuration of an embodiment of an encoder constituting the multi-view image encoding device as an image processing device to which the present disclosure is applied.

The multi-view image encoding device, for example, includes encoders 11-1 to 11-M for encoding multi-view images.

The encoder 11-1 encodes an image such as a captured multi-view image in an HEVC scheme. For example, a color image of a non-base view of a frame unit is input as an input image to the encoder 11-1, and the encoder 11-1 encodes the color image of the non-base view.

For example, encoders 11-M and 11-N for encoding color images of other views (including a base view) of frame units are also configured like the encoder 11-1. In addition, when there is also an encoder for encoding chroma information image as well as the color image, the encoder is configured like the encoder 11-1.

The encoder 11-1 is configured to include an analog/digital (A/D) conversion section 21, a picture reordering buffer 22, a calculation section 23, an orthogonal transform section 24, a quantization section 25, a lossless encoding section 26, an accumulation buffer 27, an inverse quantization section 28, an inverse orthogonal transform section 29, and a calculation section 30. In addition, the encoder 11-1 is configured to include an in-loop filter 31, a decoded picture buffer (DPB) 32-1, an intra-picture prediction section 33, a motion prediction/compensation section 34, a predicted image selection section 35, and an MV memory 36-1.

A picture of the color image of the non-base view that is an image (moving image) to be encoded is sequentially supplied to the A/D conversion section 21 in the display order.

When the picture supplied to the A/D conversion section 21 is an analog signal, the A/D conversion section 22 converts the analog signal according to A/D conversion and supplies the converted analog signal to the picture reordering buffer 112.

For example, the encoding order is supplied to the picture reordering buffer 22 as encoding information from a previous-stage syntax encoding section (not illustrated) or the like. The picture reordering buffer 22 temporarily stores a picture from the A/D conversion section 21 and reads a picture according to a structure of a group of pictures (GOP) indicated by the supplied encoding order, so that a process of reordering a picture sequence from the display order to the encoding order (decoding order) is performed.

The picture read from the picture reordering buffer 22 is supplied to the calculation section 23, the intra-picture prediction section 33, and the motion prediction/compensation section 34.

In addition to the supply of a picture from the picture reordering buffer 22, a predicted image generated by the intra-picture prediction section 33 or the motion prediction/compensation section 34 from the predicted image selection section 35 is supplied to the calculation section 23.

The calculation section 23 designates the picture read from the picture reordering buffer 22 as a target picture which is a picture to be encoded and sequentially designates a macro block (largest coding unit (LCU)) constituting the target picture as the target block to be encoded.

Then, the calculation section 23 performs prediction encoding after calculating a subtraction value by subtracting a pixel value of the predicted image supplied from the predicted image selection section 35 from the pixel value of the target block if necessary, and supplies a prediction encoding result to the orthogonal transform section 24.

The orthogonal transform section 24 performs an orthogonal transform such as a discrete cosine transform or a Karhunen-Loeve transform, using TU as a unit, on (a residual obtained by subtracting the predicted image or a pixel value of) a target block from the calculation section 23, and supplies a transform coefficient obtained as a result thereof to the quantization section 115.

The quantization section 25 quantizes the transform coefficient supplied from the orthogonal transform section 24 and supplies a quantization value obtained as a result thereof to the lossless encoding section 26.

The lossless encoding section 26 performs lossless encoding such as variable length encoding (for example, context-adaptive variable length coding (CAVLC) or the like) or arithmetic encoding (for example, context-adaptive binary arithmetic coding (CABAC) or the like) on a quantization value from the quantization section 25, and supplies encoded data obtained as a result thereof to the accumulation buffer 27.

Also, in addition to the supply of a quantization value from the quantization section 25, header information included in a header of encoded data from the intra-picture prediction section 33 or the motion prediction/compensation section 34 is supplied to the lossless encoding section 26.

The lossless encoding section 26 encodes the header information from the intra-picture prediction section 33 or the motion prediction/compensation section 34 and includes the encoded header information in the header of the encoded data.

The accumulation buffer 27 temporarily stores the encoded data from the lossless encoding section 26 and outputs the stored encoded data at a predetermined data rate. Also, the accumulation buffer 27 functions as a transmission section.

The encoded data output from the accumulation buffer 27 is multiplexed with encoded data of another view encoded by the other encoder 11-M or the like and the multiplexed encoded data is transmitted to the multi-view image decoding device as will be described later.

The quantization value obtained by the quantization section 25 is supplied to the inverse quantization section 28 as well as the lossless encoding section 26, and local decoding is performed in the inverse quantization section 28, the inverse orthogonal transform section 29, and the calculation section 30.

That is, the inverse quantization section 28 inversely quantizes the quantization value from the quantization section 25 into a transform coefficient and supplies the transform coefficient to the inverse orthogonal transform section 29.

The inverse orthogonal transform section 29 performs an inverse orthogonal transform on the transform coefficient from the inverse quantization section 28 and supplies the transformed transform coefficient to the calculation section 30.

The calculation section 30 obtains a decoded image in which a target block is decoded (locally decoded) by adding the pixel value of the predicted image supplied from the predicted image selection section 35 to the data supplied from the inverse orthogonal transform section 29 if necessary, and supplies the obtained decoded image to the in-loop filter 31.

The in-loop filter 31, for example, is constituted of a deblocking filter. Also, for example, when the HEVC scheme is adopted, the in-loop filter 31 is constituted of a deblocking filter and an adaptive offset filter (sample adaptive offset (SAO)). The in-loop filter 31 removes (reduces) block distortion occurring in the decoded image by filtering the decoded image from the calculation section 30, and supplies the decoded image after the distortion removal (reduction) to the DPB 32-1. Further, the in-loop filter 31 supplies decoded image that has not yet been filtered to the intra-picture prediction section 33.

Here, the DPB 32-1 stores a decoded image from the in-loop filter 31, that is, a picture of a color image of a non-base view encoded in the encoder 11-1 and locally decoded, as (a candidate for) a reference picture to be referred to when a predicted image to be used in prediction encoding (encoding in which subtraction of a predicted image is performed by the calculation section 23) to be performed at a later time is generated. Also, the DPB 32-1 is shared by the encoder 11-M of the other view.

Also, the local decoding by the inverse quantization section 28, the inverse orthogonal transform section 29, and the calculation section 30, for example, is performed by targeting I- and P-pictures which are referable pictures capable of serving as reference pictures. In the DPB 32-1, decoded images of the I- and P-pictures are stored.

The intra-picture prediction section 33 and the motion prediction/compensation section 34 perform a prediction process in units of PUs as a target block.

When the target block is an I-picture, a P-picture, or a B-picture (including Bs-pictures) obtained by intra prediction (intra-picture prediction), the intra-picture prediction section 33 reads an already decoded portion (decoded image) from a target block from the in-loop filter 31. Then, the intra-picture prediction section 33 designates part of the decoded image of the target picture read from the in-loop filter 31 as the predicted image of the target block of the target picture supplied from the picture reordering buffer 22.

Further, the intra-picture prediction section 33 obtains an encoding cost required to encode the target block using the predicted image, that is, an encoding cost required to encode a residual or the like for the predicted image in the target block, and supplies the obtained encoding cost to the predicted image selection section 35 along with the predicted image.

The motion prediction/compensation section 34 performs a vector prediction process of the AMVP mode and a vector prediction process of an M/S mode (merge/skip mode) when a target picture is a predicted (P)-picture or a bi-directionally predicted (B)-picture obtained by inter prediction.

The motion prediction/compensation section 34 reads one or more pictures encoded before the target picture and locally decoded from the DPB 32-1 as candidate pictures (candidates for an inter prediction reference picture).

In addition, the motion prediction/compensation section 34 reads one or more pictures encoded before the target picture and locally decoded from the DPB 32-N provided in an encoder (for example, the encoder 11-N) of a different view as candidate pictures (candidates for the inter-view prediction reference picture).

Also, the DPB 32-N stores a picture of a color image of the different view encoded in the encoder 11-N and locally decoded as (a candidate for) a reference picture to be referred to when the predicted image for use in prediction encoding to be performed at a later time is generated.

The motion prediction/compensation section 34 detects a shift vector (MV) representing the motion serving as a shift between a target block and a corresponding block (a block having a smallest sum of absolute differences (SAD) from the target block) of the candidate picture corresponding to the target block by motion estimation (ME) (motion detection) using a target block of a target picture from the picture reordering buffer 22 and the candidate picture in the case of the AMVP mode. At this time, there are an inter-MV representing a temporal shift and an inter-view MV representing an inter-view shift as the detected MV.

The motion prediction/compensation section 34 generates a predicted image by performing motion compensation for compensating for a shift of a motion amount of a candidate picture from the DPB 32-1 or 32-N according to the MV of the target block.

That is, the motion prediction/compensation section 34 acquires a corresponding block that is a block (region) of a position moved (shifted) according to the MV of the target block from the position of the target block in the candidate picture as a predicted image.

In addition, the motion prediction/compensation section 34 designates the MV as a candidate for the predicted vector for encoding using spatially neighboring blocks adjacent thereto in the same picture. The motion prediction/compensation section 34 reads MVs of corresponding blocks associated by MVs in pictures of different times of the same view from the MV memory 36-1 and designates the read MVs as candidates for the predicted vector. The motion prediction/compensation section 34 reads MVs of reference blocks in different views of the same time from the MV memory 36-N in which the MVs of the different views are stored, and designates the read MVs as the candidates for the predicted vector.

Also, here, the reference block (Cor PU of FIG. 1) in the different view is a block of a position shifted by a disparity vector from the same position as that of the target block in the image of the different view after the disparity vector is found from among MVs of neighboring blocks adjacent to a periphery of the target block (Curr PU of FIG. 1).

On the other hand, the motion prediction/compensation section 34 designates a candidate for the MV using spatially neighboring blocks adjacent thereto in the same picture in the case of the M/S mode. The motion prediction/compensation section 34 reads MVs of corresponding blocks associated by MVs in pictures of different times of the same view from the MV memory 36-1 and designates the read MVs as the candidates for the MV. The motion prediction/compensation section 34 reads MVs of reference blocks in different views of the same time from the MV memory 36-N in which the MVs of the different views are stored, and designates the read MVs as the candidates for the MV. The motion prediction/compensation section 34 generates candidate pictures using the candidates for the MV.

Then, the motion prediction/compensation section 34 obtains an encoding cost required to encode a target block using a predicted image for every candidate picture for use in generation of a predicted image, every candidate for an MV, every candidate for a predicted vector, every inter prediction mode (including an inter-view prediction mode) with a variable block size, or every M/S mode.

The motion prediction/compensation section 34 supplies a predicted image and an encoding cost obtained in an optimum inter prediction mode to the predicted image selection section 35 by designating an inter prediction mode or an inter-view prediction mode having a lowest encoding cost as the optimum inter prediction mode which is an optimal inter prediction mode.

The motion prediction/compensation section 34 obtains a difference from the MV by designating a candidate for the predicted vector in the optimum inter prediction mode as a predicted vector, and supplies the obtained difference as MV information to the lossless encoding section 26 along with an index of the predicted vector. In addition, the motion prediction/compensation section 34 stores the MV at the time of the optimum inter prediction mode in the MV memory 36-1.

The predicted image selection section 35 selects one having a lower encoding cost from predicted images from the intra-picture prediction section 33 and the motion prediction/compensation section 34, and supplies the selected predicted image to the calculation sections 23 and 30.

Here, the intra-picture prediction section 33 supplies information about intra prediction as header information to the lossless encoding section 26. The motion prediction/compensation section 34 supplies information about inter prediction (information of the MV or the like) as the header information to the lossless encoding section 26.

The lossless encoding section 26 selects the header information from one generating a predicted image having a lower encoding cost in the header information from the intra-picture prediction section 33 and the motion prediction/compensation section 34, and includes the selected header information in the header of the encoded data.

The MV memory 36-1 stores an MV determined in the motion prediction/compensation section 34 as (a candidate for) the MV to be referred to when the predicted vector for encoding the MV to be executed at a later time is generated. Also, the MV memory 36-1 is shared by the encoder 11-M of the other view.

Also, the MV memory 36-N is provided in the encoder 11-N having the different view, and stores the MV determined in the encoder 11-N as (the candidate for) the MV to be referred to when the predicted vector for encoding the MV to be executed at a later time is generated. The MV memory 36-N is shared by the motion prediction/compensation section 34 or the encoder 11-M of the other view.

[Configuration of Motion Prediction/Compensation Section]

Figure 5:
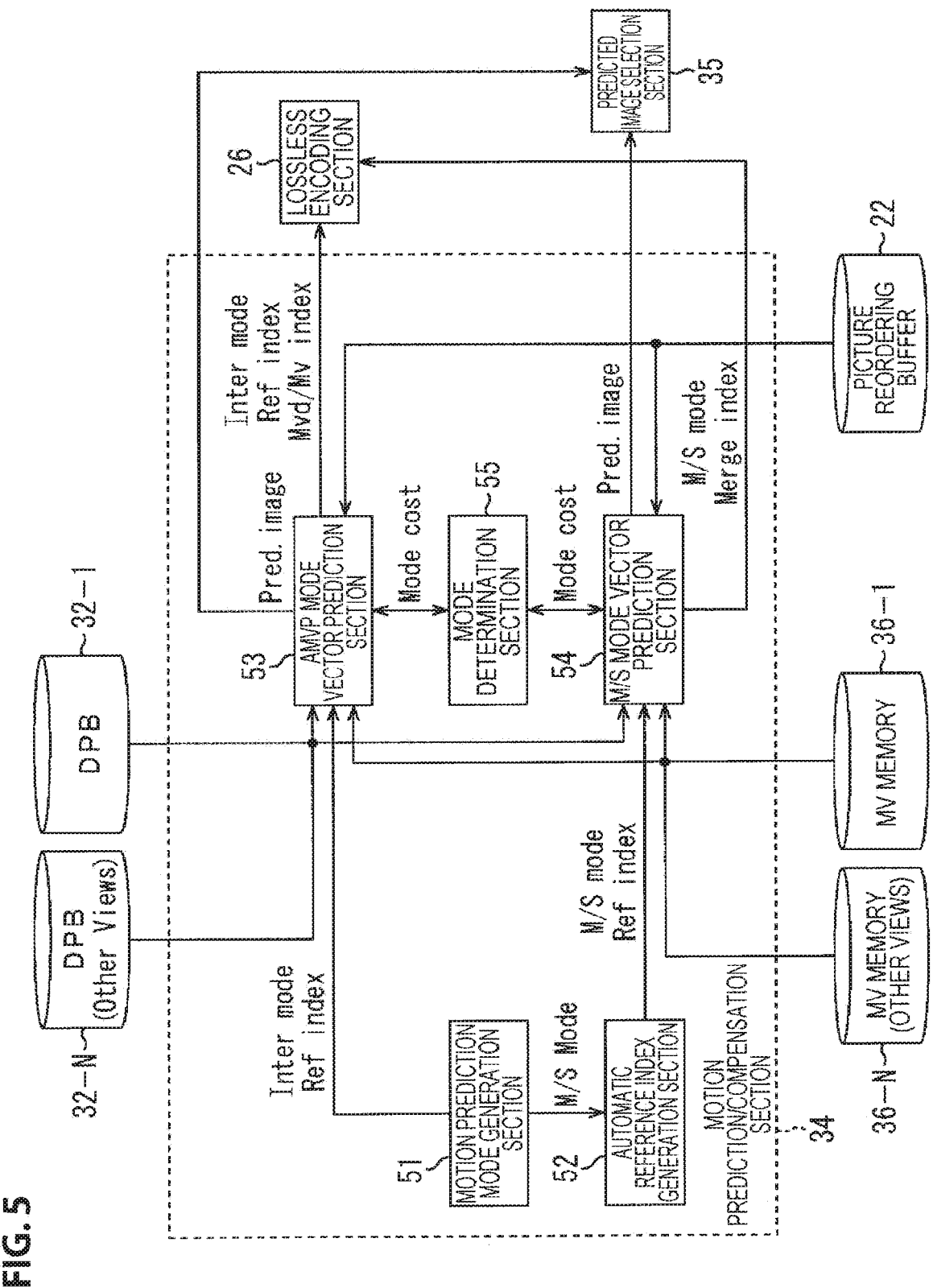
FIG. 5 is a block diagram illustrating a configuration example of a motion prediction/compensation section.

FIG. 5 is a block diagram illustrating a configuration example of the motion prediction/compensation section of FIG. 4.

In the example of FIG. 5, the motion prediction/compensation section 34 is configured to include a motion prediction mode generation section 51, an automatic reference index generation section 52, an AMVP mode vector prediction section 53, an M/S mode vector prediction section 54, and a mode determination section 55.

The motion prediction mode generation section 51 generates motion prediction modes such as an inter prediction mode, a merge mode, and a skip mode. The motion prediction mode generation section 51 supplies information indicating the inter prediction mode and a reference image index (Ref index) to the AMVP mode vector prediction section 53. The motion prediction mode generation section 51 supplies the merge mode or the skip mode (M/S mode) to the automatic reference index generation section 52.

The automatic reference index generation section 52 automatically generates a reference image index, and supplies the generated reference image index (Ref index) to the M/S mode vector prediction section 54 along with the merge mode or the skip mode from the motion prediction mode generation section 51.

The AMVP mode vector prediction section 53 reads one or more pictures encoded before a target picture and locally decoded from the DPB 32-1 or 32-N according to the prediction mode from the motion prediction mode generation section 51 and the reference image index as the candidate pictures.

The AMVP mode vector prediction section 53 detects an MV representing motion serving as a shift between a target block and a corresponding block corresponding to the target block in a candidate picture by motion detection using the target block of a target picture from the picture reordering buffer 22 and the candidate picture. The AMVP mode vector prediction section 53 generates a predicted image by performing motion compensation for compensating for a shift of a motion amount of the candidate picture from the DPB 32-1 or 32-N according to the MV of the target block.

The AMVP mode vector prediction section 53 designates the MV as a candidate for the predicted vector for encoding using spatially neighboring blocks adjacent thereto in the same picture. The motion prediction/compensation section 34 reads MVs of temporally neighboring blocks corresponding or adjacent thereto in pictures of different times of the same view from the MV memory 36-1 and designates the read MVs as candidates for the predicted vector. The AMVP mode vector prediction section 53 reads MVs of reference blocks in different views of the same time from the MV memory 36-N in which the MVs of the different views are stored, and designates the read MVs as the candidates for the predicted vector.

The AMVP mode vector prediction section 53 obtains an encoding cost required to encode a target block using a predicted image for every candidate picture for use in generation of a predicted image, every candidate for an MV, every candidate for a predicted vector, or every inter prediction mode with a variable block size based on an original image from the picture reordering buffer 22. The AMVP mode vector prediction section 53 supplies an optimal encoding cost among obtained encoding costs as a mode cost to the mode determination section 55. At this time, the AMVP mode vector prediction section 53 designates a candidate for the predicted vector at the time of the optimal encoding cost as a predicted vector, obtains a difference from the MV, and encodes the MV difference Mvd and an index (Mv index) of the predicted vector as MV information.

The M/S mode vector prediction section 54 reads one or more pictures encoded before a target picture and locally decoded from the DPB 32-1 or 32-N according to the mode and the reference image index from the automatic reference index generation section 52 as the candidate pictures.

In addition, the M/S mode vector prediction section 54 designates a candidate for an MV using spatially neighboring blocks adjacent thereto in the same picture. The M/S mode vector prediction section 54 reads MVs of temporally neighboring blocks corresponding or adjacent thereto in pictures of different times of the same view from the MV memory 36-1 and designates the read MVs as candidates for the predicted vector. The M/S mode vector prediction section 54 reads MVs of reference blocks in different views of the same time from the MV memory 36-N in which the MVs of the different views are stored, and designates the read MVs as the candidates for the MV. The M/S mode vector prediction section 54 generates a candidate picture using the candidates for the MV.

The M/S mode vector prediction section 54 obtains an encoding cost required to encode a target block using a predicted image for every candidate picture for use in generation of a predicted image, every candidate for an MV, or every M/S mode based on an original image from the picture reordering buffer 22. The M/S mode vector prediction section 54 supplies an optimal encoding cost among the obtained encoding costs as a mode cost to the mode determination section 55. In addition, the M/S mode vector prediction section 54 encodes a merge index indicating an MV as MV information.

The mode determination section 55 refers to encoding costs from the AMVP mode vector prediction section 53 and the M/S mode vector prediction section 54 and determines the inter prediction mode or the inter-view prediction mode having a lowest encoding cost as an optimum prediction mode which is an optimal motion prediction mode. The mode determination section 55 returns an optimum prediction mode determination result to the AMVP mode vector prediction section 53 and the M/S mode vector prediction section 54.

The AMVP mode vector prediction section 53 supplies the predicted image (pred. image) and the encoding cost obtained in the optimum prediction mode to the predicted image selection section 35 based on the determination result from the mode determination section 55. The AMVP mode vector prediction section 53 supplies the inter prediction mode (inter mode) determined as the optimum prediction mode, a reference image index (Ref index), and the encoded MV information to the lossless encoding section 26.

The M/S mode vector prediction section 54 supplies the predicted image (pred. image) and the encoding cost obtained in the optimum prediction mode to the predicted image selection section 35 based on the determination result from the mode determination section 55. In addition, the M/S mode vector prediction section 54 supplies the prediction mode (M/S mode) determined as the optimum prediction mode and the encoded MV information to the lossless encoding section 26. At this time, the information of the MV of the optimum encoding cost is temporarily saved in (overwritten on) the spatial MV memory of FIG. 6 as will be described later.

[Configuration of AMVP Mode Vector Prediction Section]

Figure 6:
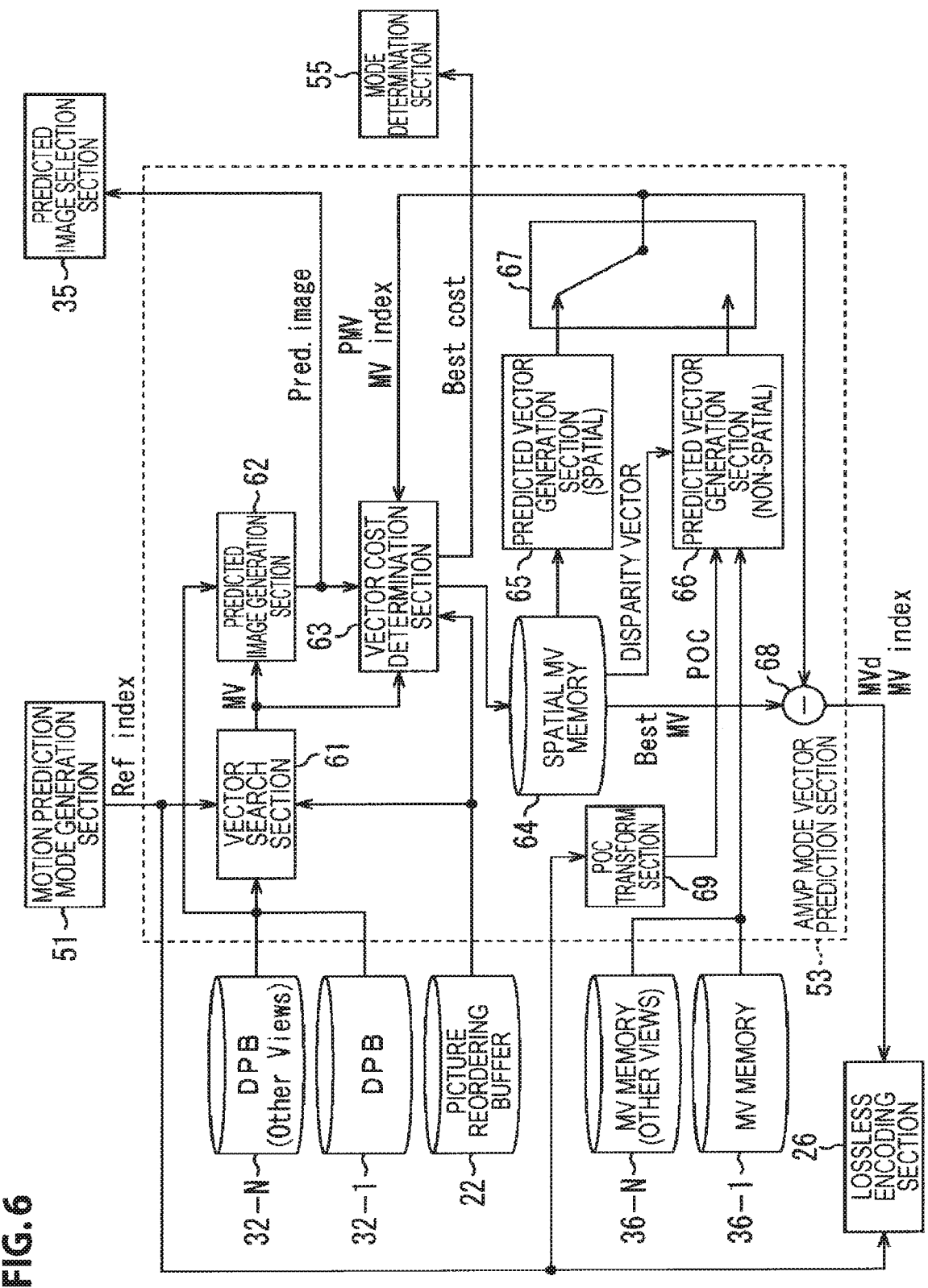
FIG. 6 is a block diagram illustrating a configuration example of an advanced MV prediction (AMVP) mode vector prediction section.

FIG. 6 is a block diagram illustrating a configuration example of the AMVP mode vector prediction section of FIG. 5.

In the example of FIG. 6, the AMVP mode vector prediction section 53 is configured to include a vector search section 61, a predicted image generation section 62, a vector cost determination section 63, a spatial MV memory 64, predicted vector generation sections 65 and 66, a switch 67, a subtraction section 68, and a POC transform section 69.

The reference image index from the motion prediction mode generation section 51 is supplied to the vector search section 61, the POC transform section 69, and the lossless encoding section 26. In addition, the prediction mode from the motion prediction mode generation section 51 is also supplied to the vector search section 61.

The vector search section 61 reads one or more pictures encoded before a target picture and locally decoded from the DPB 32-1 or 32-N according to the prediction mode and the reference image index from the motion prediction mode generation section 51 as the candidate pictures. The vector search section 61 detects an MV representing motion serving as a shift between a target block and a corresponding block corresponding to the target block in a candidate picture by motion detection using a target block of a target picture from the picture reordering buffer 22 and a candidate picture. The vector search section 61 supplies the detected MV to the predicted image generation section 62 and the vector cost determination section 63.

The predicted image generation section 62 generates a predicted image by performing motion compensation for compensating for a shift of a motion amount of the candidate picture from the DPB 32-1 or 32-N according to the MV of the target block from the vector search section 61. The generated predicted image is supplied to the predicted image selection section 35 and the vector cost determination section 63.

The vector cost determination section 63 obtains an encoding cost using an original image from the picture reordering buffer 22, an MV from the vector search section 61, a predicted image from the predicted image generation section 62, and predicted vectors and their MV indices from the predicted vector generation sections 65 and 66. Then, the vector cost determination section 63 determines a lowest encoding cost and supplies the lowest encoding cost (best cost) and its prediction mode to the mode determination section 55. The vector cost determination section 63 temporarily saves the MV of the lowest encoding cost in the spatial MV memory 64.

The spatial MV memory 64 stores the MV of the lowest encoding cost as the candidate for use in generation of the predicted vector to be performed at a later time. In the spatial MV memory 64, the MV is stored in each unit (PU) of a block in which the MV is obtained. Also, when the encoding cost of the M/S mode is optimum, the MV of the spatial MV memory 64 is overwritten on the MV of the case of the M/S mode.

In addition, when the MV of the lowest encoding cost is supplied by the vector cost determination section 63, the spatial MV memory 64 supplies the MV as the best MV to the subtraction section 68.

The predicted vector generation section 65 generates a spatially predicted vector by reading MVs of spatially neighboring blocks adjacent thereto in the same picture. The predicted vector generation section 65 supplies the generated spatially predicted vector to the vector cost determination section 63 and the subtraction section 68 via the switch 67 along with the MV index indicating the predicted vector.

The predicted vector generation section 66 generates a predicted vector by temporal moving vector prediction (TMVP). That is, the predicted vector generation section 66 generates the predicted vector by reading MVs of temporally neighboring blocks corresponding or adjacent thereto in pictures of different times of the same view from the MV memory 36-1. Also, at this time, based on POC information from the POC transform section 69, scaling is performed when the reference POC (Ref POC) of the target block is different from a reference POC (Ref POC) of a temporally neighboring block. That is, the scaled MV serves as the predicted vector. The predicted vector generation section 66 supplies the generated temporally predicted vector to the vector cost determination section 63 and the subtraction section 68 via the switch 67 along with an MV index indicating the predicted vector.

In addition, the predicted vector generation section 66 generates a predicted vector by inter-view prediction (IVMP). The predicted vector generation section 66 finds a disparity vector from MVs of neighboring blocks adjacent to the target block from the spatial MV memory 64 and obtains reference blocks in different views of the same time based on the found disparity vector. Then, the predicted vector generation section 66 generates a predicted vector by reading MVs of reference blocks in different views of the same time from the MV memory 36-N in which MVs of the different views are stored.

Also, at this time, scaling is performed when the reference POC (Ref POC) of the target block is different from a reference POC (Ref POC) of a reference block. That is, the scaled MV serves as the predicted vector. The predicted vector generation section 66 supplies the generated inter-view predicted vector to the vector cost determination section 63 and the subtraction section 68 via the switch 67 along with an MV index indicating the predicted vector.

The switch 67 selects the predicted vector from the predicted vector generation section 65 or the predicted vector from the predicted vector generation section 66, and supplies the selected predicted vector and its MV index to the vector cost determination section 63 and the subtraction section 68.

The subtraction section 68 encodes a difference MVd between the MV (best MV) having the lowest cost from the spatial MV memory 64 and the predicted vector from the switch 67 as MV information along with an MV index representing an index of the predicted vector. The subtraction section 68 supplies the encoded MV information to the lossless encoding section 26.

The POC transform section 69 transforms a reference image index (Ref index) of the target block from the motion prediction mode generation section 51 into a POC and supplies POC information indicating the POC obtained by the transform to the predicted vector generation section 66.

[Configuration Example of Non-Spatially Predicted Vector Generation Section]

Figure 7:
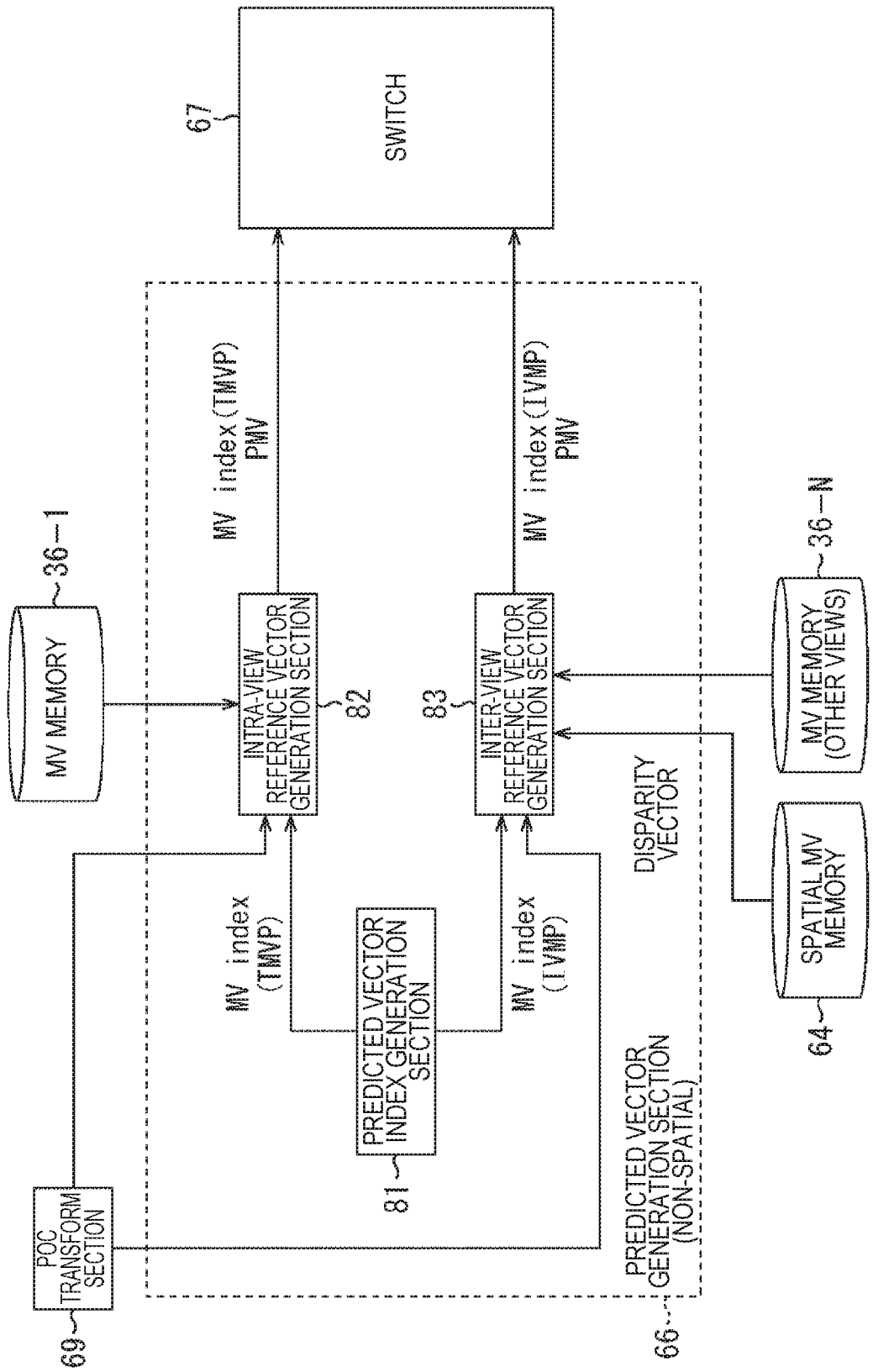
FIG. 7 is a block diagram illustrating a configuration example of a predicted vector generation section.

FIG. 7 is a block diagram illustrating the configuration example of the non-spatially predicted vector generation section of FIG. 6.

In the example of FIG. 7, the predicted vector generation section 66 is configured to include a predicted vector index generation section 81, an intra-view reference vector generation section 82, and an inter-view reference vector generation section 83.

The predicted vector index generation section 81 generates a predicted vector index (MV index) of the TMVP and supplies the generated predicted vector index to the intra-view reference vector generation section 82. The predicted vector index generation section 81 generates a predicted vector index (MV index) of the IVMP and supplies the generated predicted vector index to the inter-view reference vector generation section 83.

The intra-view reference vector generation section 82 generates a predicted vector by the TMVP. That is, the intra-view reference vector generation section 82 generates the predicted vector by reading MVs of corresponding blocks associated by MVs in pictures of different times of the same view from the MV memory 36-1.

Also, at this time, based on POC information from the POC transform section 69, scaling is performed on an MV of a corresponding block when the reference POC (Ref POC) of the target block is different from a reference POC (Ref POC) of the corresponding block. That is, the scaled MV serves as the predicted vector. The intra-view reference vector generation section 82 supplies the generated temporally predicted vector (PMV) to the vector cost determination section 63 and the subtraction section 68 via the switch 67 along with an MV index indicating the predicted vector.

The inter-view reference vector generation section 83 generates a predicted vector by IVMP. The inter-view reference vector generation section 83 finds a disparity vector from MVs of neighboring blocks adjacent to the target block, and obtains a reference block in different views of the same time based on the found disparity vector. Then, the inter-view reference vector generation section 83 generates the predicted vector by reading MVs of reference blocks in different views of the same time from the MV memory 36-N in which MVs of the different views are stored.

Also, at this time, scaling is performed on an MV of a reference block when the reference POC (Ref POC) of the target block is different from a reference POC (Ref POC) of the reference block based on POC information from the POC transform section 69. That is, the scaled MV serves as the predicted vector. The inter-view reference vector generation section 83 supplies the generated inter-view predicted vector to the vector cost determination section 63 and the subtraction section 68 via the switch 67 along with an MV index indicating the predicted vector.

[Operation of Encoder]

Figure 8:
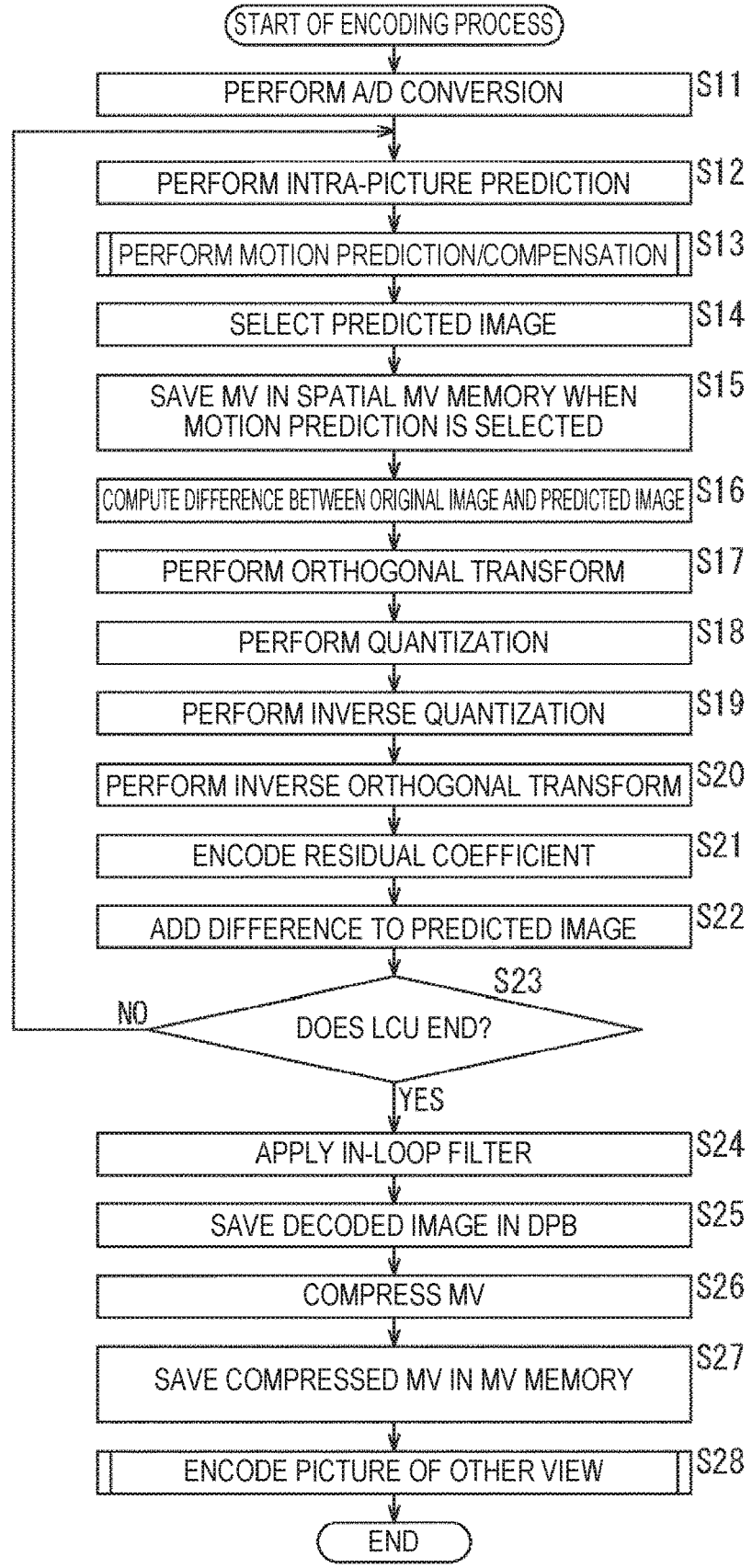
FIG. 8 is a flowchart illustrating an example of a flow of an encoding process.

Next, an encoding process of the encoder 11-1 of FIG. 4 will be described with reference to a flowchart of FIG. 8. Also, the encoders 11-N and 11-M for performing processes of encoding images of other views perform similar encoding processes.

A picture of the color image of the non-base view that is an image (moving image) to be encoded is sequentially supplied to the A/D conversion section 21 in the display order. In step S11, when the picture is an analog signal, the A/D conversion section 21 converts the analog signal according to A/D conversion and supplies an A/D conversion result to the picture reordering buffer 22.

The picture reordering buffer 22 temporarily stores a picture from the A/D conversion section 21 and reads a picture according to a structure of a GOP indicated by the supplied encoding order, so that a process of reordering a picture sequence from the display order to the encoding order (decoding order) is performed. The picture read from the picture reordering buffer 22 is supplied to the calculation section 23, the intra-picture prediction section 33, and the motion prediction/compensation section 34.

In step S12, the intra-picture prediction section 33 performs intra-picture prediction. That is, the intra-picture prediction section 33 reads an already locally decoded part (decoded image) of a target picture from the in-loop filter 31. Then, the intra-picture prediction section 33 designates part of the decoded image of the target picture read from the in-loop filter 31 as a predicted image of a target block (PU) of the target picture supplied from the picture reordering buffer 22.

The intra-picture prediction section 33 obtains an encoding cost required to encode the target block using the predicted image, that is, an encoding cost required to encode a residual or the like for the predicted image in the target block, and supplies the obtained encoding cost to the predicted image selection section 35 along with the predicted image.

In step S13, the motion prediction/compensation section 34 performs motion prediction and compensation. Also, the motion prediction and compensation process will be described in detail with reference to FIG. 9.

In step S13, motion prediction, compensation, and predicted vector generation in all inter prediction modes, MV generation in the M/S mode, and the like are performed and a predicted image is generated in all the inter prediction modes (including the M/S mode). Then, the encoding cost required to encode the target block (PU) using the predicted image is obtained for every candidate picture for use in generation of a predicted image, every candidate for an MV, every candidate for a predicted vector, or every inter prediction mode (including the inter-view prediction mode) with a variable block size, or every M/S mode, an optimum inter prediction mode is determined, and the encoding cost is supplied to the predicted image selection section 35 along with the predicted image.

Also, at this time, the intra-picture prediction section 33 supplies information about intra prediction as header information to the lossless encoding section 26. The motion prediction/compensation section 34 supplies information (MV information or the like) about inter prediction as the header information to the lossless encoding section 26.

In step S14, the predicted image selection section 35 selects a predicted image having a lower encoding cost from predicted images from the intra-picture prediction section 33 and the motion prediction/compensation section 34 and supplies the selected predicted image to the calculation sections 23 and 30.

In step S15, the motion prediction/compensation section 34 (the vector cost determination section 63 of FIG. 6) temporarily saves the MV of the optimum inter prediction mode when motion prediction (other than intra-picture prediction) is selected in step S14 in the spatial MV memory 64 of FIG. 6. That is, although the MV of the case of the AMVP mode is saved in the spatial MV memory 64 even in the process of step S13, the MV of the spatial MV memory 64 of FIG. 6 becomes the MV of the M/S mode, for example, when a mode of an optimal encoding cost is the M/S mode in step S15.

In step S16, the calculation section 23 computes a difference between the original image from the picture reordering buffer 22 and the predicted image from the predicted image selection section 35, and supplies a computation result to the orthogonal transform section 24. That is, the calculation section 23 performs prediction encoding after calculating a subtraction value by subtracting a pixel value of the predicted image supplied from the predicted image selection section 35 from the pixel value of the target block if necessary, and supplies a prediction encoding result to the orthogonal transform section 24.

In step S17, the orthogonal transform section 24 performs an orthogonal transform such as a discrete cosine transform or a Karhunen-Loeve transform on (a residual obtained by subtracting the predicted image or a pixel value of) a target block from the calculation section 23 using a transform unit (TU) as a unit, and supplies a transform coefficient obtained as a result thereof to the quantization section 25.

In step S18, the quantization section 25 quantizes the transform coefficient supplied from the orthogonal transform section 24 and supplies a quantization value obtained as a result thereof to the inverse quantization section 28 and the lossless encoding section 26.

In step S19, the inverse quantization section 28 inversely quantizes the quantization value from the quantization section 25 into a transform coefficient and supplies the transform coefficient to the inverse orthogonal transform section 29.

In step S20, the inverse orthogonal transform section 29 performs an inverse orthogonal transform on the transform coefficient from the inverse quantization section 28 and supplies the transformed transform coefficient to the calculation section 30.

In step S21, the lossless encoding section 26 performs lossless encoding on a residual coefficient that is the quantization value from the quantization section 25 and supplies encoded data obtained as a result thereof to the accumulation buffer 27. Also, the lossless encoding section 26 encodes header information such as prediction mode information or MV information from the intra-picture prediction section 33 or the motion prediction/compensation section 34 and includes the encoded header information in the header of the encoded data.

In step S22, the calculation section 30 obtains a decoded image in which a target block is decoded (locally decoded) by adding the pixel value of the predicted image supplied from the predicted image selection section 35 to the data supplied from the inverse orthogonal transform section 29 if necessary, and supplies the obtained decoded image to the in-loop filter 31.

In step S23, the in-loop filter 31 determines whether a largest coding unit (LCU) ends. When it is determined that the LCU does not end in step S23, the process returns to step S12 and the process subsequent thereto is iterated.

When it is determined that the LCU ends in step S23, the process proceeds to step S24. In step S24, the in-loop filter 31 removes (reduces) block distortion occurring in the decoded image by filtering the decoded image from the calculation section 30.

In step S25, the in-loop filter 31 saves the decoded image after the filtering in the DPB 32-1.

In step S26, the motion prediction/compensation section 34 compresses an MV saved in step S15. That is, for example, although one MV is saved for every (4×4) block in the spatial MV memory 64, the MV is compressed so that one MV is saved for every (16×16) block. For example, an MV of an upper-left block is selected in the (16×16) block.

Then, the motion prediction/compensation section 34 saves the compressed MV in the MV memory 36-1 in step S27.

In step S28, the encoder 11-M of the other view encodes a picture of the other view. Also, the encoding process is basically similar to the encoding process of FIG. 8.

As described above, the encoding process is performed.

[Example of Motion Prediction/Compensation Process]

Figure 9:
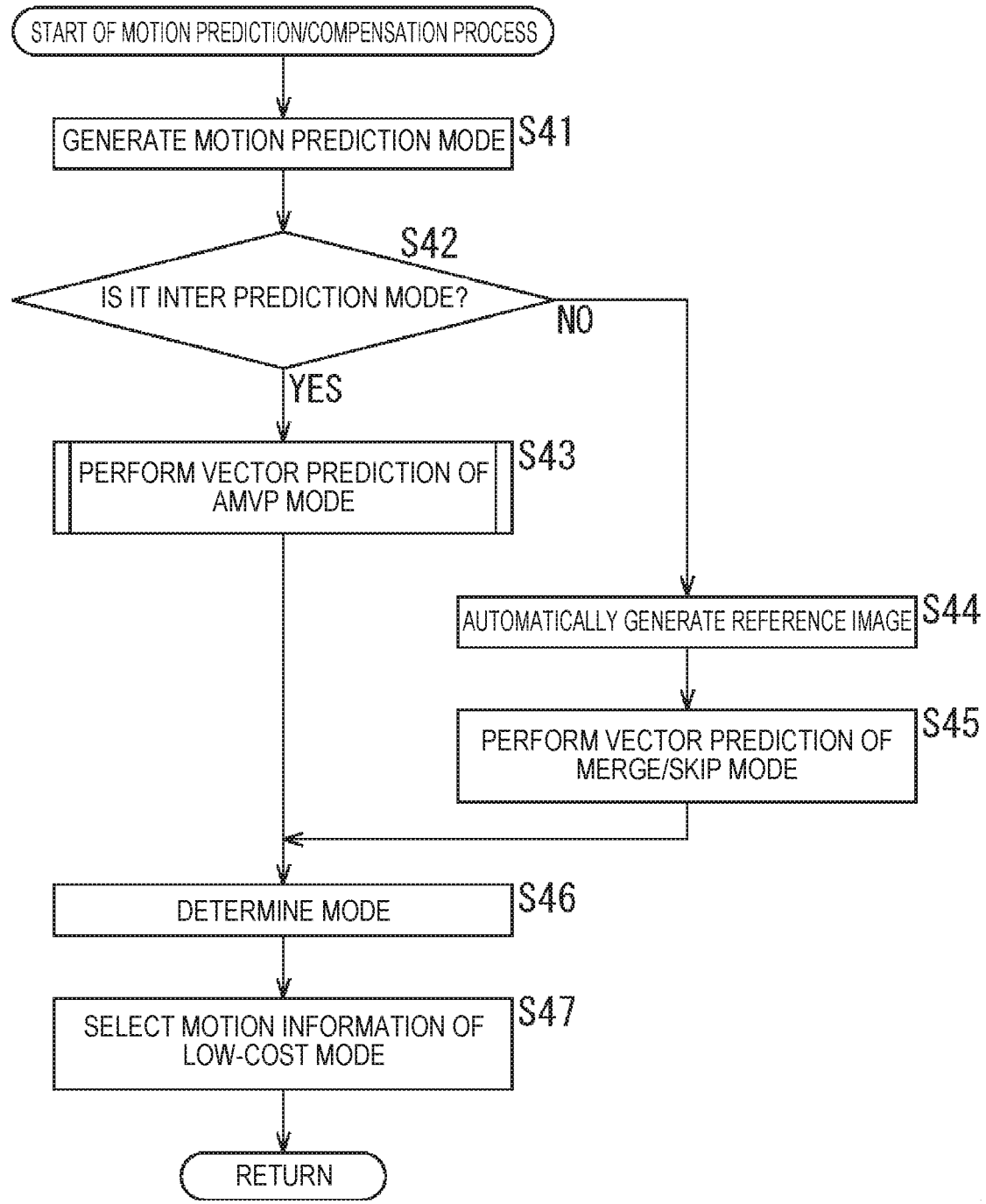
FIG. 9 is a flowchart illustrating a motion prediction/compensation process.

Next, the motion prediction/compensation process of step S13 of FIG. 8 will be described with reference to the flowchart of FIG. 9.

In step S41, the motion prediction mode generation section 51 generates motion prediction modes such as an inter prediction mode (including an inter-view prediction mode), a merge mode, a skip mode, and the like.

The motion prediction mode generation section 51 determines whether the generated motion prediction mode is the inter prediction mode in step S42. When it is determined that the generated motion prediction mode is the inter prediction mode in step S42, the motion prediction mode generation section 51 supplies the inter prediction mode (inter mode) and a reference image index (Ref index) to the AMVP mode vector prediction section 53. Then, the process proceeds to step S43.

In step S43, the AMVP mode vector prediction section 53 performs vector prediction of the AMVP mode. Details of the vector prediction of the AMVP mode will be described later with reference to FIG. 10.

In the process of step S43, an MV in the inter prediction mode is found, a predicted image is generated, and a residual image is generated, each of spatially and non-spatially predicted vectors is generated. In particular, if the Ref POC of the current PU is different from the Ref POC of the reference PU in the different view when the non-spatially predicted vector is generated, the MV of the reference PU is scaled and the scaled MV serves as a candidate for the predicted vector of the current PU. Then, a difference between the candidate for the predicted vector and the MV is calculated, so that the predicted vector of a lowest cost is selected. The lowest cost of the selected predicted vector is supplied to the mode determination section 55. In addition, a difference between the predicted vector of the selected lowest cost and the MV and an index of the predicted vector are encoded as MV information.

On the other hand, when it is determined that the mode is not the inter prediction mode in step S42, the motion prediction mode generation section 51 supplies the merge mode or the skip mode (M/S mode) to the automatic reference index generation section 52. Then, the process proceeds to step S44.

In step S44, the automatic reference index generation section 52 automatically generates a reference image index and supplies the generated reference image index (Ref index) to the M/S mode vector prediction section 54 along with information indicating the merge mode or the skip mode from the motion prediction mode generation section 51.

In step S45, the M/S mode vector prediction section 54 performs vector prediction of the merge mode or the skip mode.

That is, the M/S mode vector prediction section 54 reads one or more pictures encoded before a target picture and locally decoded from the DPB 32-1 or 32-N according to the mode and the reference image index from the automatic reference index generation section 52 as the candidate pictures.

In addition, the M/S mode vector prediction section 54 designates a candidate for the MV using spatially neighboring blocks adjacent thereto in the same picture. The M/S mode vector prediction section 54 reads MVs of temporally neighboring blocks corresponding or adjacent thereto in pictures of different times of the same view from the MV memory 36-1 and designates the read MVs as candidates for the MV. The M/S mode vector prediction section 54 reads MVs of reference blocks in different views of the same time from the MV memory 36-N in which the MVs of the different views are stored, and designates the read MVs as the candidates for the predicted vector. The M/S mode vector prediction section 54 generates a candidate picture using the MV candidates.

The M/S mode vector prediction section 54 obtains an encoding cost required to encode a target block using a predicted image for every candidate picture for use in generation of a predicted image, every candidate for an MV, or every M/S mode based on an original image from the picture reordering buffer 22. The M/S mode vector prediction section 54 supplies an optimal encoding cost among the obtained encoding costs as a mode cost to the mode determination section 55. At this time, the M/S mode vector prediction section 54 encodes a merge index indicating an MV of the optimal encoding cost as MV information.

In step S46, the mode determination section 55 refers to encoding costs from the AMVP mode vector prediction section 53 and the M/S mode vector prediction section 54 and determines the inter prediction mode or the inter-view prediction mode having a lowest encoding cost as an optimum prediction mode which is an optimum motion prediction mode. The mode determination section 55 returns an optimum inter prediction mode determination result to the AMVP mode vector prediction section 53 and the M/S mode vector prediction section 54.

In step S47, the AMVP mode vector prediction section 53 or the M/S mode vector prediction section 54 selects encoded motion information of a mode having a low encoding cost based on a determination result from the mode determination section 55 and supplies the selected motion information to the lossless encoding section 26.

[Example of Vector Prediction Process of AMVP Mode]

Figure 10:
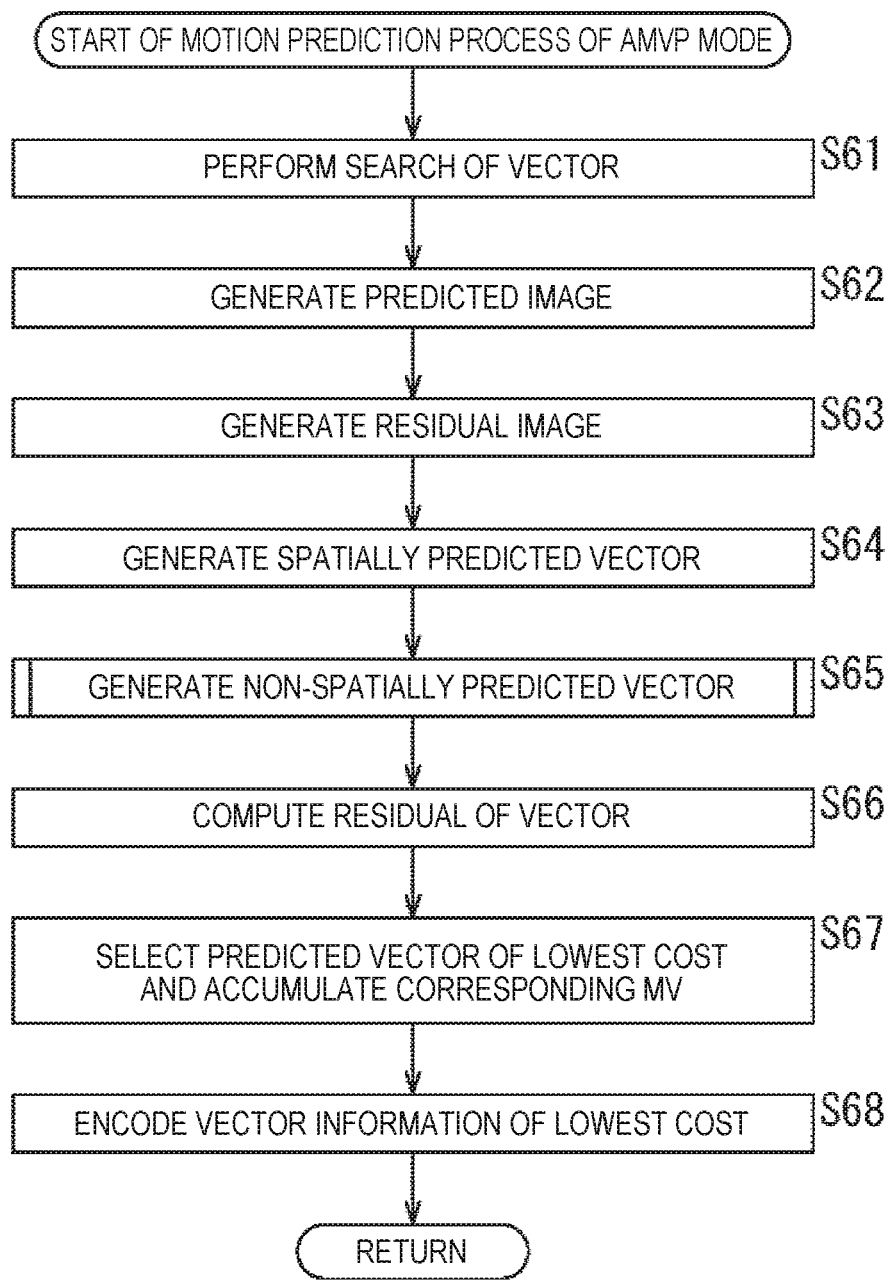
FIG. 10 is a flowchart illustrating a vector prediction process of an AMVP mode.

Next, the vector prediction process of the AMVP mode of step S43 of FIG. 9 will be described with reference to a flowchart of FIG. 10.

The prediction mode from the motion prediction mode generation section 51 is supplied to the vector search section 61 along with a reference image index.

In step S61, the vector search section 61 performs a vector search according to the prediction mode and the reference image index from the motion prediction mode generation section 51.

That is, the vector search section 61 reads one or more pictures encoded before a target picture and locally decoded from the DPB 32-1 or 32-N according to the prediction mode and the reference image index from the motion prediction mode generation section 51 as the candidate pictures. The vector search section 61 detects an MV representing motion serving as a shift between a target block and a corresponding block corresponding to the target block in a candidate picture by motion detection using a target block of a target picture from the picture reordering buffer 22 and a candidate picture. The vector search section 61 supplies the detected MV to the predicted image generation section 62 and the vector cost determination section 63.

In step S62, the predicted image generation section 62 generates a predicted image according to the MV of the target block from the vector search section 61.

That is, the predicted image generation section 62 generates the predicted image by performing motion compensation for compensating for a shift of a motion amount of the candidate picture from the DPB 32-1 or 32-N according to the MV of the target block from the vector search section 61. The generated predicted image is supplied to the predicted image selection section 35 and the vector cost determination section 63.

In step S63, the vector cost determination section 63 generates a residual image using the original image from the picture reordering buffer 22, the MV from the vector search section 61, and the predicted image from the predicted image generation section 62. The generated residual image is used to compute the encoding cost in step S67 as will be described later.

In step S64, the predicted vector generation section 65 generates a spatially predicted vector. That is, the predicted vector generation section 65 generates the spatially predicted vector by reading MVs of spatially neighboring blocks adjacent thereto in the same picture from the spatial MV memory 64. The predicted vector generation section 65 supplies the generated spatially predicted vector to the vector cost determination section 63 and the subtraction section 68 via the switch 67 along with the MV index indicating the predicted vector.

In step S65, the predicted vector generation section 66 generates a non-spatially predicted vector. That is, the predicted vector generation section 66 generates the predicted vector by the TMVP and the predicted vector by the IVMP. A process of generating the non-spatially predicted vector will be described later with reference to FIG. 11.

In the process of step S65, a process of generating the predicted vector by the TMVP is performed and a process of generating the predicted vector by the IVMP is performed. Also, at the time of the process of generating the predicted vector by the IVMP, a disparity vector is found from the MVs of neighboring blocks adjacent to the target block and reference blocks in different views of the same time are obtained based on the found disparity vector. Then, the MVs of the reference blocks in the different views of the same time are read from the MV memory 36-N in which the MVs of the different views are stored, and scaling is performed when the reference POC (Ref POC) of the target block is different from a reference POC (Ref POC) of the reference block. Also, the POC information is transformed from the Ref index in the POC transform section 69 and the transformed POC information is supplied.

The predicted vector by the TMVP and the predicted vector of the IVMP generated in the process of step S65 are supplied to the vector cost determination section 63 and the subtraction section 68 via the switch 67 along with an MV index indicating the predicted vector.

In step S66, the vector cost determination section 63 computes residuals between the MV of the target block and the predicted vectors of the target block supplied from the predicted vector generation sections 65 and 66.

In step S67, the vector cost determination section 63 obtains encoding costs using the residual image obtained in step S63, the vector residuals obtained in step S66, and the like, selects the predicted vector of a lowest cost from the obtained encoding costs, and accumulates an MV (best MV) corresponding to the selected predicted vector in the spatial MV memory 64.

This MV (best MV) is supplied to the subtraction section 68 via the spatial MV memory 64.

In step S68, a difference MVd between the MV (best MV) having the lowest cost from the spatial MV memory 64 and the predicted vector from the switch 67 corresponding to the best MV is encoded as MV information along with an MV index representing an index of the predicted vector.

[Example of Process of Generating Non-Spatially Predicted Vector]

Figure 11:
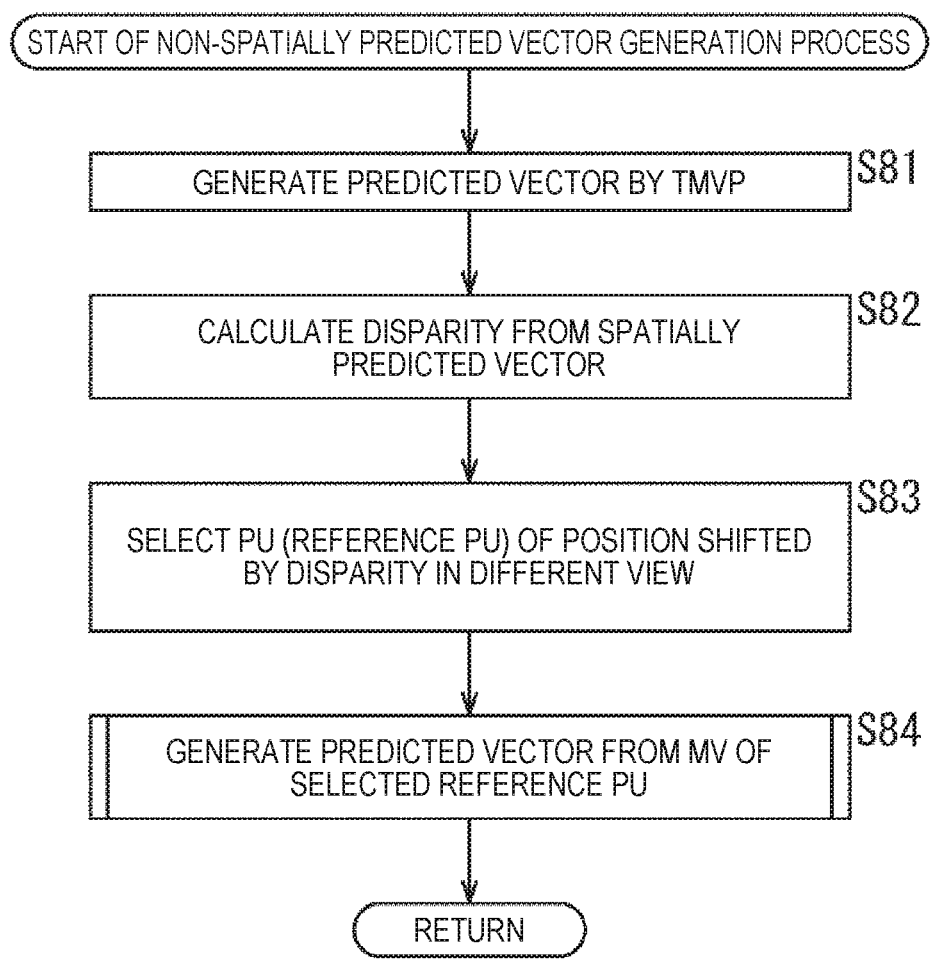
FIG. 11 is a flowchart illustrating a process of generating a non-spatially predicted vector.

Next, the process of generating the non-spatially predicted vector in step S65 of FIG. 10 will be described with reference to the flowchart of FIG. 11.

The predicted vector index generation section 81 generates a predicted vector index (MV index) of the TMVP and supplies the generated predicted vector index to the intra-view reference vector generation section 82. The predicted vector index generation section 81 generates a predicted vector index (MV index) of the IVMP and supplies the generated predicted vector index to the inter-view reference vector generation section 83.

In step S81, the intra-view reference vector generation section 82 generates a predicted vector by the TMVP.

That is, the intra-view reference vector generation section 82 generates the predicted vector by reading MVs of temporally neighboring blocks corresponding or adjacent thereto in pictures of different times of the same view from the MV memory 36-1. The intra-view reference vector generation section 82 supplies the generated temporally predicted vector (PMV) to the vector cost determination section 63 and the subtraction section 68 via the switch 67 along with an MV index indicating the predicted vector.

In steps S82 to S84, the inter-view reference vector generation section 83 generates a predicted vector by IVMP.

That is, in step S82, the inter-view reference vector generation section 83 finds a disparity vector from MVs of neighboring blocks adjacent to a target block (PU) from the spatial MV memory 64, and calculates a disparity based on the found disparity vector.

In step S83, the inter-view reference vector generation section 83 selects a PU of a position shifted by the disparity obtained in step S82 as the reference PU in a different view.

In step S84, the inter-view reference vector generation section 83 generates a predicted vector from an MV of a selected reference PU by reading the MV of the selected reference PU from the MV memory 36-N in which MVs of the different views are stored. This predicted vector generation process will be described later with reference to FIGS. 12 and 13.

In the process of step S84, the generated inter-view predicted vector of the IVMP is supplied to the vector cost determination section 63 and the subtraction section 68 via the switch 67 along with an MV index indicating the predicted vector.

[Example of Predicted Vector Generation Process]

Figure 12:
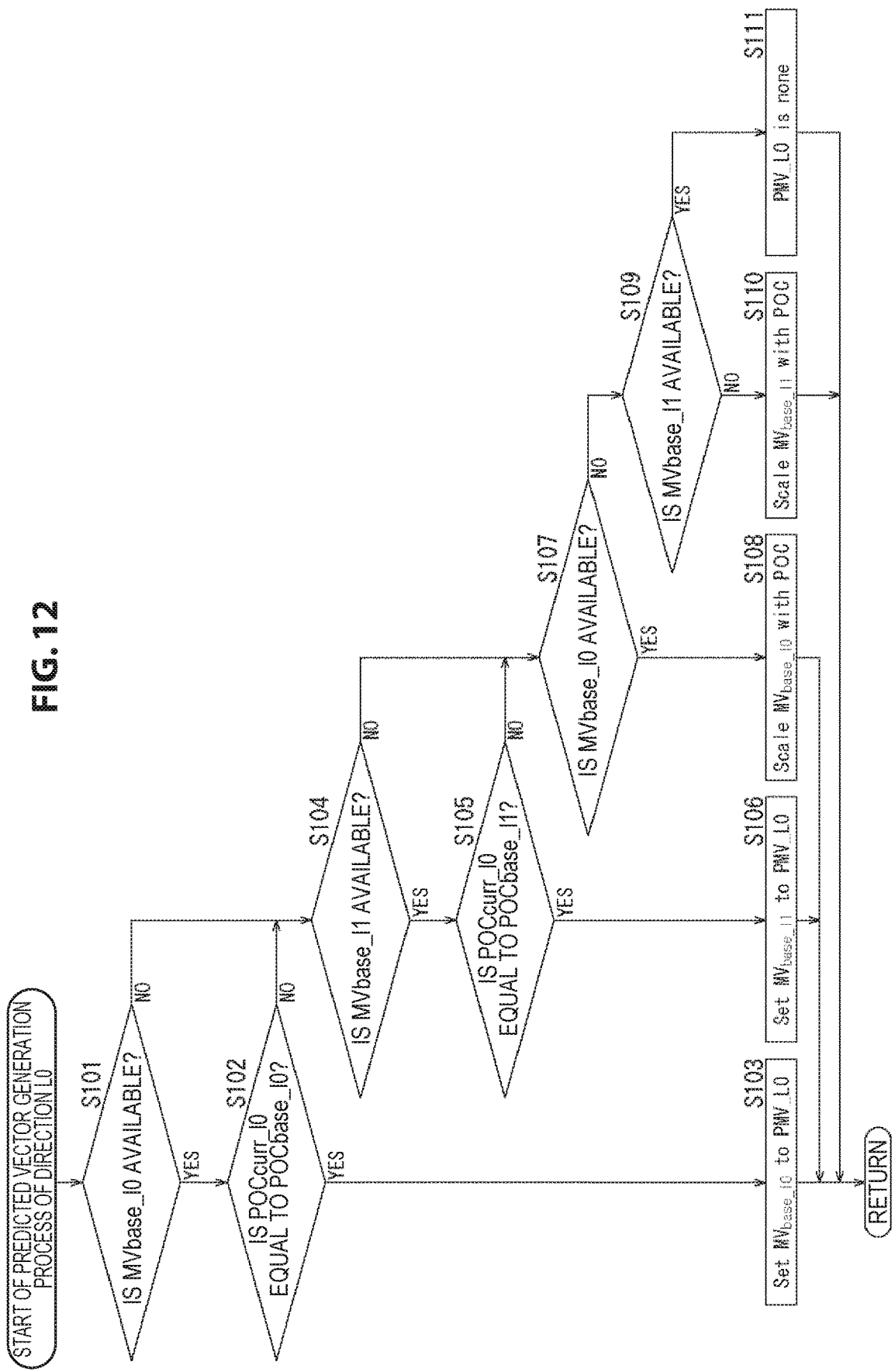
FIG. 12 is a flowchart illustrating a process of generating a predicted vector L0.

Next, the predicted vector generation process of step S84 of FIG. 11 will be described with reference to a flowchart of FIG. 12. Also, in the example of FIG. 12, a predicted vector generation process in a direction L0 is illustrated.

In step S101, the inter-view reference vector generation section 83 finds the MV memory 36-N in which MVs of different views are stored and determines whether the MV MVbase=10 of the direction L0 of the different view (base view) is available.

When it is determined that the MV MVbase=10 of the direction L0 of the different view (base view) is available in step S101, the process proceeds to step S102. In step S102, the inter-view reference vector generation section 83 determines whether the POCcurr_10 that is a Ref POC of the target PU is equal to POCbase_10 that is a Ref POC of the reference PU.

When it is determined that POCcurr_10 is equal to POCbase_10 in step S102, the process proceeds to step S103. In step S103, the inter-view reference vector generation section 83 designates the MV MVbase=10 of the direction L0 as the predicted vector PMV_L0 of the direction L0 of the target PU. The predicted vector generation process is ended.

When it is determined that the MV MVbase=10 of the direction L0 of the different view (base view) is unavailable in step S101 or when it is determined that POCcurr_10 is not equal to POCbase_10 in step S102, the process proceeds to step S104.

In step S104, the inter-view reference vector generation section 83 finds the MV memory 36-N in which MVs of different views are stored and determines whether the MV MVbase=11 of the direction L1 of the different view (base view) is available.

When it is determined that the MV MVbase=11 of the direction L1 of the different view (base view) is available in step S104, the process proceeds to step S105. In step S105, the inter-view reference vector generation section 83 determines whether POCcurr_10 which is a Ref POC of the target PU is equal to POCbase_11 which is a Ref POC of the reference PU.

When it is determined that POCcurr_10 is equal to POCbase_11 in step S105, the process proceeds to step S106. In step S106, the inter-view reference vector generation section 83 designates the MV MVbase=11 of the direction L1 as the predicted vector PMV_L0 of the direction L0 of the target PU. Then, the predicted vector generation process is ended.

When it is determined that the MV MVbase=11 of the direction L1 of the different view (base view) is unavailable in step S104 or when it is determined that POCcurr_10 is not equal to POCbase_11 in step S105, the process proceeds to step S107.

In step S107, the inter-view reference vector generation section 83 re-determines whether the MV MVbase=10 of the direction L0 of the different view (base view) is available.

When it is determined that the MV MVbase=10 of the direction L0 of the different view (base view) is available in step S107, the process proceeds to step S108. In step S108, the inter-view reference vector generation section 83 scales the MV MVbase=10 of the direction L0 according to POCcurr_10 which is a Ref POC of the target PU and POCbase_10 which is a Ref POC of the reference PU. Then, the inter-view reference vector generation section 83 designates the scaled MV MVbase=10 as the predicted vector PMV_L0 of the direction L0 of the target PU, and the predicted vector generation process is ended.

When it is determined that the MV MVbase=10 of the direction L0 of the different view (base view) is unavailable in step S107, the process proceeds to step S109.

In step S109, the inter-view reference vector generation section 83 re-determines whether the MV MVbase=11 of the direction L1 of the different view (base view) is available.

When it is determined that the MV MVbase=11 of the direction L1 of the different view (base view) is available in step S107, the process proceeds to step S110. In step S110, the inter-view reference vector generation section 83 scales the MV MVbase=11 of the direction L1 according to POCcurr_10 which is a Ref POC of the target PU and POCbase_11 which is a Ref POC of the reference PU. Then, the inter-view reference vector generation section 83 designates the scaled MV MVbase=11 as the predicted vector PMV_L0 of the direction L0 of the target PU, and the predicted vector generation process is ended.

When it is determined that the MV MVbase=11 of the direction L1 of the different view (base view) is unavailable in step S109, the process proceeds to step S111. In step S111, the inter-view reference vector generation section 83 determines that there is no predicted vector PMV_L0 of the direction L0 of the target PU and the predicted vector generation process is ended.

[Example of Predicted Vector Generation Process]

Figure 13:
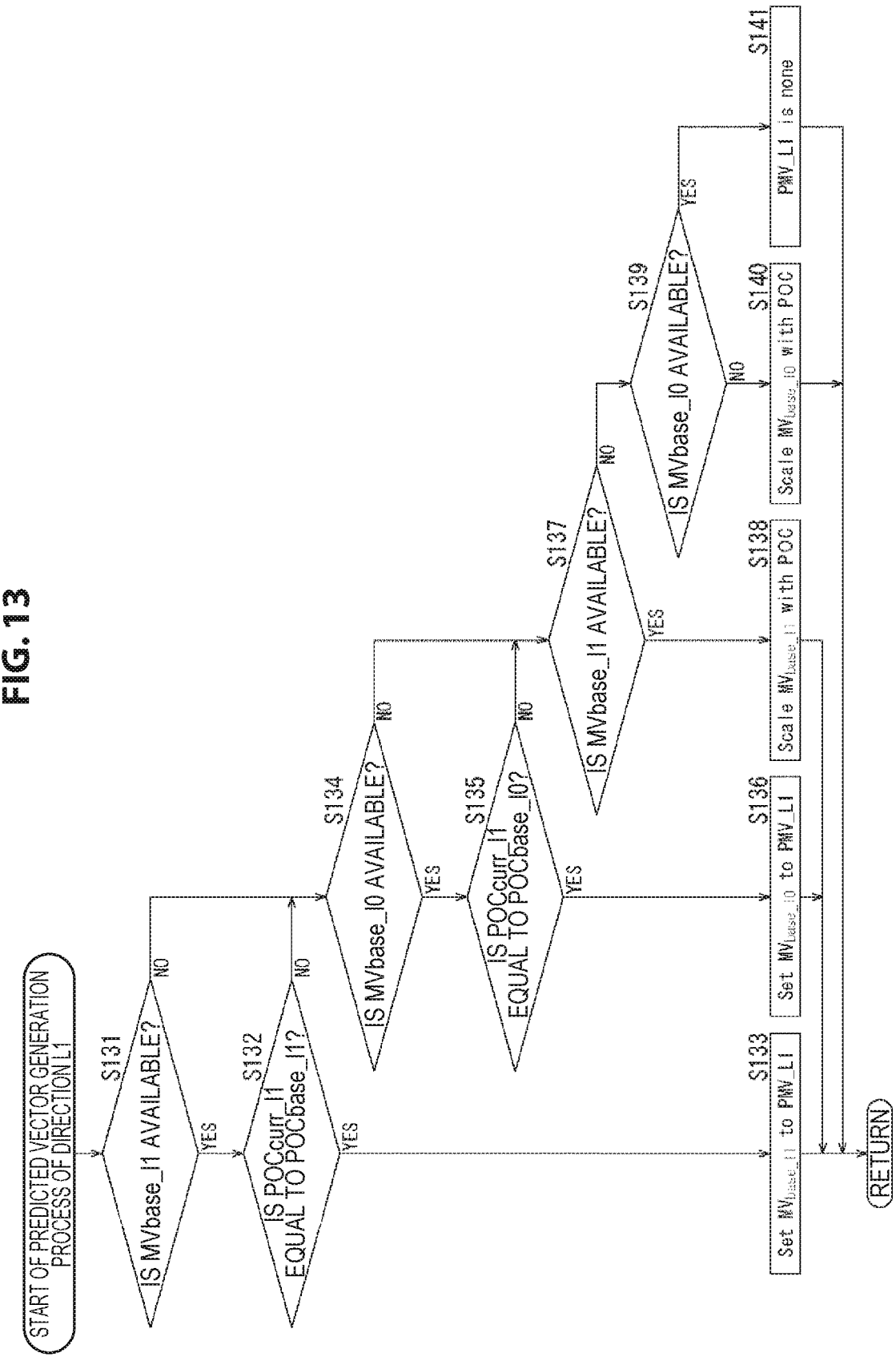
FIG. 13 is a flowchart illustrating a process of generating a predicted vector L1.

Next, the predicted vector generation process of step S84 of FIG. 11 will be described with reference to a flowchart of FIG. 13. Also, in the example of FIG. 13, a predicted vector generation process in the direction L1 is shown.

In step S131, the inter-view reference vector generation section 83 finds the MV memory 36-N in which MVs of different views are stored and determines whether the MV MVbase=11 of the direction L1 of the different view (base view) is available.

When it is determined that the MV MVbase=11 of the direction L1 of the different view (base view) is available in step S131, the process proceeds to step S132. In step S132, the inter-view reference vector generation section 83 determines whether the POCcurr_11 which is a Ref POC of the target PU is equal to POCbase_11 which is a Ref POC of the reference PU.

When it is determined that POCcurr_11 is equal to POCbase_11 in step S132, the process proceeds to step S133. In step S133, the inter-view reference vector generation section 83 designates the MV MVbase=11 of the direction L1 as the predicted vector PMV_L1 of the direction L1 of the target PU. Then, the predicted vector generation process is ended.

When it is determined that the MV MVbase=11 of the direction L1 of the different view (base view) is unavailable in step S131 or when it is determined that POCcurr_11 is not equal to POCbase_11 in step S132, the process proceeds to step S134.

In step S134, the inter-view reference vector generation section 83 finds the MV memory 36-N in which MVs of different views are stored and determines whether the MV MVbase=10 of the direction L0 of the different view (base view) is available.

When it is determined that the MV MVbase=10 of the direction L0 of the different view (base view) is available in step S134, the process proceeds to step S135. In step S135, the inter-view reference vector generation section 83 determines whether POCcurr_11 which is a Ref POC of the target PU is equal to POCbase_10 which is a Ref POC of the reference PU.

When it is determined that POCcurr_11 is equal to POCbase_10 in step S135, the process proceeds to step S136. In step S136, the inter-view reference vector generation section 83 designates the MV MVbase=10 of the direction L0 as the predicted vector PMV_L1 of the direction L1 of the target PU. Then, the predicted vector generation process is ended.

When it is determined that the MV MVbase=10 of the direction L0 of the different view (base view) is unavailable in step S134 or when it is determined that POCcurr_11 is not equal to POCbase_10 in step S135, the process proceeds to step S137.

In step S137, the inter-view reference vector generation section 83 re-determines whether the MV MVbase=11 of the direction L1 of the different view (base view) is available.

When it is determined that the MV MVbase=11 of the direction L1 of the different view (base view) is available in step S137, the process proceeds to step S138. In step S138, the inter-view reference vector generation section 83 scales the MV MVbase=11 of the direction L1 according to POCcurr_11 which is a Ref POC of the target PU and POCbase_11 which is a Ref POC of the reference PU. Then, the inter-view reference vector generation section 83 designates the scaled MVbase=11 as the predicted vector PMV_L1 of the direction L1 of the target PU, and the predicted vector generation process is ended.

When it is determined that the MV MVbase=11 of the direction L1 of the different view (base view) is unavailable in step S137, the process proceeds to step S139.

In step S139, the inter-view reference vector generation section 83 re-determines whether the MV MVbase=10 of the direction L0 of the different view (base view) is available.

When it is determined that the MV MVbase=10 of the direction L0 of the different view (base view) is available in step S137, the process proceeds to step S140. In step S140, the inter-view reference vector generation section 83 scales the MV MVbase=10 of the direction L0 according to POCcurr_11 which is a Ref POC of the target PU and POCbase_10 which is a Ref POC of the reference PU. Then, the inter-view reference vector generation section 83 designates the scaled MVbase=10 as the predicted vector PMV_L1 of the direction L1 of the target PU, and the predicted vector generation process is ended.

When it is determined that the MV MVbase=10 of the direction L0 of the different view (base view) is unavailable in step S139, the process proceeds to step S141. In step S141, the inter-view reference vector generation section 83 determines that there is no predicted vector PMV_L1 of the direction L1 of the target PU and the predicted vector generation process is ended.

In this manner, when the Ref POC (Ref 0) of the current PU is different from the Ref POC (Ref 0) of the reference PU in the different view, the MV of the reference PU is scaled and the scaled MV is configured to serve as a candidate for the predicted vector of the current PU.

Thereby, it is possible to improve the encoding efficiency of the MV because it is possible to generate a predicted vector having a high correlation.

3. Second Embodiment

[Configuration Example of Multi-View Image Decoding Device]

Figure 16:
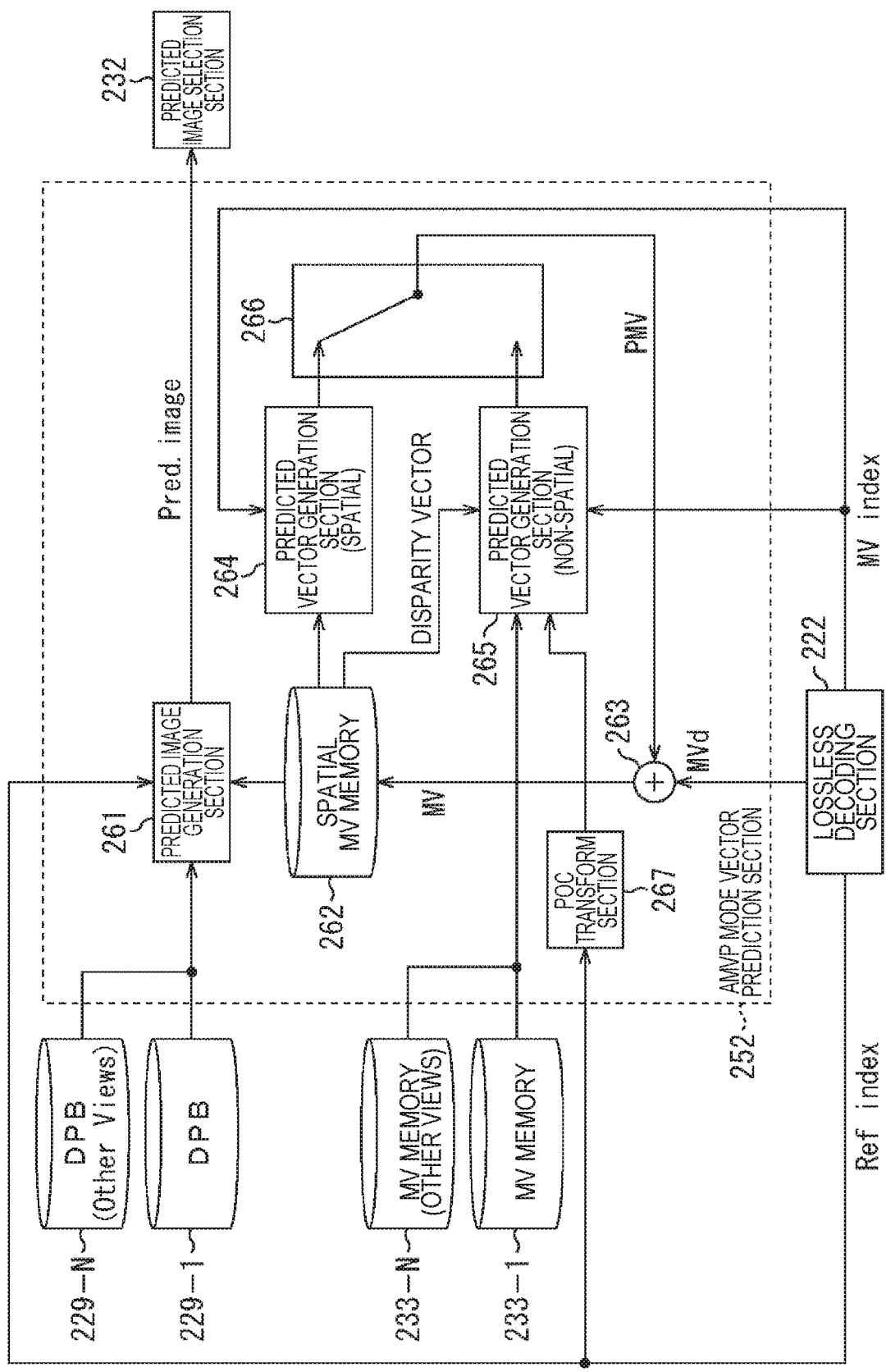
FIG. 16 is a block diagram illustrating a configuration example of an AMVP mode vector prediction section.

FIG. 16 illustrates a configuration of an embodiment of a decoder constituting a multi-view image decoding device serving as an image processing device to which the present disclosure is applied.

The multi-view image decoding device, for example, includes decoders 211-1 to 211-M for decoding multi-view images.

The decoder 211-1 decodes encoded data corresponding to a color image of a non-base view from an encoded stream encoded by the encoder 11-1 in an HEVC scheme, and generates the color image of the non-base view.

For example, decoders 211-M and 211-N for decoding corresponding encoded data of encoded streams encoded by the encoders 11-M and 11-N and generating color images of other views (including a base view) of frame units are also configured like the decoder 211-1. In addition, when there is also a decoder for generating chroma information image as well as the color image, the decoder is configured like the decoder 211-1.

In the example of FIG. 16, the decoder 211-1 is configured to include an accumulation buffer 221, a lossless decoding section 222, an inverse quantization section 223, an inverse orthogonal transform section 224, a calculation section 225, an in-loop filter 226, and a picture reordering buffer 227, and a digital/analog (D/A) transform section 228. In addition, the decoder 211-1 is configured to include a DPB 229-1, an intra-picture prediction section 230, a motion compensation section 231, a predicted image selection section 232, and an MV memory 233-1.

The accumulation buffer 221 is a reception section for receiving corresponding encoded data in an encoded stream from the encoder 11-1. The accumulation buffer 221 temporarily stores the received encoded data and supplies the stored data to the lossless decoding section 222. The encoded data includes header information as well as encoded data (quantized residual coefficient) of a color image of a base view.

The lossless decoding section 222 restores the quantized residual coefficient or header information by performing variable length decoding on the encoded data from the accumulation buffer 221. Then, the lossless decoding section 222 supplies a quantization value to the inverse quantization section 223 and supplies a corresponding piece of the header information to each of the intra-picture prediction section 230 and the motion compensation section 231.

The inverse quantization section 223 inversely quantizes the quantized residual coefficient from the lossless decoding section 222 and supplies the inversely quantized residual coefficient to the inverse orthogonal transform section 224.

The inverse orthogonal transform section 224 performs an inverse orthogonal transform on a transform coefficient from the inverse quantization section 223 in units of TUs, and supplies an inverse orthogonal transform result to the calculation section 225 in units of blocks (for example, LCUs).

The calculation section 225 performs decoding by designating a block supplied from the inverse orthogonal transform section 224 as a target block of a decoding target and adding a predicted image supplied from the predicted image selection section 232 to the target block if necessary. The calculation section 225 supplies a decoded image obtained as a result thereof to the in-loop filter 226.

The in-loop filter 226, for example, is constituted of a deblocking filter. Also, for example, when the HEVC scheme is adopted, the in-loop filter 226 is constituted of a deblocking filter and an adaptive offset filter. The in-loop filter 226, for example, performs similar filtering to the in-loop filter 31 of FIG. 4 on the decoded image from the calculation section 225 and supplies the decoded image after the filtering to the picture reordering buffer 227.

The picture reordering buffer 227 reorders a picture sequence to an original sequence (display order) by temporarily storing and reading a picture of the decoded image from the in-loop filter 226 and supplies a reordering result to the D/A conversion section 228.

When it is necessary to output the picture from the picture reordering buffer 227 in an analog signal, the D/A conversion section 228 performs D/A conversion on the picture and outputs a D/A conversion result.

In addition, the in-loop filter 226 supplies the DPB 229-1 with decoded images of an intra (I)-picture, a P-picture, and B-pictures that are referable pictures among filtered decoded images. Also, the in-loop filter 226 supplies a decoded image that is not filtered to the intra-picture prediction section 230.

Here, the DPB 229-1 stores a decoded image from the in-loop filter 226, that is, a picture of a color image of an encoded and locally decoded non-base view in the decoder 211-1, as (a candidate for) a reference picture to be referred to when a predicted image used in prediction encoding (encoding in which subtraction of a predicted image is performed by the calculation section 225) to be performed at a later time is generated. Also, the DPB 229-1 is shared by the decoder 211-M of the other view.

The intra-picture prediction section 230 recognizes whether the target block (PU) is encoded using the predicted image generated in the intra prediction (intra-picture prediction) based on the header information (intra prediction mode) from the lossless decoding section 222.

When the target block is encoded using the predicted image generated in intra prediction, the intra-picture prediction section 230 reads an already decoded portion (decoded image) from a picture (target picture) including the target block from the in-loop filter 226 as in the intra-picture prediction section 33 of FIG. 4. Then, the intra-picture prediction section 230 supplies part of the decoded image of the target picture read from the in-loop filter 226 as the predicted image of the target block to the predicted image selection section 232.

The motion compensation section 231 recognizes whether the target block is encoded using a predicted image generated in the inter prediction based on header information from the lossless decoding section 222.

When the target block is encoded using a predicted image generated in the inter prediction, the motion compensation section 231 recognizes an optimum prediction mode of the target block based on the header information from the lossless decoding section 222.

The motion compensation section 231 performs a vector prediction process of the AMVP mode when the optimum prediction mode is the inter prediction mode, and performs a vector prediction process of the M/S mode (merge/skip mode) when the optimum prediction mode is the merge/skip mode.

The motion compensation section 231 reads a candidate picture (inter prediction reference picture or inter-view prediction reference picture) corresponding to a reference image index from candidate pictures stored in the DPB 229-1 or 229-N.

Then, the motion compensation section 231 generates a predicted vector for use in decoding of the MV based on an index of the predicted vector from header information from the lossless decoding section 222 in the case of the AMVP mode.

For example, when the index of the predicted vector indicates a spatially predicted vector, the motion compensation section 231 generates a predicted vector using spatially neighboring blocks adjacent thereto in the same picture. When the index of the predicted vector indicates a temporally predicted vector, the motion compensation section 231 generates a predicted vector by reading MVs of temporally neighboring blocks corresponding or adjacent thereto in pictures of different times of the same view from the MV memory 233-1. When the index of the predicted vector indicates an inter-view predicted vector, the motion compensation section 231 reads MVs of reference blocks (Cor PU of FIG. 1) in different views of the same time from the MV memory 233-N in which the MVs of the different views are stored and generates a predicted vector.

The motion compensation section 231 recognizes the MV representing motion used in generation of the predicted image of the target block by adding motion information of the header information from the lossless decoding section 222 to the generated predicted vector. Then, like the motion prediction/compensation section 34 of FIG. 4, the motion compensation section 231 generates a predicted image by performing motion compensation of the reference picture according to the MV.

That is, the motion compensation section 231 acquires a block (corresponding block) of a position moved (shifted) according to a shift vector of the target block from the position of the target block in the candidate picture as a predicted image.

The motion compensation section 231 generates an MV based on a merge index in header information from the lossless decoding section 222 in the case of the M/S mode.

For example, when the merge index indicates a spatially predicted vector, the motion compensation section 231 generates the MV using spatially neighboring blocks adjacent thereto in the same picture. When the merge index indicates a temporally predicted vector, the motion compensation section 231 generates an MV by reading MVs of temporally neighboring blocks corresponding or adjacent thereto in pictures of different times of the same view from the MV memory 233-1. When the merge index indicates an inter-view predicted vector, the motion compensation section 231 reads MVs of reference blocks (Cor PU of FIG. 1) in different views of the same time from the MV memory 233-N in which the MVs of the different views are stored and generates an MV.

Then, like the motion prediction/compensation section 34 of FIG. 4, the motion compensation section 231 generates a predicted image by performing the motion compensation of the reference picture according to the MV. The motion compensation section 231 supplies the predicted image to the predicted image selection section 232.

When the predicted image is supplied from the intra-picture prediction section 230, the predicted image selection section 232 selects the predicted image and supplies the selected predicted image to the calculation section 225. When the predicted image is supplied from the motion compensation section 231, the predicted image selection section 232 selects the predicted image and supplies the selected predicted image to the calculation section 225.

The MV memory 233-1 stores an MV determined in the motion compensation section 231 as (a candidate for) the MV to be referred to when the predicted vector for encoding the MV to be executed at a later time is generated. Also, the MV memory 233-1 is shared by the decoder 211-M of the other view.

Also, the MV memory 233-N is provided in the encoder 11-N having the different view, and stores the MV determined in the decoder 211-N as (the candidate for) the MV to be referred to when the predicted vector for encoding the MV to be executed at a later time is generated. The MV memory 233-N is shared by the motion compensation section 231 or the decoder 211-M of the other view.

[Configuration of Motion Compensation Section]

Figure 14:
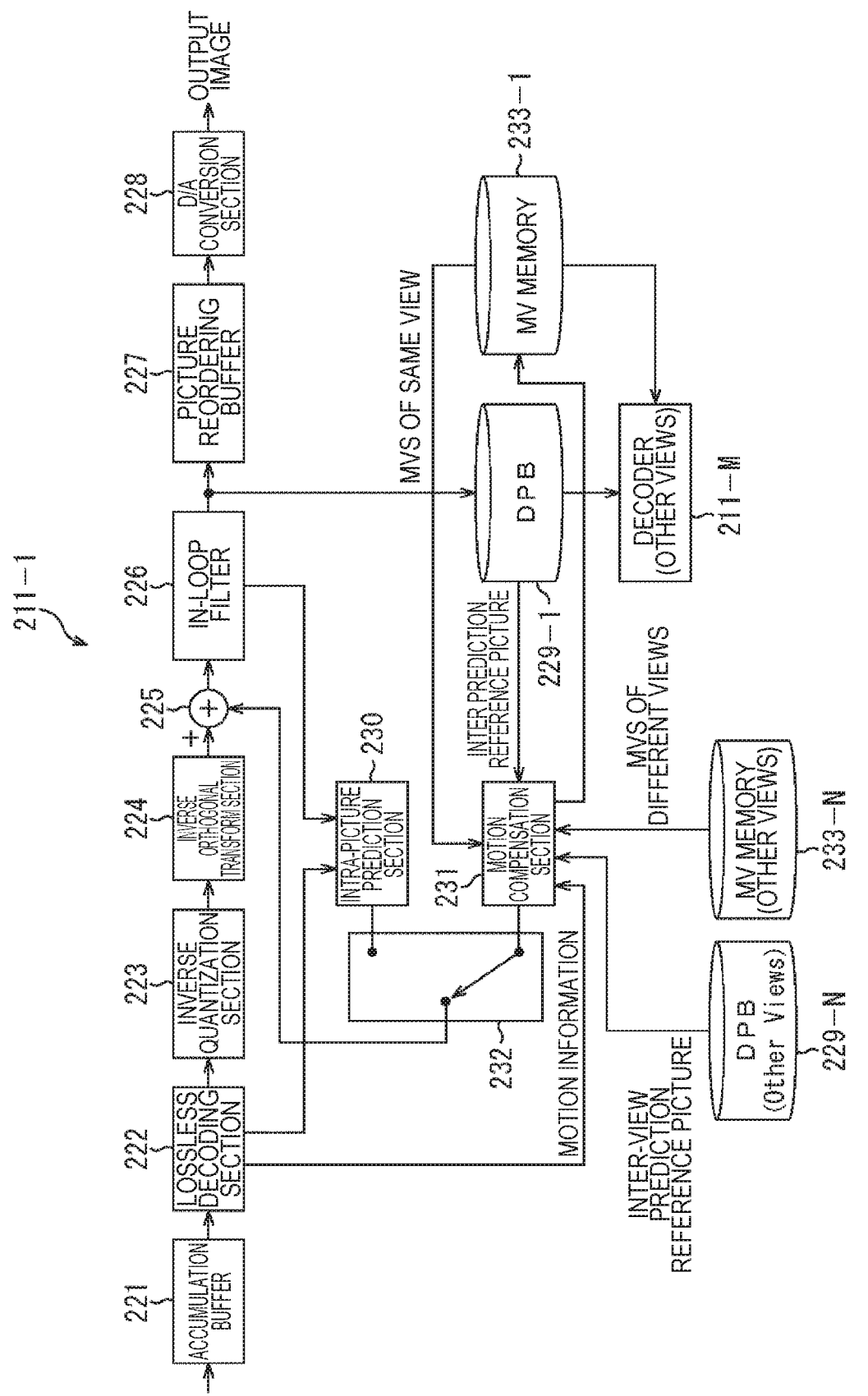
FIG. 14 is a block diagram illustrating a main configuration example of a decoder constituting a multi-view image decoding device to which the present technology is applied.
Figure 15:
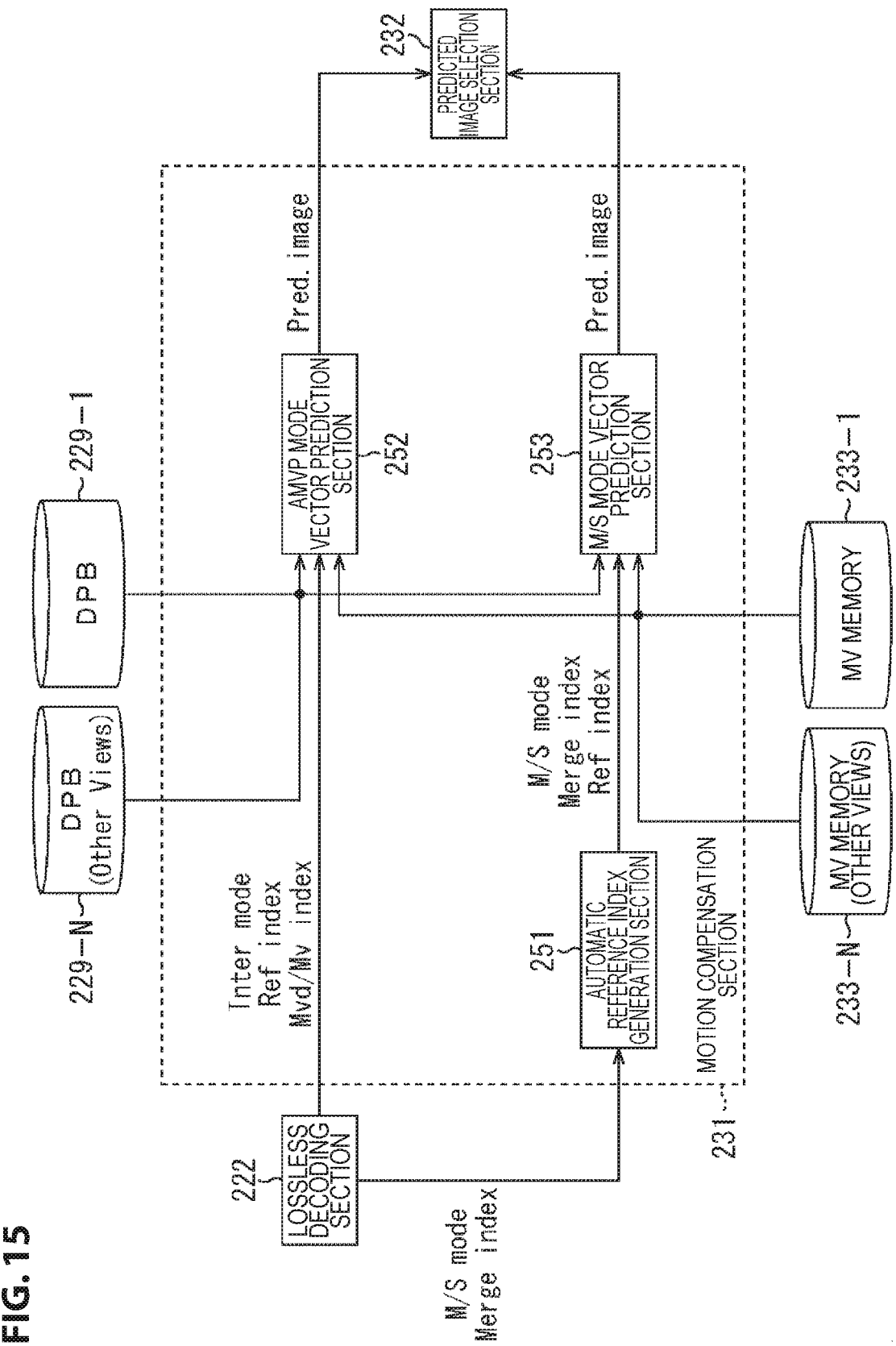
FIG. 15 is a block diagram illustrating a configuration example of a motion compensation section.

FIG. 15 is a block diagram illustrating a configuration example of the motion compensation section of FIG. 14.

In the example of FIG. 15, the motion compensation section 231 is configured to include an automatic reference index generation section 251, an AMVP mode vector prediction section 252, and an M/S mode vector prediction section 253.

When the prediction mode is not the inter prediction mode, the merge mode or the skip mode and the merge index of the header information are supplied from the lossless decoding section 222 to the automatic reference index generation section 251.

The automatic reference index generation section 251 automatically generates a reference image index and supplies the generated reference image index (Ref index) and the merge index to the M/S mode vector prediction section 253 along with the merge mode or the skip mode from the lossless decoding section 222.

When the prediction mode is the inter prediction mode, the inter prediction mode (inter mode), a reference image index (Ref index), MV difference information (Mvd), and an index (MV index) of the predicted vector are supplied from the lossless decoding section 222 to the AMVP mode vector prediction section 252.

The AMVP mode vector prediction section 252 reads a candidate picture (inter prediction reference picture or inter-view prediction reference picture) corresponding to a reference image index from candidate pictures stored in the DPB 229-1 or 229-N according to the inter prediction mode.

The AMVP mode vector prediction section 252 generates a predicted vector for use in decoding of the MV based on the index of the predicted vector.

For example, when the index of the predicted vector indicates a spatially predicted vector, the AMVP mode vector prediction section 252 generates a predicted vector using spatially neighboring blocks adjacent thereto in the same picture. When the index of the predicted vector indicates a temporally predicted vector, the AMVP mode vector prediction section 252 generates a predicted vector by reading MVs of temporally neighboring blocks corresponding or adjacent thereto in pictures of different times of the same view from the MV memory 233-1. When the index of the predicted vector indicates an inter-view predicted vector, the AMVP mode vector prediction section 252 reads MVs of reference blocks (Cor PU of FIG. 1) in different views of the same time from the MV memory 233-N in which the MVs of the different views are stored, and generates a predicted vector.

The AMVP mode vector prediction section 252 recognizes the MV representing motion used in generation of the predicted image of the target block by adding MV difference information to the generated predicted vector. Then, the AMVP mode vector prediction section 252 generates a predicted image (pred. image) by performing motion compensation of the reference picture according to the MV. The generated predicted image is supplied to the predicted image selection section 232.

The M/S mode vector prediction section 253 reads a candidate picture (inter prediction reference picture) corresponding to the reference image index from candidate pictures stored in the DPB 229-1 or 229-N.

The M/S mode vector prediction section 253 generates the MV based on a merge index in the header information from the lossless decoding section 222.

For example, when the merge index indicates a spatially predicted vector, the M/S mode vector prediction section 253 generates an MV using spatially neighboring blocks adjacent thereto in the same picture. When the merge index indicates a temporally predicted vector, the M/S mode vector prediction section 253 generates an MV by reading MVs of corresponding blocks associated by MVs in pictures of different times of the same view from the MV memory 233-1. When the merge index indicates an inter-view predicted vector, the M/S mode vector prediction section 253 reads MVs of reference blocks (Cor PU of FIG. 1) in different views of the same time from the MV memory 233-N in which the MVs of the different views are stored and generates an MV. Information of the generated MV is temporarily saved in the spatial MV memory 262 of FIG. 16 as will be described later.

The M/S mode vector prediction section 253 generates a predicted image by performing the motion compensation of the reference picture according to the MV. The generated predicted image is supplied to the predicted image selection section 232.

[Configuration of AMVP Mode Vector Prediction Section]

FIG. 16 is a block diagram illustrating a configuration example of the AMVP mode vector prediction section of FIG. 15.

In the example of FIG. 16, the AMVP mode vector prediction section 252 is configured to include a predicted image generation section 261, a spatial MV memory 262, an addition section 263, predicted vector generation sections 264 and 265, a switch 266, and a POC transform section 267.

The predicted image generation section 261 inputs an MV generated by adding a predicted vector to the MV difference information by the addition section 263 via the spatial MV memory 262. The predicted image generation section 261 reads a reference image corresponding to a reference image index (Ref index) from the lossless decoding section 222 from the DPB 229-1 or 229-N, and generates a predicted image (pred. image) by performing the motion compensation of the read reference image according to the MV. The generated predicted image is supplied to the predicted image selection section 232.

The spatial MV memory 262 stores the MV generated by the addition section 263 as the candidate for use in generation of the predicted vector to be performed at a later time. In the spatial MV memory 262, the MV is stored in each unit (PU) of a block in which the MV is obtained. Also, the MV of the M/S mode is also stored in the spatial MV memory 262.

The addition section 263 generates the MV by inputting the predicted vector generated by the predicted vector generation section 264 or the predicted vector generation section 265 via the switch 266 and adding the input predicted vector to difference information of the MV supplied from the lossless decoding section 222. The addition section 263 causes the generated MV to be stored in the spatial MV memory 262.

The predicted vector generation section 264 generates a spatially predicted vector by reading the MV indicated by the index of the predicted vector supplied from the lossless decoding section 222 from the spatial MV memory 262. The predicted vector generation section 264 supplies the generated predicted vector to the addition section 263 via the switch 266.

The predicted vector generation section 265 generates a non-spatially (that is, TMVP or IVMP) predicted vector by reading the MV indicated by the index of the predicted vector supplied from the lossless decoding section 222 from the MV memory 233-1 or 233-N. The predicted vector generation section 265 supplies the generated predicted vector to the addition section 263 via the switch 266.

That is, when the index of the predicted vector indicates a temporally predicted vector, the predicted vector generation section 265 generates a predicted vector by reading MVs of corresponding blocks associated by MVs in pictures of different times of the same view from the MV memory 233-1. At this time, based on POC information from the POC transform section 267, scaling is performed on the MV of the corresponding block when the reference POC (Ref POC) of the target block is different from the reference POC (Ref POC) of the corresponding block. That is, the scaled MV serves as a predicted vector.

When the index of the predicted vector indicates an inter-view predicted vector, the AMVP mode vector prediction section 252 reads MVs of reference blocks (Cor PU of FIG. 1) in different views of the same time from the MV memory 233-N in which the MVs of the different views are stored and generates a predicted vector. At this time, based on POC information from the POC transform section 267, scaling is performed on the MV of the reference block when the reference POC (Ref POC) of the target block is different from a reference POC (Ref POC) of the reference block. That is, the scaled MV serves as the predicted vector.

The POC transform section 267 transforms the reference image index (Ref index) of the target block from the lossless decoding section 222 into a POC and supplies POC information indicating the POC obtained by the transform to the predicted vector generation section 265.

[Configuration Example of Non-Spatially Predicted Vector Generation Section]

Figure 17:
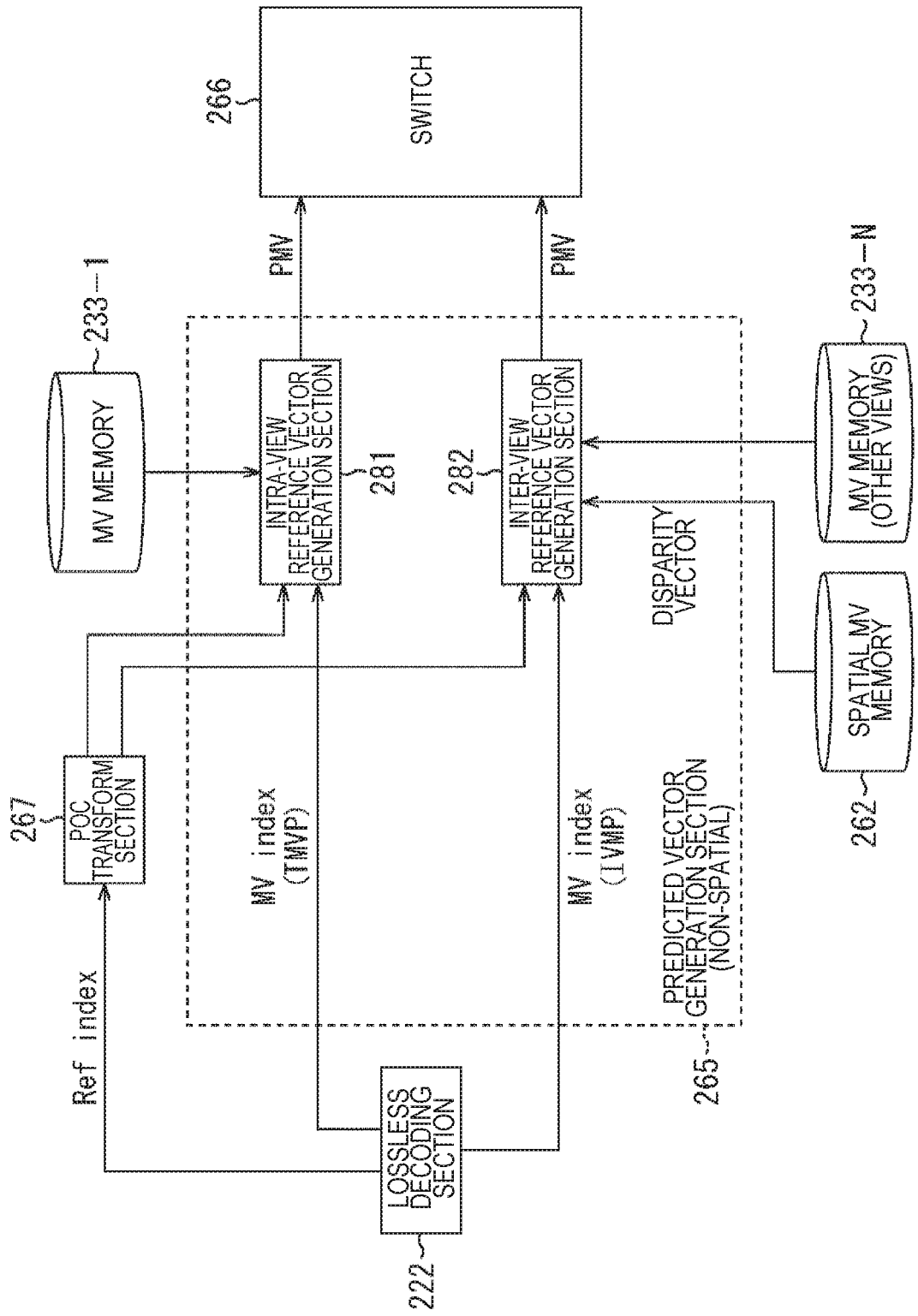
FIG. 17 is a block diagram illustrating a configuration example of a predicted vector generation section.

FIG. 17 is a block diagram illustrating a configuration example of a non-spatially predicted vector generation section of FIG. 16.

In the example of FIG. 16, the predicted vector generation section 265 is configured to include an intra-view reference vector generation section 281 and an inter-view reference vector generation section 282.

When the index of the predicted vector indicates a temporally (TMVP) predicted vector, the index (MV index) of the predicted vector is supplied from the lossless decoding section 222 to the intra-view reference vector generation section 281.

The intra-view reference vector generation section 281 generates a predicted vector by reading an MV of a corresponding block indicated by an index of the predicted vector, that is, associated by the MV, in pictures of different times of the same view from the MV memory 233-1.

Also, at this time, based on POC information from the POC transform section 267, scaling is performed on an MV of a corresponding block when the reference POC (Ref POC) of the target block is different from a reference POC (Ref POC) of the corresponding block. That is, the scaled MV serves as the predicted vector.

The intra-view reference vector generation section 281 supplies the generated predicted vector to the addition section 263 via the switch 266.

When the index of the predicted vector indicates a predicted vector of inter-view prediction (IVMP), the index (MV index) of the predicted vector is supplied from the lossless decoding section 222 to the inter-view reference vector generation section 282.

The inter-view reference vector generation section 282 generates a predicted vector by IVMP. The inter-view reference vector generation section 282 finds a disparity vector from MVs of neighboring blocks adjacent to the target block from the spatial MV memory 262 and obtains reference blocks in different views of the same time based on the found disparity vector. Then, the inter-view reference vector generation section 282 generates a predicted vector by reading an MV of the reference block indicated by the index of the predicted vector from the MV memory 233-N in which MVs of different views are stored.

Also, at this time, based on POC information from the POC transform section 267, scaling is performed on an MV of a reference block when the reference POC (Ref POC) of the target block is different from a reference POC (Ref POC) of the reference block. That is, the scaled MV serves as the predicted vector.

The inter-view reference vector generation section 282 supplies the generated predicted vector to the addition section 263 via the switch 266.

[Operation of Decoder]

Figure 18:
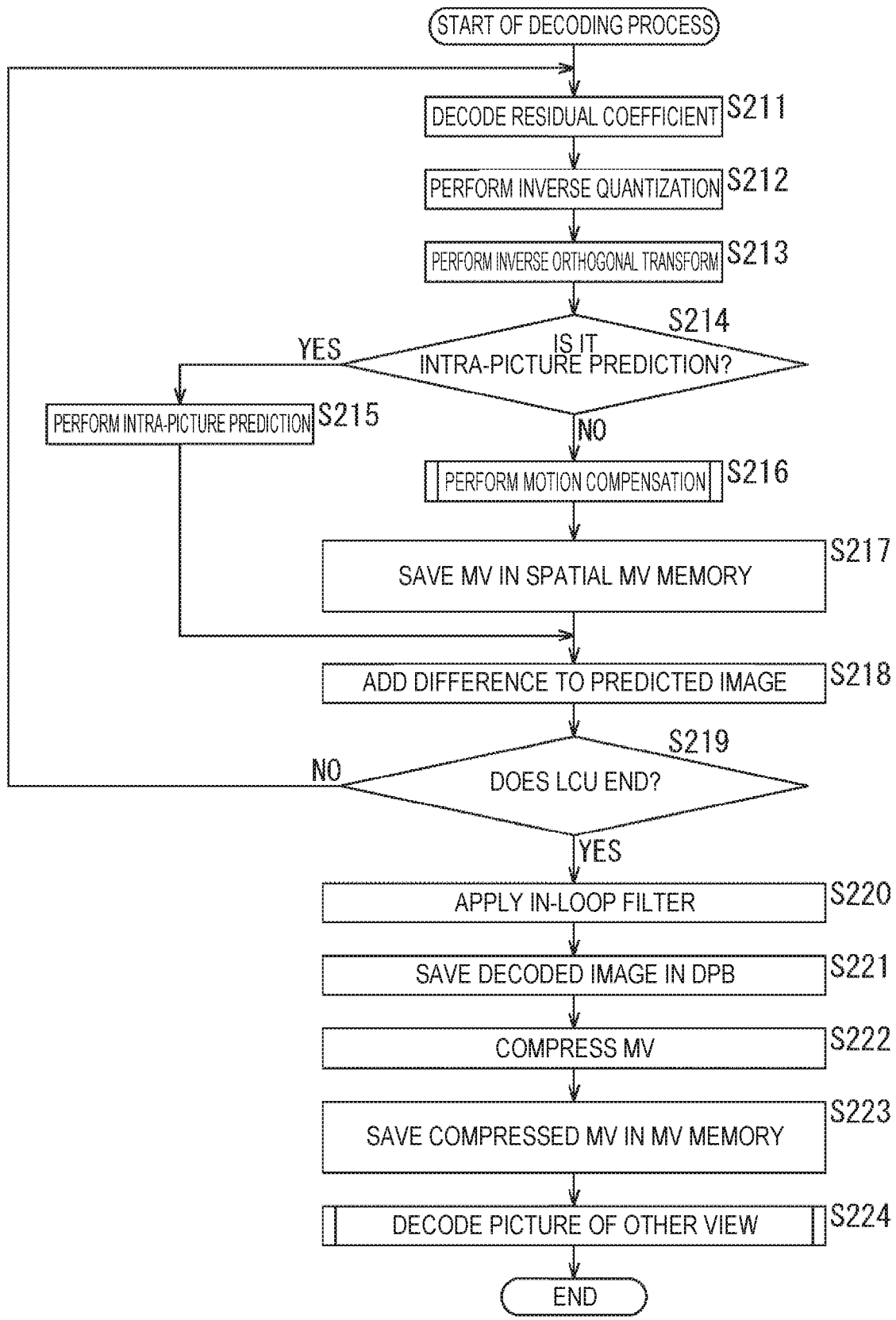
FIG. 18 is a flowchart illustrating an example of a flow of a decoding process.

Next, a decoding process of the decoder 211-1 of FIG. 14 will be described with reference to the flowchart of FIG. 18. Also, the decoders 211-N and 211-M for decoding images of other views perform similar decoding processes.

The accumulation buffer 221 temporarily stores encoded data corresponding to a received color image of a non-base view and supplies the stored encoded data to the lossless decoding section 222.

In step S211, the lossless decoding section 222 decodes a quantized residual coefficient of the encoded data from the accumulation buffer 221.

In step S212, the inverse quantization section 223 inversely quantizes the quantized residual coefficient from the lossless decoding section 222 into a transform coefficient and supplies the transform coefficient to the inverse orthogonal transform section 224.

In step S213, the inverse orthogonal transform section 224 performs an inverse orthogonal transform on the transform coefficient from the inverse quantization section 223 and supplies an inverse orthogonal transform result to the calculation section 225.

In step S214, the intra-picture prediction section 230 determines whether prediction for a target block (PU) is intra-picture prediction based on header information (intra prediction mode) from the lossless decoding section 222. When it is determined that the prediction is the intra-picture prediction in step S214, the process proceeds to step S215. In step S215, the intra-picture prediction section 230 performs the intra-picture prediction.

When it is determined that the prediction is not the intra-picture prediction in step S214, the process proceeds to step S216. In step S216, the motion compensation section 231 performs a motion compensation process. This motion compensation process will be described later with reference to FIG. 19.

In the process of step S216, a predicted vector according to the predicted vector index is generated when the motion prediction is a motion prediction mode and an MV is generated. In addition, a reference image according to the reference image index is read, motion compensation is performed according to the generated MV, and a predicted image is generated.

In the case of the M/S mode, an MV according to a merge index is generated, a reference image is read, motion compensation is performed according to the generated MV, and a predicted image is generated. The generated predicted image is supplied to the predicted image selection section 232.

In step S217, the motion compensation section 231 (addition section 263) saves the generated MV in the spatial MV memory 262.

When the predicted image is supplied from the intra-picture prediction section 230, the predicted image selection section 232 selects the predicted image and supplies the selected predicted image to the calculation section 225. When the predicted image is supplied from the motion compensation section 231, the predicted image selection section 232 selects the predicted image and supplies the selected predicted image to the calculation section 225.

In step S218, the calculation section 225 adds a block (difference) supplied from the inverse orthogonal transform section 224 to the predicted image supplied from the predicted image selection section 232. The calculation section 225 supplies a decoded image obtained as a result thereof to the in-loop filter 226.

In step S219, the in-loop filter 226 determines whether an LCU ends. When it is determined that the LCU does not end in step S219, the process returns to step S211 and the process subsequent thereto is iterated.

When it is determined that the LCU ends in step S219, the process proceeds to step S220. In step S220, the in-loop filter 226 removes (reduces) block distortion occurring in the decoded image by filtering the decoded image from the calculation section 225.

In step S221, the in-loop filter 226 saves the decoded image after the filtering in the DPB 229-1.

In step S222, the motion compensation section 231 compresses an MV saved in step S217. That is, for example, although one MV is saved for every (4×4) block in the spatial MV memory 262 as in the spatial MV memory 64 of FIG. 6, the MV is compressed so that one MV is saved for every (16×16) block. For example, an MV of an upper-left block is selected in the (16×16) block.

Then, the motion compensation section 231 saves the compressed MV in the MV memory 233-1.

In step S224, the decoder 211-M of the other view decodes a picture of the other view. Also, the decoding process is basically similar to the decoding process of FIG. 18.

As described above, the decoding process is performed.

[Example of Motion Compensation Process]

Figure 19:
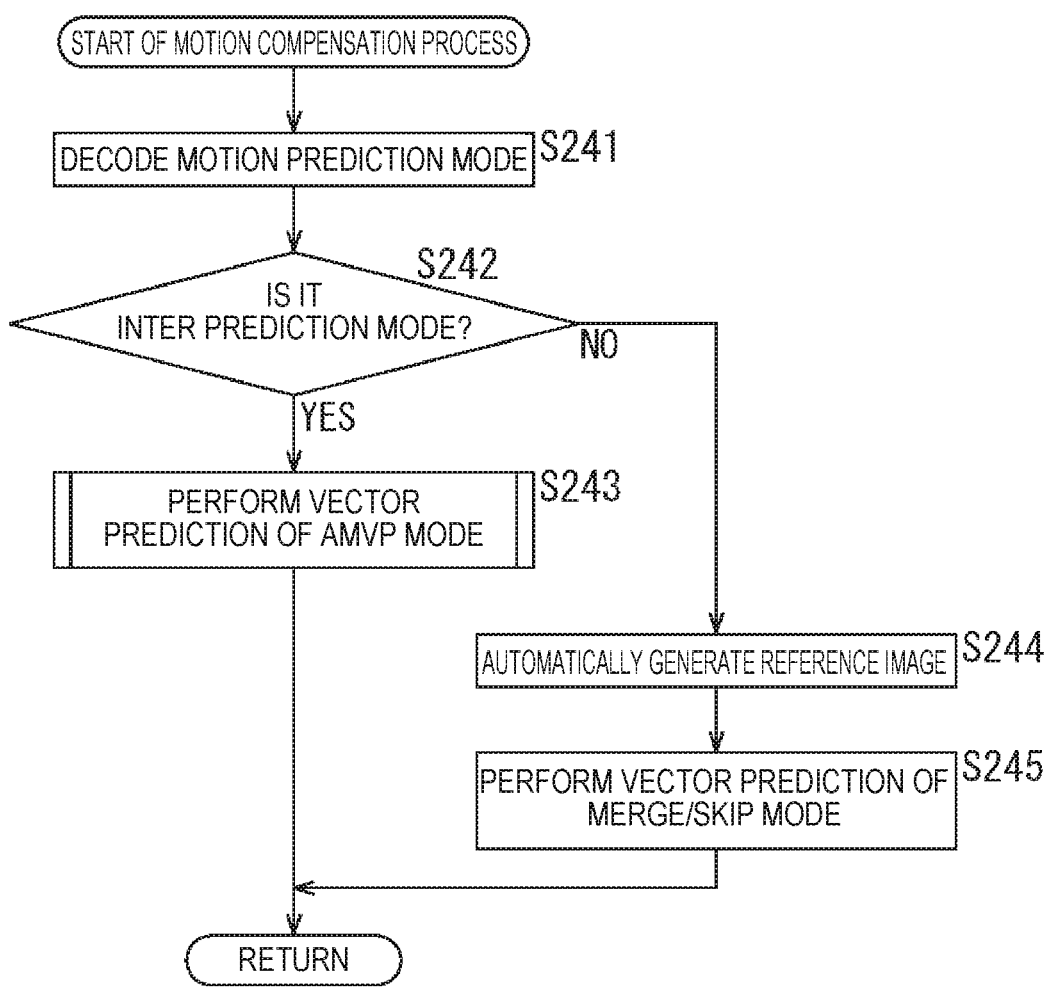
FIG. 19 is a flowchart illustrating a motion compensation process.

Next, the motion compensation process of step S216 of FIG. 18 will be described with reference to a flowchart of FIG. 19.

The lossless decoding section 222 decodes the motion prediction mode in the header information in step S241, and determines whether the prediction mode is an inter prediction mode in step S242.

When it is determined that the prediction mode is the inter prediction mode in step S242, the lossless decoding section 222 supplies the inter prediction mode (inter mode), a reference image index (Ref index), MV difference information (Mvd), and an index (MV index) of the predicted vector to the AMVP mode vector prediction section 252. Then, the process proceeds to step S243.

In step S243, the AMVP mode vector prediction section 252 performs vector prediction of the AMVP mode. The vector prediction process of the AMVP will be described later with reference to a flowchart of FIG. 20.

In the process of step S243, a predicted vector is generated according to an index of the predicted vector, an MV of a target block is generated by adding MV difference information to the generated predicted vector, and a predicted image is generated according to the generated MV. The generated predicted image is supplied to the predicted image selection section 232.

On the other hand, when it is determined that the mode is not the inter prediction mode in step S242, the lossless decoding section 222 supplies the merge mode or the skip mode and a merge index to the automatic reference index generation section 251. Then, the process proceeds to step S244.

In step S244, the automatic reference index generation section 251 automatically generates a reference image index and supplies the generated reference image index (Ref index) and merge index to the M/S mode vector prediction section 253 along with the merge mode or the skip mode from the lossless decoding section 222.

In step S245, the M/S mode vector prediction section 253 performs a vector prediction process of the merge mode or the skip mode. That is, the M/S mode vector prediction section 253 reads a candidate picture (inter prediction reference picture) corresponding to the reference image index from candidate pictures stored in the DPB 229-1 or 229-N.

The M/S mode vector prediction section 253 generates an MV based on a merge index in the header information from the lossless decoding section 222.

For example, when the merge index indicates a spatially predicted vector, the M/S mode vector prediction section 253 generates an MV using spatially neighboring blocks adjacent thereto in the same picture. When the merge index indicates a temporally predicted vector, the M/S mode vector prediction section 253 generates an MV by reading MVs of corresponding blocks associated by MVs in pictures of different times of the same view from the MV memory 233-1. When the merge index indicates an inter-view predicted vector, the M/S mode vector prediction section 253 reads MVs of reference blocks (Cor PU of FIG. 1) in different views of the same time from the MV memory 233-N in which the MVs of the different views are stored and generates an MV.

The M/S mode vector prediction section 253 generates a predicted image by performing motion compensation of a reference picture according to the MV. The generated predicted image is supplied to the predicted image selection section 232.

[Vector Prediction Process of AMVP Mode]

Next, the vector prediction process of the AMVP mode will be described with reference to a flowchart of FIG. 20.

In step S261, the lossless decoding section 222 decodes MV difference information (MVd) of the header information and supplies the decoded MV difference information to the addition section 263.

In step S262, the lossless decoding section 222 decodes a reference image index of the header information and supplies the decoded reference image index (Ref index) to the predicted image generation section 261 and the POC transform section 267.

In step S263, the lossless decoding section 222 decodes an index of a predicted vector of the header information.

In step S264, the lossless decoding section 222 refers to the predicted vector index decoded in step S263 and determines whether the predicted vector is spatial.

When it is determined that the predicted vector is spatial in step S264, the lossless decoding section 222 supplies the decoded predicted vector index to the predicted vector generation section 264. Then, the process proceeds to step S265.

In step S265, the predicted vector generation section 264 generates a spatially predicted vector. That is, the predicted vector generation section 264 generates the spatially predicted vector by reading an MV indicated by the index of the predicted vector supplied from the lossless decoding section 222 from the spatial MV memory 262. The predicted vector generation section 264 supplies the generated predicted vector to the addition section 263 via the switch 266.

When it is determined that the predicted vector is not spatial in step S264, the process proceeds to step S266.

In step S266, the predicted vector generation section 265 generates a non-spatially predicted vector. A process of generating the non-spatially predicted vector will be described later with reference to FIG. 21.

In the process of step S266, the index of the predicted vector is supplied from the lossless decoding section 222, an MV indicated by the index of the predicted vector is read from the MV memory 233-1 or 233-N, and a non-spatially (that is, TMVP or IVMP) predicted vector is generated. The generated predicted vector is supplied to the addition section 263 via the switch 266.

In step S267, the addition section 263 generates the MV. That is, the predicted vector generated by the predicted vector generation section 264 or 265 is input to the addition section 263 via the switch 266. The addition section 263 generates the MV by adding the input predicted vector to difference information of the MV supplied from the lossless decoding section 222.

In step S268, the addition section 263 accumulates the generated MV in the spatial MV memory 262. Also, at this time, the generated MV is also supplied to the predicted image generation section 261 via the spatial MV memory 262.

In step S269, the predicted image generation section 261 generates a predicted image (pred. image). That is, the predicted image generation section 261 reads a reference image corresponding to the reference image index (Ref index) from the lossless decoding section 222 from the DPB 229-1 or 229-N. According to the MV from the spatial MV memory 262, the predicted image generation section 261 generates a predicted image by performing motion compensation of a read reference image according to the MV from the spatial MV memory 262.

[Process of Generating Non-Spatially Predicted Vector]

Next, the process of generating the non-spatially predicted vector in step S266 of FIG. 20 will be described with reference to the flowchart of FIG. 21.

Figure 20:
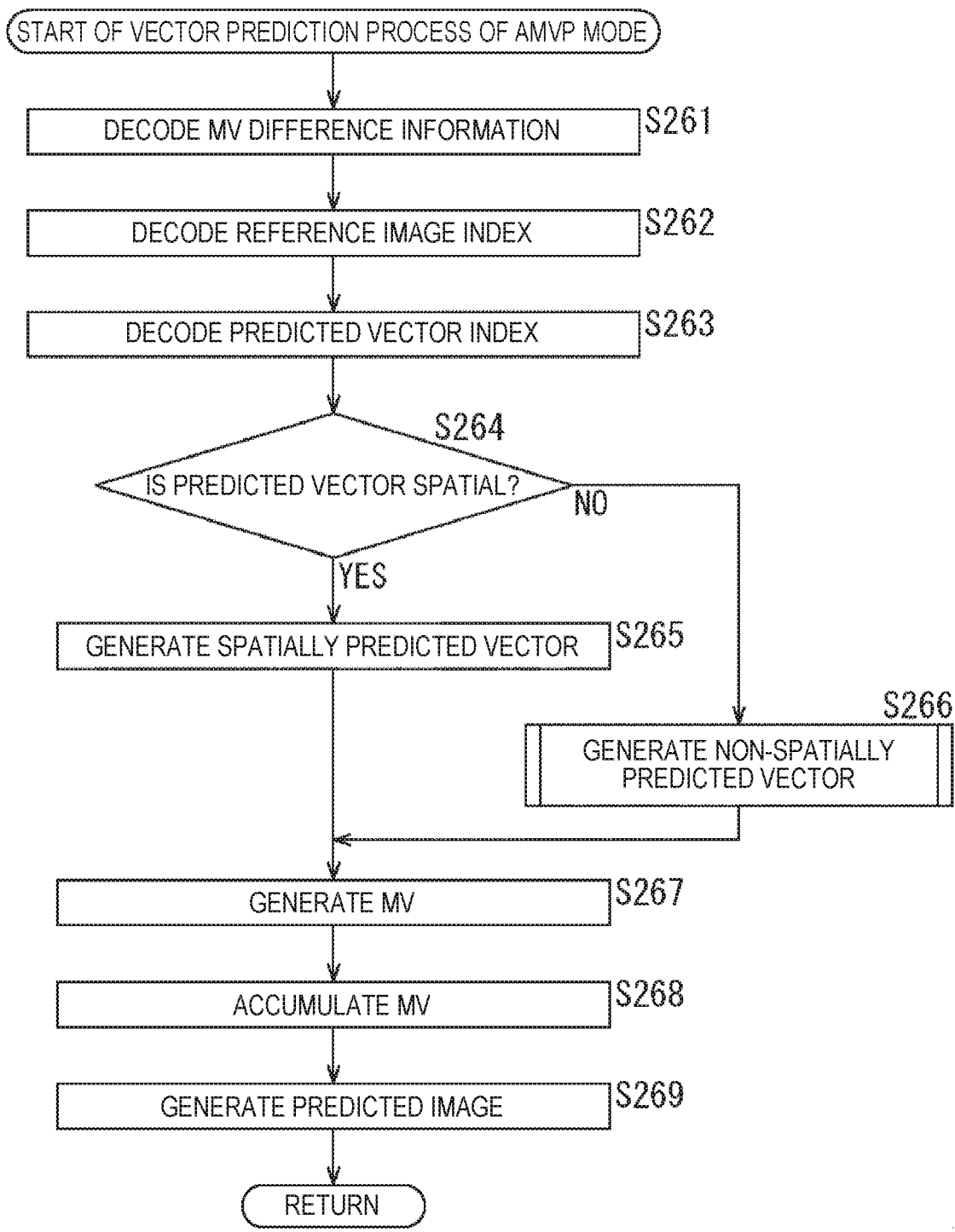
FIG. 20 is a flowchart illustrating a vector prediction process of the AMVP mode.
Figure 21:
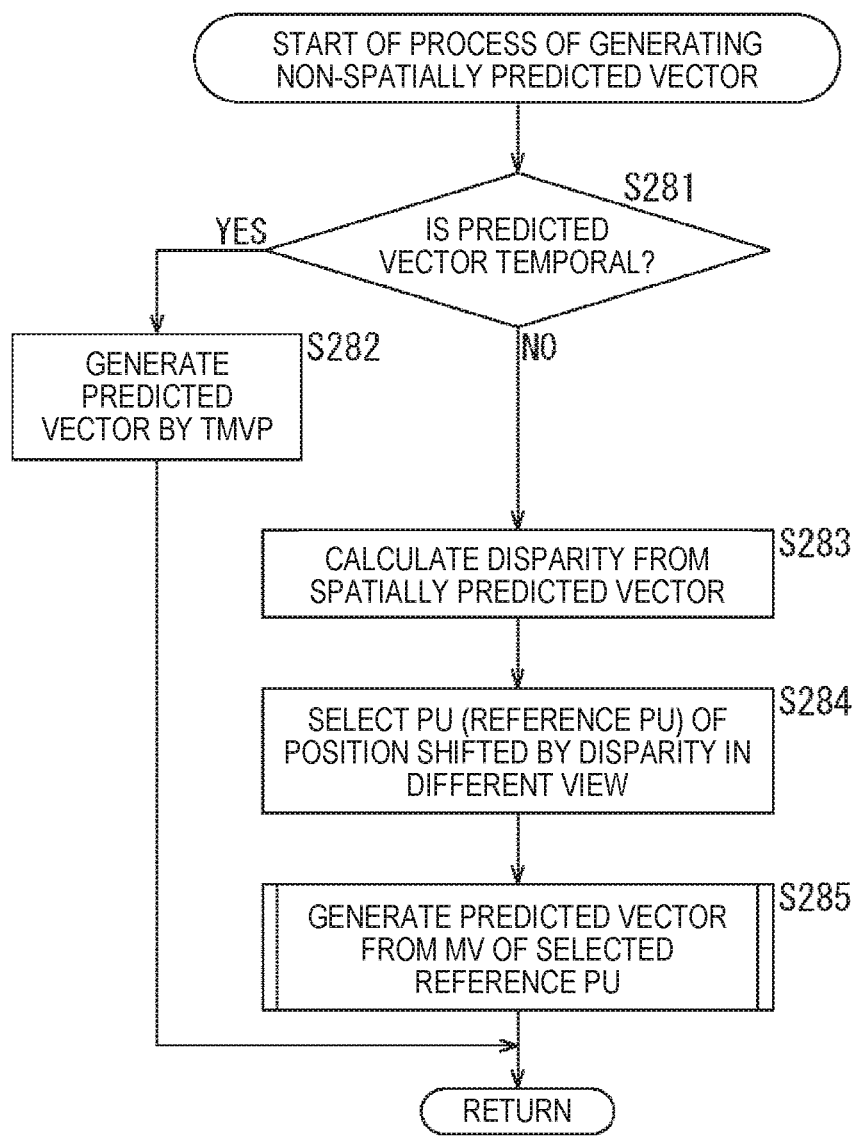
FIG. 21 is a flowchart illustrating a process of generating a non-spatially predicted vector.

In step S281, the lossless decoding section 222 refers to the index of the predicted vector decoded in step S263 of FIG. 20 and determines whether the predicted vector is temporal. When it is determined that the predicted vector is temporal in step S281, the lossless decoding section 222 supplies the index of the predicted vector to the intra-view reference vector generation section 281. Then, the process proceeds to step S282.

In step S282, the intra-view reference vector generation section 281 generates a predicted vector by the TMVP. That is, the intra-view reference vector generation section 281 generates the predicted vector by reading an MV of a corresponding block indicated by the index of the predicted vector, that is, associated by the MV, in pictures of different times of the same view from the MV memory 233-1. The generated predicted vector is supplied to the addition section 263 via the switch 266.

When it is determined that the predicted vector is not temporal in step S281, the lossless decoding section 222 supplies the index of the predicted vector to the inter-view reference vector generation section 282. Then, the process proceeds to step S283.

In step S283 to S285, the inter-view reference vector generation section 282 generates a predicted vector by IVMP.

That is, in step S283, the inter-view reference vector generation section 282 finds a disparity vector from MVs of neighboring blocks adjacent to the target block (PU) from the spatial MV memory 262 and calculates a disparity based on the found disparity vector.

In step S284, the inter-view reference vector generation section 282 selects a PU of a position shifted by the disparity obtained in step S283 as the reference PU in a different view.

In step S285, the inter-view reference vector generation section 282 generates a predicted vector from an MV of a selected reference PU by reading the MV of the selected reference PU from the MV memory 233-N in which MVs of the different views are stored. Because the predicted vector generation process is basically the same process as the predicted vector generation process described above with reference to FIGS. 12 and 13, redundant description thereof is omitted.

That is, it is determined whether the reference POC (Ref POC) of the target block is different from a reference POC (Ref POC) of a reference block based on POC information from the POC transform section 267 in step S285. When it is determined that the Ref POCs are different, scaling is performed on the MV of the reference block. That is, when it is determined that the Ref POCs are different, an MV of the reference block is scaled and a predicted vector is generated.

In the process of step S285, the predicted vector of the generated IVMP is supplied to the vector cost determination section 63 and the subtraction section 68 via the switch 67 along with an MV index indicating the predicted vector.

As described above, even when the reference POC (Ref POC) of the target block is different from a reference POC (Ref POC) of a reference block in a different view, it is possible to designate a scaled MV as a predicted vector by scaling the MV of the reference block. That is, the MV of the reference block of the different view can also be designated as the candidate of the predicted vector. Therefore, there is a significant effect in the improvement of encoding efficiency because MVs having a high correlation can be scaled and used.

Also, although the case of the AMVP mode has been described above in detail, the present technology is also applicable to the merge mode. Also, in the case of the merge mode, as in the case of the TMVP, the Ref index is fixed to 0 and the MV of the reference PU is scaled when the Ref POC of the reference PU of the base view is different from the Ref POC of the current PU and the scaled MV serves as a predicted vector.

In this case, a processing circuit of the TMVP and the IVMP can be made common.

In addition, an example in which an inter-MV of the reference block shifted by a disparity indicated by a disparity vector of a block adjacent to the target block is used after being scaled in the time direction according to the POC in a different view from the target block when the predicted vector of the inter-MV of the target block is obtained has been described above.

On the other hand, the present technology is also applicable when the inter-view MV is used as the predicted vector. That is, when an MV of a corresponding block of a different time corresponding to a target block of a certain time is an inter-view MV indicating a different view from the target block, the MV of the corresponding block is scaled according to a view id and the scaled MV can be used as a predicted vector of the target block.

As described above, the HEVC scheme is configured to be used as the encoding scheme in the base. However, the present disclosure is not limited thereto. It is possible to apply other encoding/decoding schemes.

Also, the present disclosure, for example, is applicable to an image encoding device and an image decoding device to be used when image information (bitstream) compressed by an orthogonal transform such as a discrete cosine transform and motion compensation as in the HEVC scheme or the like is received via network media such as satellite broadcasting, a cable television, the Internet, and a mobile phone. In addition, the present disclosure is applicable to an image encoding device and an image decoding device to be used when processing is performed on storage media such as an optical disc, a magnetic disc and a flash memory.

Also, the present technology is applicable, for example, to HTTP streaming such as MPEG DASH for selecting and using appropriate encoded data from a plurality of pieces of encoded data in which prepared resolutions and the like are different from each other in units of segments.

4. Third Embodiment

[Configuration Example of Computer]

The above described series of processes can be executed by hardware or can be executed by software. When the series of processes are to be performed by software, the programs forming the software are installed into a computer. Here, a computer includes a computer which is incorporated in dedicated hardware or a general-purpose personal computer (PC) which can execute various functions by installing various programs into the computer, for example.

Figure 22:
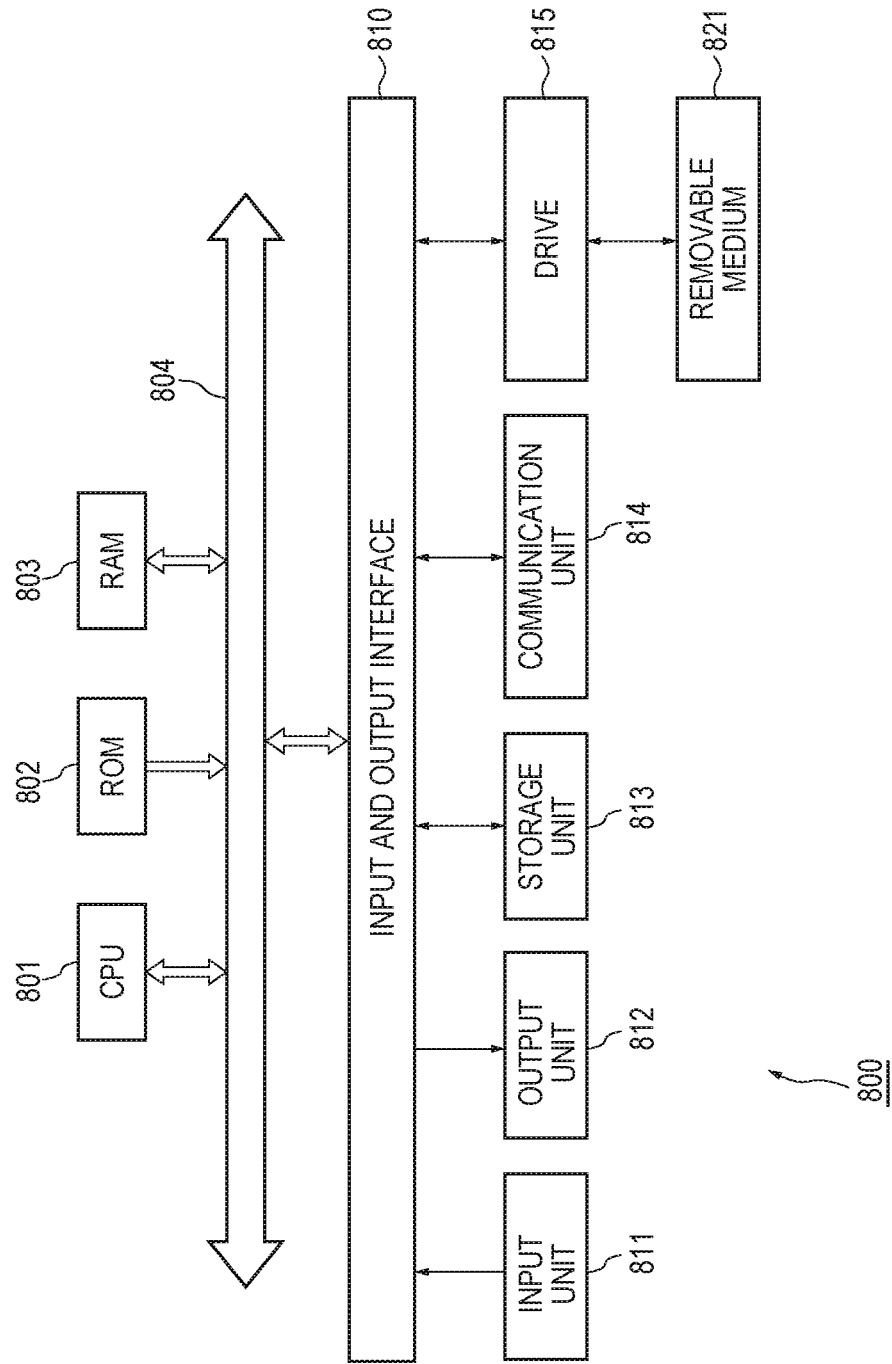
FIG. 22 is a block diagram illustrating a main configuration example of a computer.

FIG. 22 is a block diagram illustrating a configuration example of hardware of a computer for executing the above-described series of processes through a program.

In a computer 800, a central processing unit (CPU) 801, a read only memory (ROM) 802, and a random access memory (RAM) 803 are connected to one another by a bus 804.

An input and output interface (I/F) 810 is further connected to the bus 804. An input section 811, an output section 812, a storage section 813, a communication section 814, and a drive 815 are connected to the input and output I/F 805.

The input section 811 is formed with a keyboard, a mouse, a microphone, and the like. The output section 812 is formed with a display, a speaker, and the like. The storage section 813 is formed with a hard disk, a nonvolatile memory, or the like. The communication section 814 is formed with a network interface or the like. The drive 815 drives a removable medium 821 such as a magnetic disk, an optical disk, a magneto-optical disk, or a semiconductor memory.

In the computer configured as described above, the CPU 801 loads the programs stored in the storage section 813 into the RAM 803 via the input and output I/F 810 and the bus 804, and executes the programs, so that the above described series of processes are performed.

The program executed by the computer 800 (the CPU 801) may be provided by being recorded on the removable medium 821 as a packaged medium or the like. The program can also be provided via a wired or wireless transfer medium, such as a local area network, the Internet, or a digital satellite broadcast.

In the computer, by loading the removable medium 821 into the drive 815, the program can be installed into the storage section 813 via the input and output I/F 810. It is also possible to receive the program from a wired or wireless transfer medium using the communication section 814 and install the program into the storage section 813. As another alternative, the program can be installed in advance into the ROM 802 or the storage section 813.

It should be noted that the program executed by a computer may be a program that is processed in time series according to the sequence described in this specification or a program that is processed in parallel or at necessary timing such as upon calling.

In the present disclosure, steps of describing the program to be recorded on the recording medium may include processing performed in time-series according to the description order and processing not processed in time-series but performed in parallel or individually.

In the specification, the system refers to the entire apparatus including a plurality of devices (apparatuses).

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

The image encoding device and the image decoding device according to the embodiment may be applied to various electronic devices such as transmitters and receivers for satellite broadcasting, cable broadcasting such as cable TV, distribution on the Internet, distribution to terminals via cellular communication and the like, recording devices that record images in a medium such as optical discs, magnetic disks and flash memory, and reproduction devices that reproduce images from such storage medium. Four applications will be described below.

5. Applications

[First Application: Television Receivers]

Figure 23:
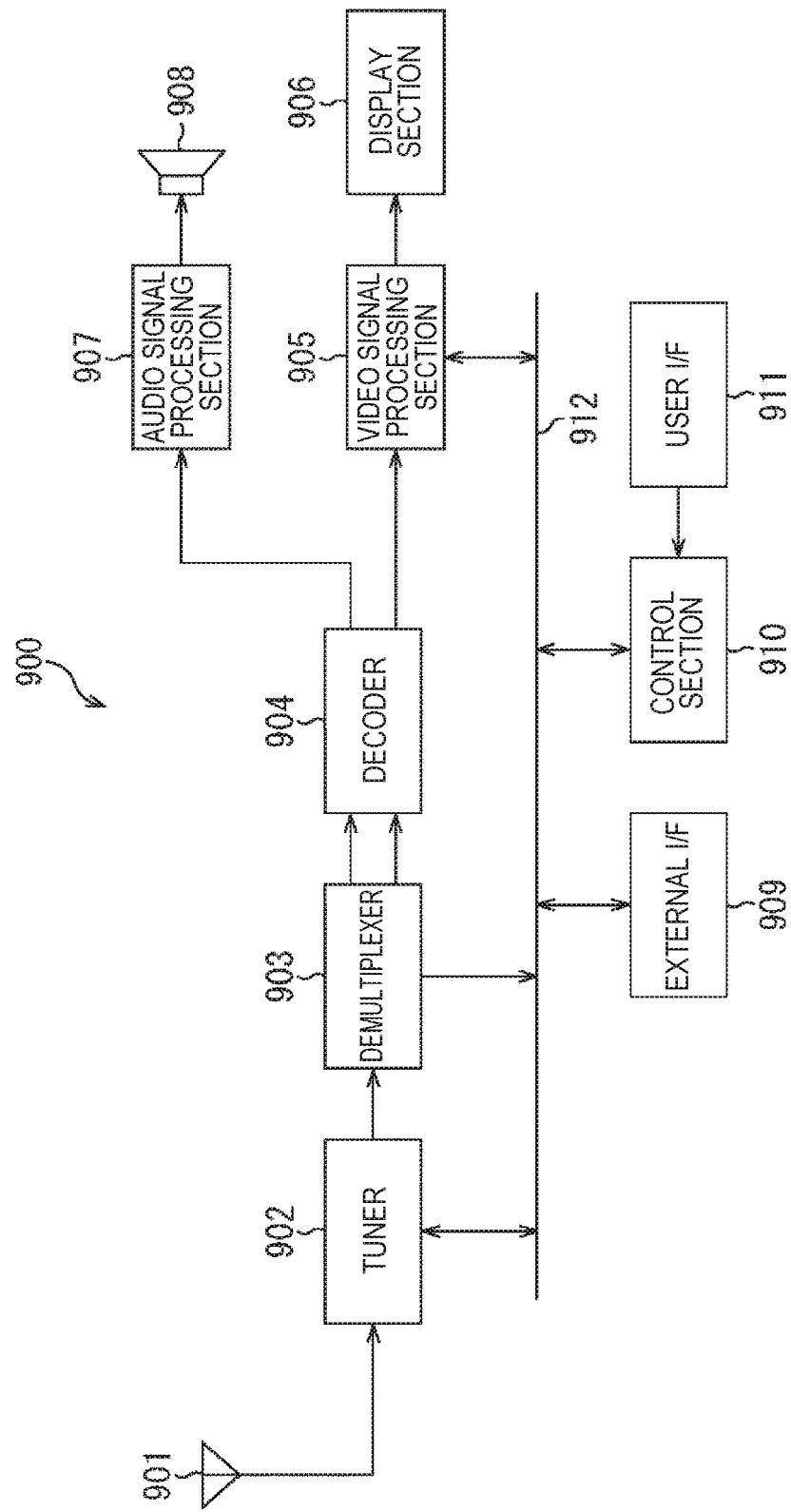
FIG. 23 is a block diagram illustrating an example of a schematic configuration of a television device.

FIG. 23 illustrates an example of a schematic configuration of a television device to which the embodiment is applied. A television device 900 includes an antenna 901, a tuner 902, a demultiplexer 903, a decoder 904, an video signal processing section 905, a display section 906, an audio signal processing section 907, a speaker 908, an external I/F 909, a control section 910, a user I/F 911, and a bus 912.

The tuner 902 extracts a signal of a desired channel from broadcast signals received via the antenna 901, and demodulates the extracted signal. The tuner 902 then outputs an encoded bit stream obtained through the demodulation to the demultiplexer 903. That is, the tuner 902 serves as a transmission means of the television device 900 for receiving an encoded stream in which an image is encoded.

The demultiplexer 903 demultiplexes the encoded bit stream to obtain a video stream and an audio stream of a program to be viewed, and outputs each stream obtained through the demultiplexing to the decoder 904. The demultiplexer 903 also extracts auxiliary data such as electronic program guides (EPGs) from the encoded bit stream, and supplies the extracted data to the control section 910. Additionally, the demultiplexer 903 may perform descrambling when the encoded bit stream has been scrambled.

The decoder 904 decodes the video stream and the audio stream input from the demultiplexer 903. The decoder 904 then outputs video data generated in the decoding process to the video signal processing section 905. The decoder 904 also outputs the audio data generated in the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal (suppression), for example, on the video data in accordance with the setting. Furthermore, the video signal processing section 905 may generate an image of a graphical user I/F (GUI) such as a menu, a button and a cursor, and superimpose the generated image on an output image.

The display section 906 is driven by a drive signal supplied from the video signal processing section 905, and displays a video or an image on a video screen of a display device (e.g. liquid crystal display, plasma display, organic electroluminescence display (OLED), etc.).

The audio signal processing section 907 performs a reproduction process such as D/A conversion and amplification on the audio data input from the decoder 904, and outputs a sound from the speaker 908. The audio signal processing section 907 may also perform an additional process such as noise removal (suppression) on the audio data.

The external I/F 909 is an I/F for connecting the television device 900 to an external device or a network. For example, a video stream or an audio stream received via the external I/F 909 may be decoded by the decoder 904. That is, the external I/F 909 also serves as a transmission means of the television device 900 for receiving an encoded stream in which an image is encoded.

The control section 910 includes a processor such as a central processing unit (CPU), and a memory such as random access memory (RAM) and read only memory (ROM). The memory stores a program to be executed by the CPU, program data, EPG data, data acquired via a network, and the like. The program stored in the memory is read out and executed by the CPU at the time of activation of the television device 900, for example. The CPU controls the operation of the television device 900, for example, in accordance with an operation signal input from the user I/F 911 by executing the program.

The user I/F 911 is connected to the control section 910. The user I/F 911 includes, for example, a button and a switch used for a user to operate the television device 900, and a receiving section for a remote control signal. The user I/F 911 detects an operation of a user via these structural elements, generates an operation signal, and outputs the generated operation signal to the control section 910.

The bus 912 connects the tuner 902, the demultiplexer 903, the decoder 904, the video signal processing section 905, the audio signal processing section 907, the external I/F 909, and the control section 910 to each other.

The decoder 904 has a function of the image decoding device 60 according to the embodiment in the television device 900 configured in this manner. It is possible to improve the encoding efficiency of encoding or decoding of an MV in a multi-view image.

[Second Application: Mobile Phones]

Figure 24:
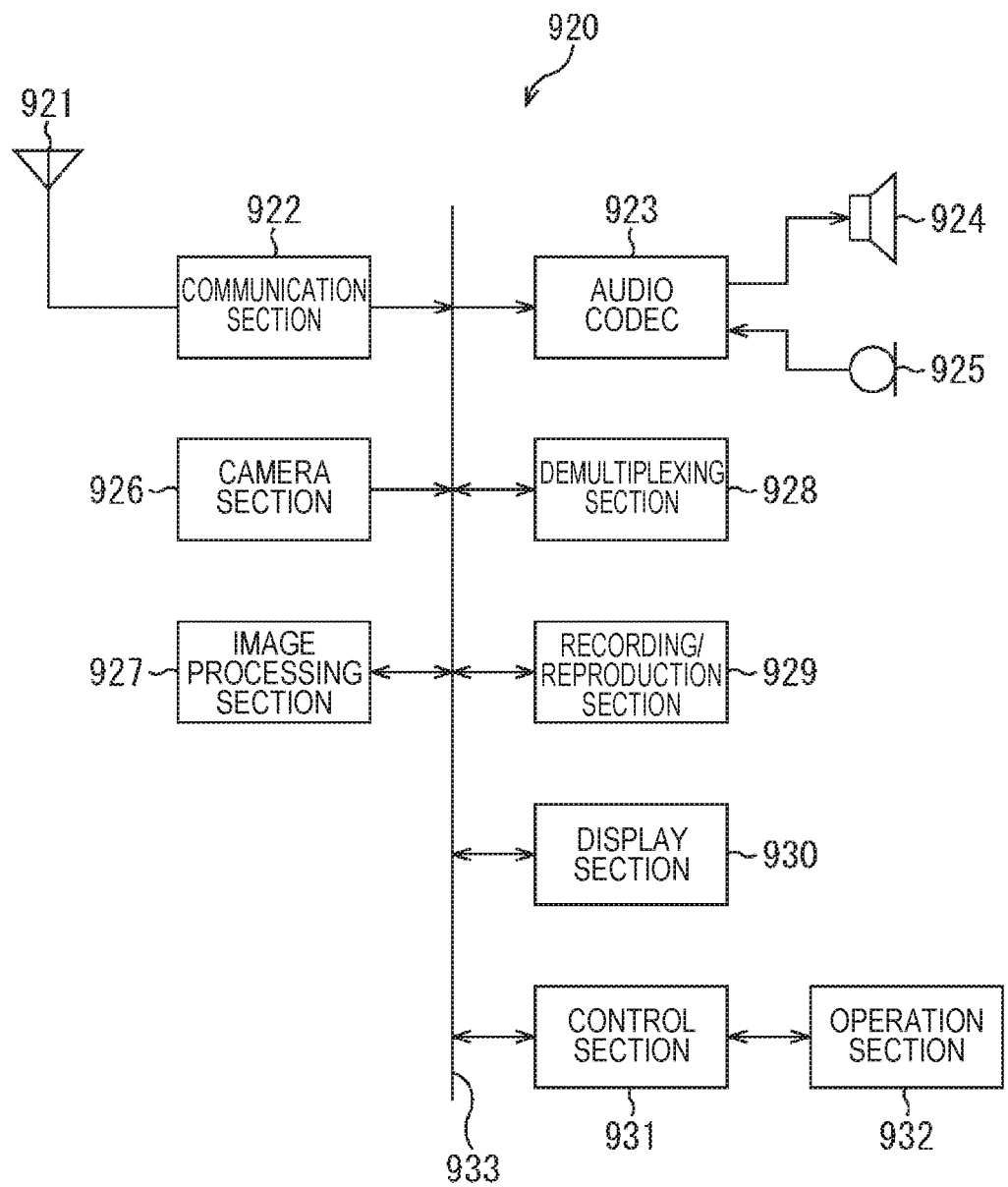
FIG. 24 is a block diagram illustrating an example of a schematic configuration of a mobile phone.

FIG. 24 illustrates an example of a schematic configuration of a mobile phone to which the embodiment is applied. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs an operation such as transmission and reception of an audio signal, transmission and reception of email or image data, image capturing, and recording of data in various operation modes including an audio call mode, a data communication mode, an image capturing mode, and a videophone mode.

An analogue audio signal generated by the microphone 925 is supplied to the audio codec 923 in the audio call mode. The audio codec 923 converts the analogue audio signal into audio data, has the converted audio data subjected to the A/D conversion, and compresses the converted data. The audio codec 923 then outputs the compressed audio data to the communication section 922. The communication section 922 encodes and modulates the audio data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal, generates audio data, and outputs the generated audio data to the audio codec 923. The audio codec 923 extends the audio data, has the audio data subjected to the D/A conversion, and generates an analogue audio signal. The audio codec 923 then supplies the generated audio signal to the speaker 924 to output a sound.

The control section 931 also generates text data in accordance with an operation made by a user via the operation section 932, the text data, for example, composing email. Moreover, the control section 931 causes the display section 930 to display the text. Furthermore, the control section 931 generates email data in accordance with a transmission instruction from a user via the operation section 932, and outputs the generated email data to the communication section 922. The communication section 922 encodes and modulates the email data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal to restore the email data, and outputs the restored email data to the control section 931. The control section 931 causes the display section 930 to display the content of the email, and also causes the storage medium of the recording/reproduction section 929 to store the email data.

The recording/reproduction section 929 includes a readable and writable storage medium. For example, the storage medium may be a built-in storage medium such as RAM and flash memory, or an externally mounted storage medium such as hard disks, magnetic disks, magneto-optical disks, optical discs, unallocated space bitmap (USB) memory, and memory cards.

Furthermore, the camera section 926, for example, captures an image of a subject to generate image data, and outputs the generated image data to the image processing section 927 in the image capturing mode. The image processing section 927 encodes the image data input from the camera section 926, and causes the storage medium of the storage/reproduction section 929 to store the encoded stream.

Furthermore, the demultiplexing section 928, for example, multiplexes a video stream encoded by the image processing section 927 and an audio stream input from the audio codec 923, and outputs the multiplexed stream to the communication section 922 in the videophone mode. The communication section 922 encodes and modulates the stream, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. These transmission signal and received signal may include an encoded bit stream. The communication section 922 then demodulates and decodes the received signal to restore the stream, and outputs the restored stream to the demultiplexing section 928. The demultiplexing section 928 demultiplexes the input stream to obtain a video stream and an audio stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends the audio stream, has the audio stream subjected to the D/A conversion, and generates an analogue audio signal. The audio codec 923 then supplies the generated audio signal to the speaker 924, and causes a sound to be output.

The image processing section 927 has a function of the image encoding device and the image decoding device according to the embodiment in the mobile phone 920 configured in this manner. It is possible to improve the encoding efficiency of encoding or decoding of an MV in a multi-view image.

[Third Application: Recording/Reproduction Device]

Figure 25:
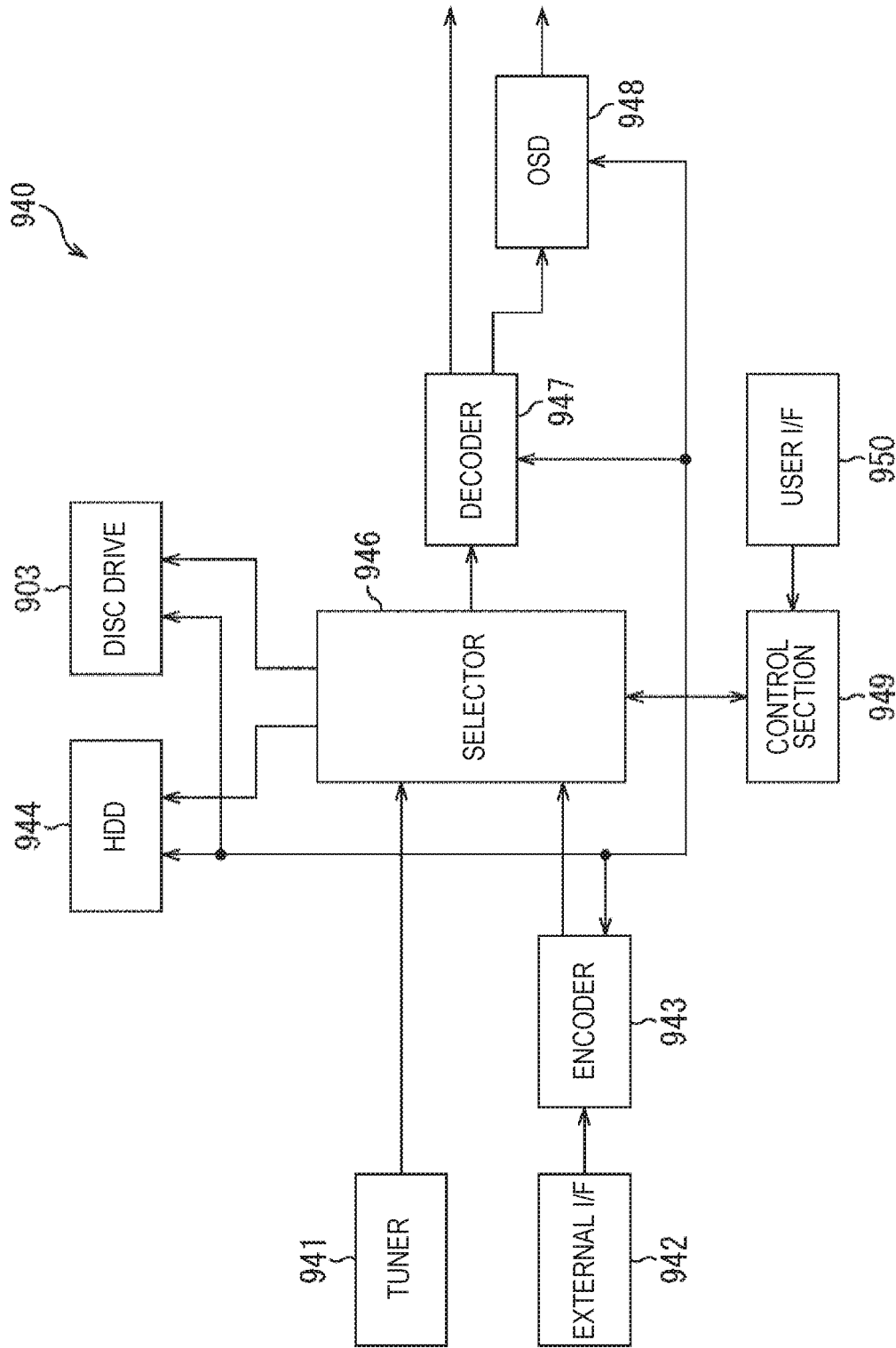
FIG. 25 is a block diagram illustrating an example of a schematic configuration of a recording/reproduction device.

FIG. 25 illustrates an example of a schematic configuration of a recording/reproduction device to which the embodiment is applied. A recording/reproduction device 940, for example, encodes audio data and video data of a received broadcast program and records the encoded audio data and the encoded video data in a recording medium. For example, the recording/reproduction device 940 may also encode audio data and video data acquired from another device and record the encoded audio data and the encoded video data in a recording medium. Furthermore, the recording/reproduction device 940, for example, uses a monitor or a speaker to reproduce the data recorded in the recording medium in accordance with an instruction of a user. At this time, the recording/reproduction device 940 decodes the audio data and the video data.

The recording/reproduction device 940 includes a tuner 941, an external I/F 942, an encoder 943, a hard disk drive (HDD) 944, a disc drive 945, a selector 946, a decoder 947, an on-screen display (OSD) 948, a control section 949, and a user I/F 950.

The tuner 941 extracts a signal of a desired channel from broadcast signals received via an antenna (not shown), and demodulates the extracted signal. The tuner 941 then outputs an encoded bit stream obtained through the demodulation to the selector 946. That is, the tuner 941 serves as a transmission means of the recording/reproduction device 940.

The external I/F 942 is an I/F for connecting the recording/reproduction device 940 to an external device or a network. For example, the external I/F 942 may be an Institute of Electrical and Electronics Engineers (IEEE) 1394 I/F, a network I/F, an USB I/F, a flash memory I/F, or the like. For example, video data and audio data received via the external I/F 942 are input to the encoder 943. That is, the external I/F 942 serves as a transmission means of the recording/reproduction device 940.

When the video data and the audio data input from the external I/F 942 have not been encoded, the encoder 943 encodes the video data and the audio data. The encoder 943 then outputs an encoded bit stream to the selector 946.

The HDD 944 records, in an internal hard disk, the encoded bit stream in which content data of a video and a sound is compressed, various programs, and other pieces of data. The HDD 944 also reads out these pieces of data from the hard disk at the time of reproducing a video or a sound.

The disc drive 945 records and reads out data in a recording medium that is mounted. The recording medium that is mounted on the disc drive 945 may be, for example, a DVD disc (DVD-Video, DVD-RAM, DVD-R, DVD-RW, a DVD+R, DVD+RW, etc.), a Blu-ray (registered trademark) disc, or the like.

The selector 946 selects, at the time of recording a video or a sound, an encoded bit stream input from the tuner 941 or the encoder 943, and outputs the selected encoded bit stream to the HDD 944 or the disc drive 945. The selector 946 also outputs, at the time of reproducing a video or a sound, an encoded bit stream input from the HDD 944 or the disc drive 945 to the decoder 947.

The decoder 947 decodes the encoded bit stream, and generates video data and audio data. The decoder 947 then outputs the generated video data to the OSD 948. The decoder 904 also outputs the generated audio data to an external speaker.

The OSD 948 reproduces the video data input from the decoder 947, and displays a video. The OSD 948 may also superimpose an image of a GUI such as a menu, a button, and a cursor on a displayed video.

The control section 949 includes a processor such as a CPU, and a memory such as RAM and ROM. The memory stores a program to be executed by the CPU, program data, and the like. For example, a program stored in the memory is read out and executed by the CPU at the time of activation of the recording/reproduction device 940. The CPU controls the operation of the recording/reproduction device 940, for example, in accordance with an operation signal input from the user I/F 950 by executing the program.

The user I/F 950 is connected to the control section 949. The user I/F 950 includes, for example, a button and a switch used for a user to operate the recording/reproduction device 940, and a receiving section for a remote control signal. The user I/F 950 detects an operation made by a user via these structural elements, generates an operation signal, and outputs the generated operation signal to the control section 949.

The encoder 943 has a function of the image encoding device according to the embodiment in the recording/reproduction device 940 configured in this manner. The decoder 947 also has a function of the image decoding device according to the embodiment. It is possible to improve the encoding efficiency of encoding or decoding of an MV in a multi-view image.

[Fourth Application: Image Capturing Device]

Figure 26:
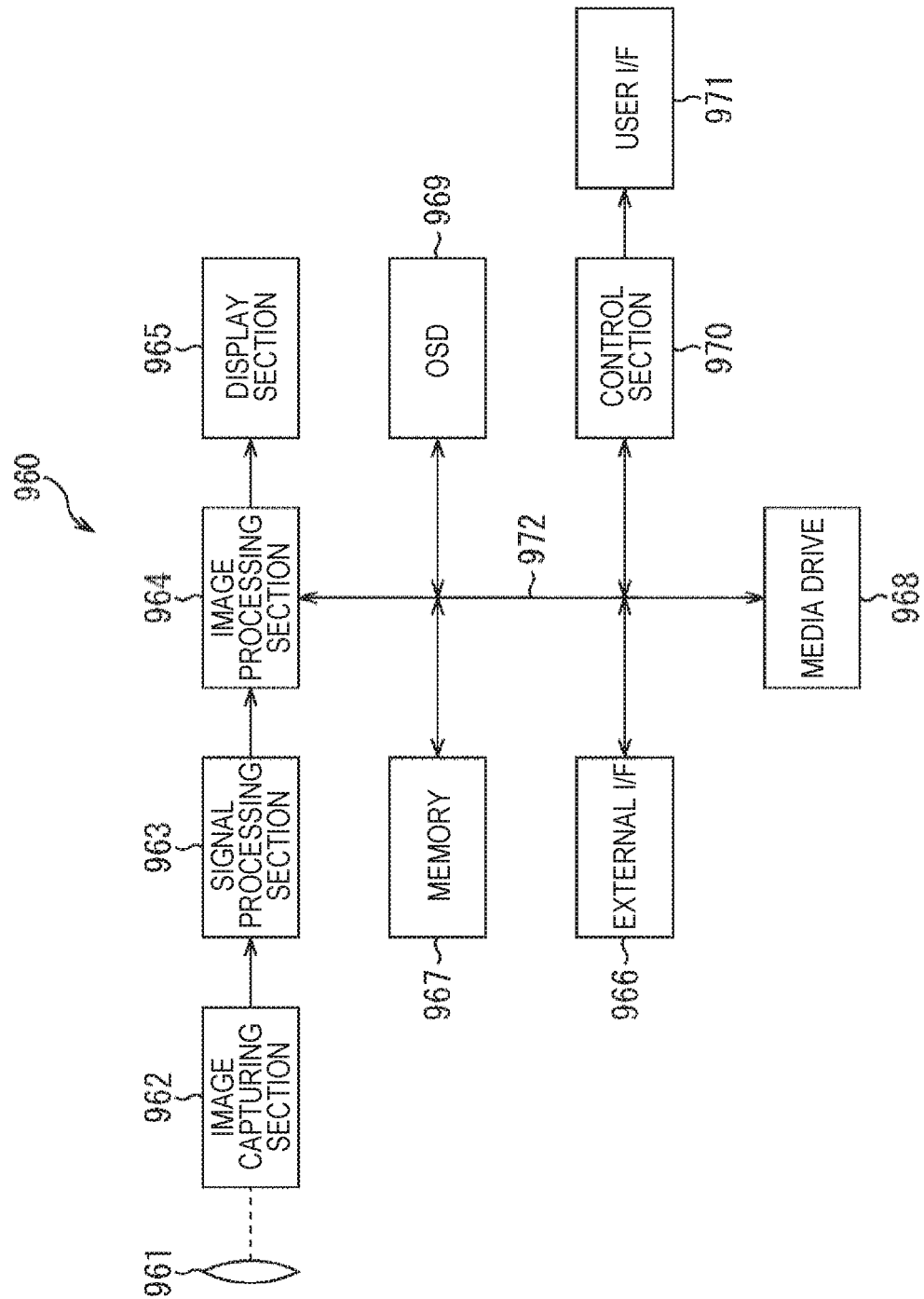
FIG. 26 is a block diagram illustrating an example of a schematic configuration of an image capturing device.

FIG. 26 illustrates an example of a schematic configuration of an image capturing device to which the embodiment is applied. An image capturing device 960 captures an image of a subject to generate an image, encodes the image data, and records the image data in a recording medium.

The image capturing device 960 includes an optical block 961, an image capturing section 962, a signal processing section 963, an image processing section 964, a display section 965, an external I/F 966, a memory 967, a media drive 968, an OSD 969, a control section 970, a user I/F 971, and a bus 972.

The optical block 961 is connected to the image capturing section 962. The image capturing section 962 is connected to the signal processing section 963. The display section 965 is connected to the image processing section 964. The user I/F 971 is connected to the control section 970. The bus 972 connects the image processing section 964, the external I/F 966, the memory 967, the media drive 968, the OSD 969, and the control section 970 to each other.

The optical block 961 includes a focus lens, an aperture stop mechanism, and the like. The optical block 961 forms an optical image of a subject on an image capturing surface of the image capturing section 962. The image capturing section 962 includes an image sensor such as a charge coupled device (CCD) and a complementary metal oxide semiconductor (CMOS), and converts the optical image formed on the image capturing surface into an image signal which is an electrical signal through photoelectric conversion. The image capturing section 962 then outputs the image signal to the signal processing section 963.

The signal processing section 963 performs various camera signal processes such as knee correction, gamma correction, and color correction on the image signal input from the image capturing section 962. The signal processing section 963 outputs the image data subjected to the camera signal process to the image processing section 964.

The image processing section 964 encodes the image data input from the signal processing section 963, and generates encoded data. The image processing section 964 then outputs the generated encoded data to the external I/F 966 or the media drive 968. The image processing section 964 also decodes encoded data input from the external I/F 966 or the media drive 968, and generates image data. The image processing section 964 then outputs the generated image data to the display section 965. The image processing section 964 may also output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI such as a menu, a button, and a cursor, and outputs the generated image to the image processing section 964.

The external I/F 966 is configured, for example, as an USB input and output terminal. The external I/F 966 connects the image capturing device 960 and a printer, for example, at the time of printing an image. A drive is further connected to the external I/F 966 as needed. A removable medium such as magnetic disks and optical discs is mounted on the drive, and a program read out from the removable medium may be installed in the image capturing device 960. Furthermore, the external I/F 966 may be configured as a network I/F to be connected to a network such as a LAN and the Internet. That is, the external I/F 966 serves as a transmission means of the image capturing device 960.

A recording medium to be mounted on the media drive 968 may be a readable and writable removable medium such as magnetic disks, magneto-optical disks, optical discs, and semiconductor memory. The recording medium may also be fixedly mounted on the media drive 968, configuring a non-transportable storage section such as built-in hard disk drives or a solid state drives (SSDs).

The control section 970 includes a processor such as a CPU, and a memory such as RAM and ROM. The memory stores a program to be executed by the CPU, program data, and the like. A program stored in the memory is read out and executed by the CPU, for example, at the time of activation of the image capturing device 960. The CPU controls the operation of the image capturing device 960, for example, in accordance with an operation signal input from the user I/F 971 by executing the program.

The user I/F 971 is connected to the control section 970. The user I/F 971 includes, for example, a button, a switch, and the like used for a user to operate the image capturing device 960. The user I/F 971 detects an operation made by a user via these structural elements, generates an operation signal, and outputs the generated operation signal to the control section 970.

The image processing section 964 has a function of the image encoding device and the image decoding device according to the embodiment in the image capturing device 960 configured in this manner. It is possible to improve the encoding efficiency of encoding or decoding of an MV in a multi-view image.

6. Application Example of Scalable Video Coding

[First System]

Next, a specific example of using scalable coded data, in which a scalable video coding (hierarchical coding) is performed, will be described. The scalable video coding, for example, is used for selection of data to be transmitted as examples illustrated in FIG. 27.

Figure 27:
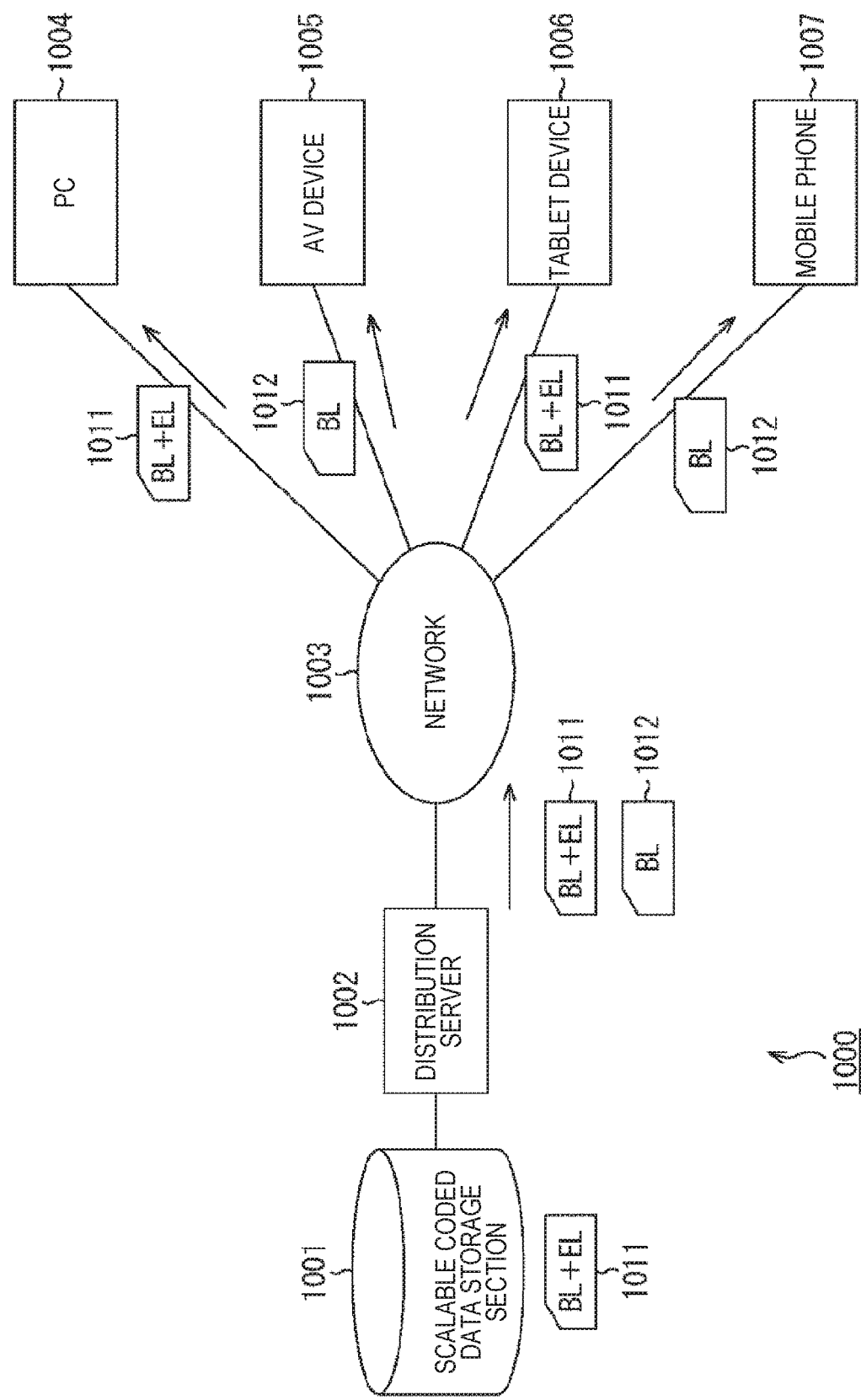
FIG. 27 is a block diagram illustrating an example of scalable video coding use.

In a data transmission system 1000 illustrated in FIG. 27, a distribution server 1002 reads scalable coded data stored in a scalable coded data storage section 1001, and distributes the scalable coded data to a terminal device such as a PC 1004, an AV device 1005, a tablet device 1006, or a mobile phone 1007 via a network 1003.

At this time, the distribution server 1002 selects and transmits coded data having proper quality according to capability of the terminal device, communication environment, or the like. Even when the distribution server 1002 transmits unnecessarily high-quality data, a high-quality image is not necessarily obtainable in the terminal device and it may be a cause of occurrence of a delay or an overflow. In addition, a communication band may be unnecessarily occupied or a load of the terminal device may be unnecessarily increased. In contrast, even when the distribution server 1002 transmits unnecessarily low quality data, an image with a sufficient quality may not be obtained. Thus, the distribution server 1002 appropriately reads and transmits the scalable coded data stored in the scalable coded data storage section 1001 as the coded data having a proper quality according to the capability of the terminal device, the communication environment, or the like.

For example, the scalable coded data storage section 1001 is configured to store scalable coded data (BL+EL) 1011 in which the scalable video coding is performed. The scalable coded data (BL+EL) 1011 is coded data including both a base layer and an enhancement layer, and is data from which a base layer image and an enhancement layer image can be obtained by performing decoding.

The distribution server 1002 selects an appropriate layer according to the capability of the terminal device for transmitting data, the communication environment, or the like, and reads the data of the selected layer. For example, with respect to the PC 1004 or the tablet device 1006 having high processing capability, the distribution server 1002 reads the scalable coded data (BL+EL) 1011 from the scalable coded data storage section 1001, and transmits the scalable coded data (BL+EL) 1011 without change. On the other hand, for example, with respect to the AV device 1005 or the mobile phone 1007 having low processing capability, the distribution server 1002 extracts the data of the base layer from the scalable coded data (BL+EL) 1011, and transmits the extracted data of the base layer as low quality scalable coded data (BL) 1012 that is data having the same content as the scalable coded data (BL+EL) 1011 but has lower quality than the scalable coded data (BL+EL) 1011.

Because an amount of data can easily be adjusted by employing the scalable coded data, the occurrence of the delay or the overflow can be suppressed or the unnecessary increase of the load of the terminal device or the communication media can be suppressed. In addition, because a redundancy between the layers is reduced in the scalable coded data (BL+EL) 1011, it is possible to further reduce the amount of data than when the coded data of each layer is treated as the individual data. Therefore, it is possible to more efficiently use the storage region of the scalable coded data storage section 1001.

Because various devices such as the PC 1004 to the mobile phone 1007 are applicable as the terminal device, the hardware performance of the terminal devices differs according to the device. In addition, because there are various applications which are executed by the terminal device, the software performance thereof also varies. Further, because all the communication networks including a wired, wireless, or both such as the Internet and the local area network (LAN) are applicable as the network 1003 serving as a communication medium, the data transmission performance thereof varies. Further, the data transmission performance may vary by other communications, or the like.

Therefore, the distribution server 1002 may perform communication with the terminal device which is the data transmission destination before starting the data transmission, and then obtain information related to the terminal device performance such as hardware performance of the terminal device, or the application (software) performance which is executed by the terminal device, and information related to the communication environment such as an available bandwidth of the network 1003. Then, distribution server 1002 may select an appropriate layer based on the obtained information.

Also, the extraction of the layer may be performed in the terminal device. For example, the PC 1004 may decode the transmitted scalable coded data (BL+EL) 1011 and display the image of the base layer or display the image of the enhancement layer. In addition, for example, the PC 1004 may be configured to extract the scalable coded data (BL) 1012 of the base layer from the transmitted scalable coded data (BL+EL) 1011, store the extracted scalable coded data (BL) 1012 of the base layer, transmit to another device, or decode and display the image of the base layer.

Of course, the number of the scalable coded data storage sections 1001, the distribution servers 1002, the networks 1003, and the terminal devices are optional. In addition, although the example of the distribution server 1002 transmitting the data to the terminal device is described above, the example of use is not limited thereto. The data transmission system 1000 is applicable to any system which selects and transmits an appropriate layer according to the capability of the terminal device, the communication environment, or the like when the scalable coded data is transmitted to the terminal device.

Even in the data transmission system 1000 as in FIG. 27, it is possible to obtain effects similar to those described above with reference to FIGS. 1 to 21 by applying the present technology described above with reference to FIGS. 1 to 21.

[Second System]

Figure 28:
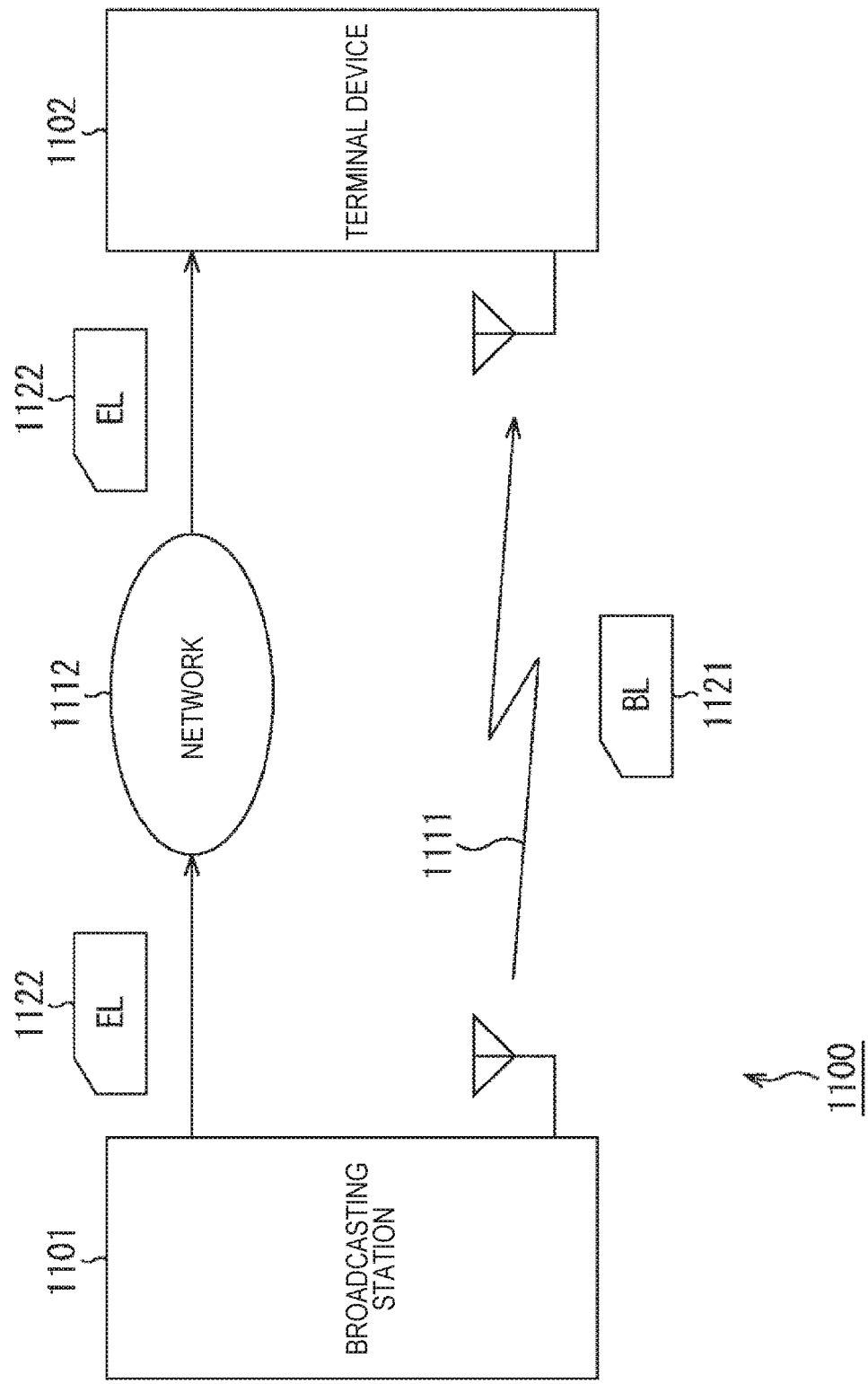
FIG. 28 is a block diagram illustrating another example of scalable video coding use.

In addition, the scalable video coding, for example, is used for transmission via a plurality of communication media as in an example illustrated in FIG. 28.

In a data transmission system 1100 illustrated in FIG. 28, a broadcasting station 1101 transmits scalable coded data (BL) 1121 of the base layer by terrestrial broadcasting 1111. In addition, the broadcasting station 1101 transmits scalable coded data (EL) 1122 of the enhancement layer via any arbitrary network 1112 made of a communication network that is wired, wireless, or both (for example, the data is packetized and transmitted).

A terminal device 1102 has a function of receiving the terrestrial broadcasting 1111 that is broadcast by the broadcasting station 1101 and receives the scalable coded data (BL) 1121 of the base layer transmitted via the terrestrial broadcasting 1111. In addition, the terminal device 1102 further has a communication function by which the communication is performed via the network 1112, and receives the scalable coded data (EL) 1122 of the enhancement layer transmitted via the network 1112.

For example, according to a user's instruction or the like, the terminal device 1102 decodes the scalable coded data (BL) 1121 of the base layer acquired via the terrestrial broadcasting 1111, thereby obtaining or storing the image of the base layer or transmitting the image of the base layer to other devices.

In addition, for example, according to the user's instruction, the terminal device 1102 combines the scalable coded data (BL) 1121 of the base layer acquired via the terrestrial broadcasting 1111 and the scalable coded data (EL) 1122 of the enhancement layer acquired via the network 1112, thereby obtaining the scalable coded data (BL+EL), obtaining or storing the image of the enhancement layer by decoding the scalable coded data (BL+EL), or transmitting the image of the enhancement layer to other devices.

As described above, the scalable coded data, for example, can be transmitted via the different communication medium for each layer. Therefore, it is possible to disperse the load and suppress the occurrence of the delay or the overflow.

In addition, according to the situation, the communication medium used for the transmission for each layer may be configured to be selected. For example, the scalable coded data (BL) 1121 of the base layer in which the amount of data is comparatively large may be transmitted via the communication medium having a wide bandwidth, and the scalable coded data (EL) 1122 of the enhancement layer in which the amount of data is comparatively small may be transmitted via the communication media having a narrow bandwidth. In addition, for example, whether the communication medium that transmits the scalable coded data (EL) 1122 of the enhancement layer is the network 1112 or the terrestrial broadcasting 1111 may be switched according to the available bandwidth of the network 1112. Of course, the same is true for data of an arbitrary layer.

By controlling in this way, it is possible to further suppress the increase of the load in the data transmission.

Of course, the number of the layers is optional, and the number of communication media used in the transmission is also optional. In addition, the number of terminal devices 1102 which are the destination of the data distribution is also optional. Further, although the example of the broadcasting from the broadcasting station 1101 has been described above, the use example is not limited thereto. The data transmission system 1100 can be applied to any system which divides the scalable coded data using a layer as a unit and transmits the scalable coded data via a plurality of links.

Even in the data transmission system 1100 as in FIG. 28, it is possible to obtain effects similar to those described above with reference to FIGS. 1 to 21 by applying the present technology described above with reference to FIGS. 1 to 21.

[Third System]

Figure 29:
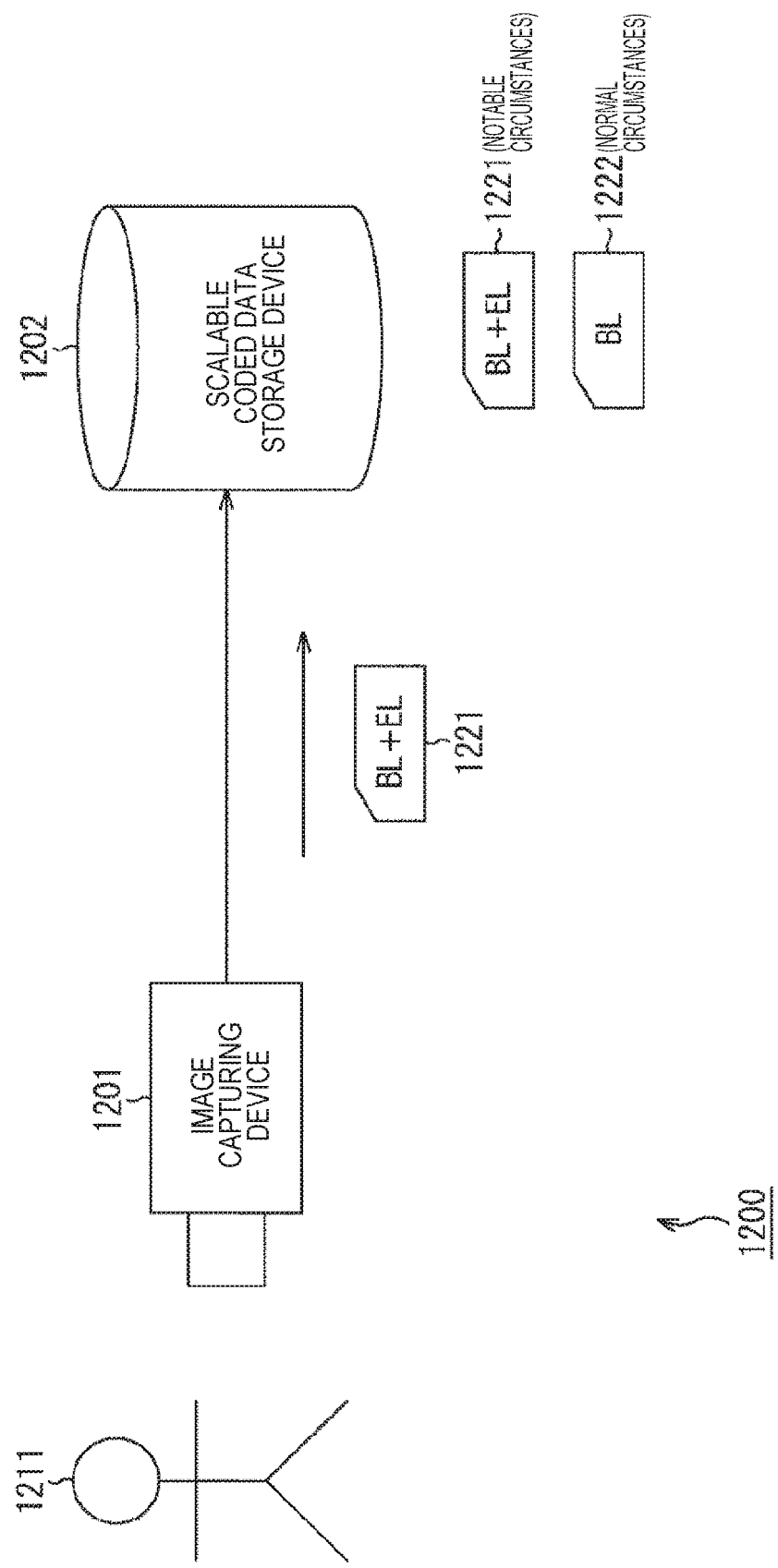
FIG. 29 is a block diagram illustrating still another example of scalable video coding use.

In addition, the scalable video coding is used in the storage of the coded data as an example illustrated in FIG. 29.

In an image capturing system 1200 illustrated in FIG. 29, an image capturing device 1201 performs scalable video coding on image data obtained by capturing an image of a subject 1211, and supplies a scalable video result as the scalable coded data (BL+EL) 1221 to a scalable coded data storage device 1202.

The scalable coded data storage device 1202 stores the scalable coded data (BL+EL) 1221 supplied from the image capturing device 1201 in quality according to the situation. For example, in the case of normal circumstances, the scalable coded data storage device 1202 extracts data of the base layer from the scalable coded data (BL+EL) 1221, and stores the extracted data as scalable coded data (BL) 1222 of the base layer having a small amount of data at low quality. On the other hand, for example, in the case of notable circumstances, the scalable coded data storage device 1202 stores the scalable coded data (BL+EL) 1221 having a large amount of data at high quality without change.

In this way, because the scalable coded data storage device 1202 can save the image at high quality only in a necessary case, it is possible to suppress the decrease of the value of the image due to the deterioration of the image quality and suppress the increase of the amount of data, and it is possible to improve the use efficiency of the storage region.

For example, the image capturing device 1201 is assumed to be a motoring camera. Because content of the captured image is unlikely to be important when a monitoring subject (for example, an invader) is not shown in the imaged image (in the case of the normal circumstances), the priority is on the reduction of the amount of data, and the image data (scalable coded data) is stored at low quality. On the other hand, because the content of the imaged image is likely to be important when a monitoring target is shown as the subject 1211 in the imaged image (in the case of the notable circumstances), the priority is on the image quality, and the image data (scalable coded data) is stored at high quality.

For example, whether the case is the case of the normal circumstances or the notable circumstances may be determined by the scalable coded data storage device 1202 by analyzing the image. In addition, the image capturing device 1201 may be configured to make the determination and transmit the determination result to the scalable coded data storage device 1202.

A determination criterion of whether the case is the case of the normal circumstances or the notable circumstances is optional and the content of the image which is the determination criterion is optional. Of course, a condition other than the content of the image can be designated as the determination criterion. For example, switching may be configured to be performed according to the magnitude or waveform of recorded sound, by a predetermined time interval, or by an external instruction such as the user's instruction.

In addition, although the two states of the normal circumstances and the notable circumstances have been described above, the number of the states is optional, and for example, switching may be configured to be performed among three or more states such as normal circumstances, slightly notable circumstances, notable circumstances, and highly notable circumstances. However, the upper limit number of states to be switched depends upon the number of layers of the scalable coded data.

In addition, the image capturing device 1201 may determine the number of layers of the scalable video coding according to the state. For example, in the case of the normal circumstances, the image capturing device 1201 may generate the scalable coded data (BL) 1222 of the base layer having a small amount of data at low quality and supply the data to the scalable coded data storage device 1202. In addition, for example, in the case of the notable circumstances, the image capturing device 1201 may generate the scalable coded data (BL+EL) 1221 of the base layer having a large amount of data at high quality and supply the data to the scalable coded data storage device 1202.

Although the monitoring camera has been described above as the example, the usage of the image capturing system 1200 is optional and is not limited to the monitoring camera.

Even in the image capturing system 1200 as in FIG. 29, it is possible to obtain effects similar to those described above with reference to FIGS. 1 to 21 by applying the present technology described above with reference to FIGS. 1 to 21.

7. Sixth Embodiment

[Other Examples of Implementation]

Although the examples of the devices and the system to which the present technology is applied have been described above, the present technology is not limited thereto. For example, the present technology can also be implemented as a processor serving as system large scale integration (LSI) or the like, a module using a plurality of processors or the like, a unit using a plurality of modules or the like, a set in which other functions are further added to the unit, or the like (that is, a configuration of part of the device).

[Video Set]

Figure 30:
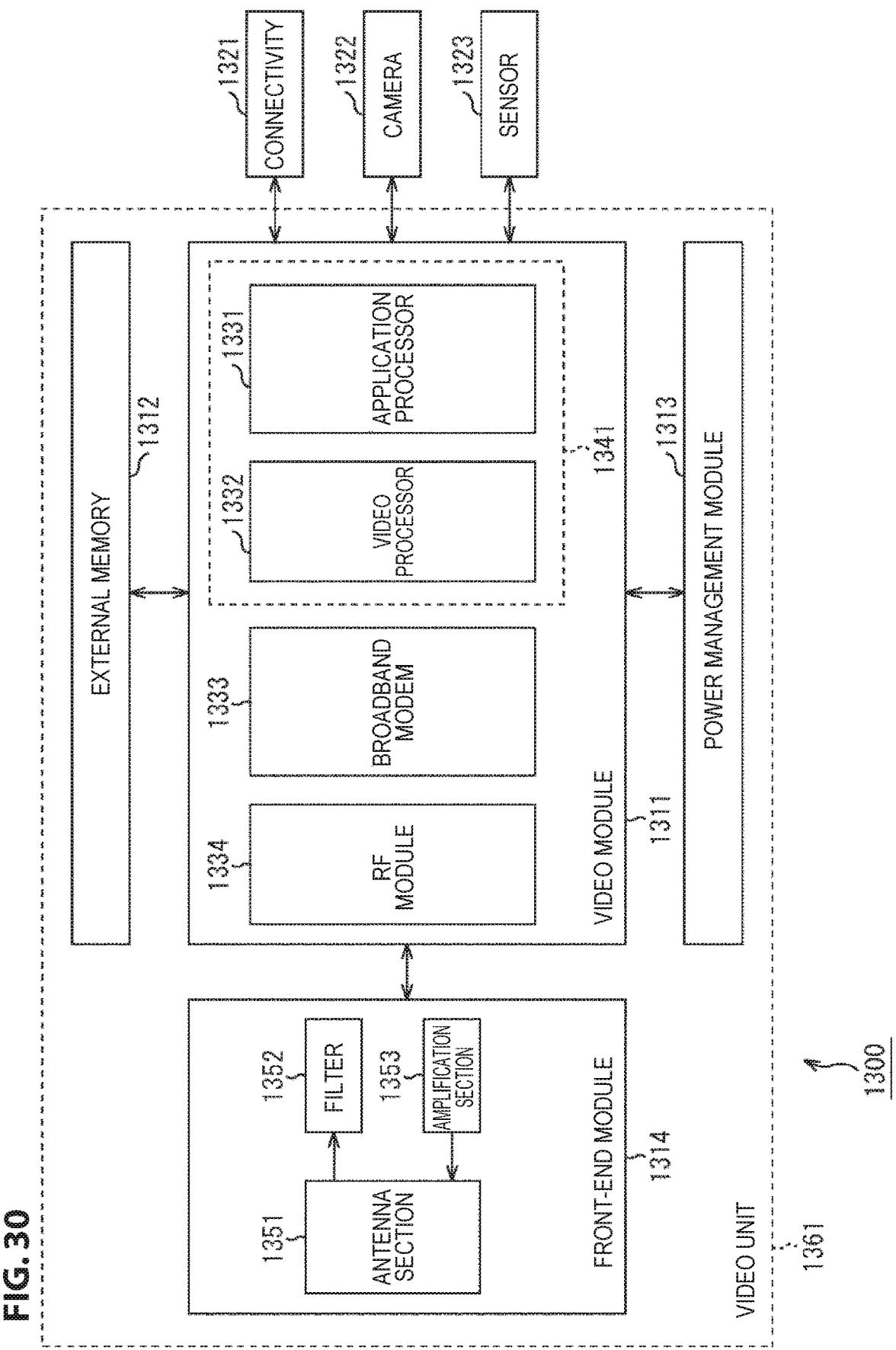
FIG. 30 is a block diagram illustrating an example of a schematic configuration of a video set.

An example in which the present technology is implemented as the set will be described with reference to FIG. 30. FIG. 30 illustrates an example of a schematic configuration of the video set to which the present technology is applied.

Recently, the multi-functionality of electronic devices has advanced, and the case in which one set having a plurality of functions is implemented by combining a plurality of configurations having associated functions as well as the case in which a partial configuration of the multi-functionality is implemented with the development and manufacturing thereof and the case in which the configuration is implemented to have one function could be seen.

A video set 1300 illustrated in FIG. 30 is a multi-functional configuration and serves as a video set obtained by combining a device having a function related to image encoding and decoding (either one or both of which may be given) with a device having other functions associated with the function.

As illustrated in FIG. 30, the video set 1300 has a module group of a video module 1311, an external memory 1312, a power management module 1313, a front-end module 1314, and the like and a device having related functions of connectivity 1321, a camera 1322, a sensor 1323, and the like.

The module serves as a component with a certain integrated function by integrating some component functions associated with each other. Although a specific physical configuration is optional, for example, the configuration integrated by arranging a plurality of processors having functions, electronic circuit elements such as a resistor and a capacitor, other devices, and the like on a circuit board is possible. In addition, a new module in which the module is combined with other modules or processors is also possible.

In the case of the example of FIG. 30, the video module 1311 is a module in which configurations having functions related to image processing are combined, and has an application processor, a video processor, a broadband modem 1333, and a radio frequency (RF) module 1334.

The processor is a process in which a configuration having a predetermined function is integrated on a semiconductor chip by a system on a chip (SoC), and is also referred to as, for example, system large scale integration (LSI) and the like. The configuration having the predetermined function may be a logic circuit (hardware configuration) or a CPU, a ROM, a RAM, and the like and a program (software configuration) to be executed using the CPU, the ROM, the RAM, and the like. For example, the processor may have the logic circuit, the CPU, the ROM, the RAM, and the like, part of the function may be implemented by the logic circuit (hardware configuration), and the other functions may be implemented by the program (software configuration) to be executed in the CPU.

An application processor 1331 of FIG. 30 is a processor for executing an application related to image processing. The application to be executed in the application processor 1331 can not only perform a calculation process so as to implement a predetermined function, but also control configurations inside and outside the video module 1311, for example, such as a video processor 1332, if necessary.

The video processor 1332 is a processor having a function related to (one or both of) image encoding and decoding.

The broadband modem 1333 is a processor (or module) for performing a process related to wireless or wired (or wired and wireless) broadband communication to be performed via a link of a broadband such as the Internet, a public telephone network, or the like. For example, the broadband modem 1333 converts data (digital signal) to be transmitted into an analog signal by performing digital modulation and the like or converts a received analog signal into data (a digital signal by demodulating the received analog signal. For example, the broadband modem 1333 can perform digital modulation/demodulation on arbitrary information such as image data to be processed by the video processor 1332 or an image data encoded stream, an application program, setting data, and the like.

The RF module 1334 is a module for performing frequency conversion, modulation/demodulation, amplification, and filtering processes and the like on an RF signal to be transmitted and received via an antenna. For example, the RF module 1334 generates an RF signal by performing frequency conversion and the like on a baseband signal generated by the broadband modem 1333. In addition, for example, the RF module 1334 generates a baseband signal by performing frequency conversion and the like on an RF signal received via the front-end module 1314.

Also, as indicated by a dotted line 1341 in FIG. 30, one processor may be configured by integrating the application processor 1331 and the video processor 1332.

The external memory 1312 is a module provided outside the video module 1311 and having a storage device to be used by the video module 1311. Although the storage device of the external memory 1312 may be configured to be implemented by any physical configuration, for example, it is desirable to implement the storage device using a relatively cheap and large-capacity semiconductor memory, for example, such as a dynamic random access memory (DRAM), because the storage device is generally used to store a large volume of data such as image data of frame units in many cases.

The power management module 1313 manages and controls power supply to the video module 1311 (each configuration within the video module 1311).

The front-end module 1314 is a module for providing a front-end function (a circuit of a transmission/reception end of an antenna side) to the RF module 1334. As illustrated in FIG. 30, the front-end module 1314, for example, has an antenna section 1351, a filter 1352, and an amplification section 1353.

The antenna section 1351 has an antenna for transmitting and receiving a radio signal and its peripheral configuration. The antenna section 1351 transmits a signal supplied from the amplification section 1353 as the radio signal and supplies the received radio signal as an electrical signal (RF signal) to the filter 1352. The filter 1352 performs a filtering process and the like on the RF signal received via the antenna section 1351 and supplies the processed RF signal to the RF module 1334. The amplification section 1353 amplifies the RF signal supplied from the RF module 1334 and supplies the amplified RF signal to the antenna section 1351.

The connectivity 1321 is a module having a function related to a connection to the outside. A physical configuration of the connectivity 1321 is optional. For example, the connectivity 1321 has a configuration having a communication function other than a communication standard corresponding to the broadband modem 1333, external input and output ports, and the like.

For example, the connectivity 1321 may be configured to have a module having a communication function based on a wireless communication standard such as Bluetooth (registered trademark), IEEE 802.11 (for example, Wi-Fi (registered trademark)), near field communication (NFC), or infrared data association (IrDA), an antenna for transmitting and receiving a signal based on the standard. In addition, the connectivity 1321 may be configured to have a module with a communication function based on a wired communication standard such as a universal serial bus (USB) or a high-definition multimedia I/F (HDMI) (registered trademark) and a port based on the standard. Further, for example, the connectivity 1321 may be configured to have other data (signal) transmission functions of antenna input and output ports and the like.

Also, the connectivity 1321 may be configured to include a device of a transmission destination of data (signals). For example, the connectivity 1321 may be configured to have a drive (including a hard disk, a solid state drive (SSD), a network attached storage (NAS), and the like as well as a drive of removable media) for reading and writing data from and to a recording medium such as a magnetic disc, an optical disc, an magneto-optical disc, or a semiconductor memory. In addition, the connectivity 1321 may be configured to have an image and sound output device (a monitor, a speaker, and the like).

The camera 1322 is a module having a function of capturing of an image of a subject and obtaining image data of the subject. The image data obtained by the image capturing of the camera 1322, for example, is supplied to the video processor 1332 and encoded.

The sensor 1323, for example, is a module having an arbitrary sensor function such as a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, an inclination sensor, a magnetic identification sensor, an impact sensor, or a temperature sensor. Data detected by the sensor 1323, for example, is supplied to the application processor 1331 and used by an application or the like.

The configuration described above as the module may be implemented as a processor and conversely the configuration described as the processor may be implemented as a module.

In the video set 1300 of the configured as described above, it is possible to apply the present technology to the video processor 1332 as will be described later. Therefore, the video set 1300 can be executed as a set to which the present technology is applied.

[Configuration Example of Video Processor]

Figure 31:
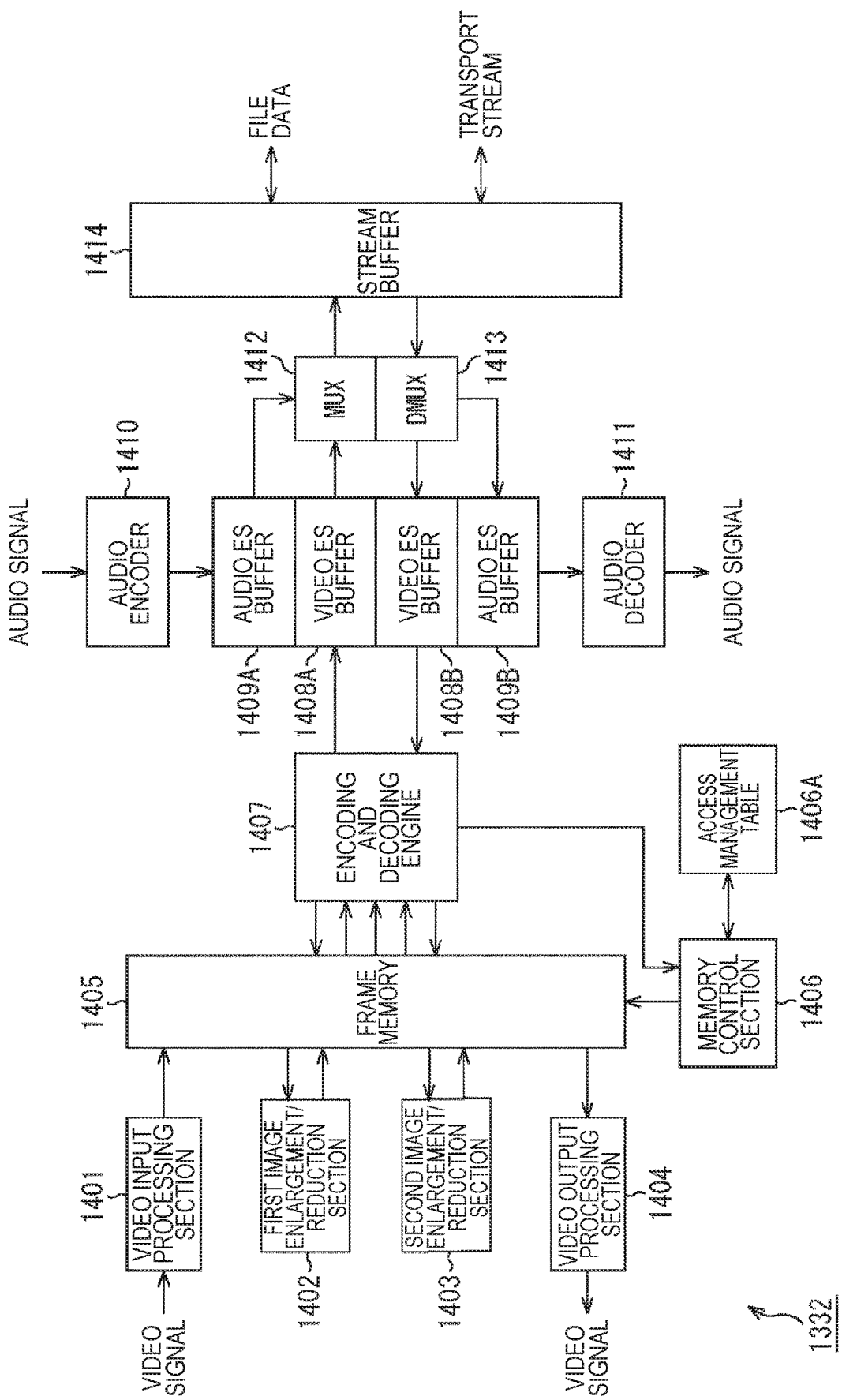
FIG. 31 is a block diagram illustrating an example of a schematic configuration of a video processor.

FIG. 31 illustrates an example of a schematic configuration of the video processor 1332 (FIG. 30) to which the present technology is applied.

In the case of the example of FIG. 31, the video processor 1332 has a function of receiving inputs of a video signal and an audio signal and encoding the inputs of the video signal and the audio signal in a predetermined scheme and a function of decoding encoded audio and video data and reproducing and outputting a video signal and an audio signal.

As illustrated in FIG. 31, the video processor 1332 has a video input processing section 1401, a first image enlargement/reduction section 1402, a second image enlargement/reduction section 1403, a video output processing section 1404, a frame memory 1405, and a memory control section 1406. In addition, the video processor 1332 has an encoding and decoding engine 1407, video elementary stream (ES) buffers 1408A and 1408B, and audio elementary stream (ES) buffers 1409A and 1409B. Further, the video processor 1332 has an audio encoder 1410, an audio decoder 1411, a multiplexer (MUX) 1412, an inverse multiplexing section (demultiplexer (DMUX)) 1413, and a stream buffer 1414.

The video input processing section 1401, for example, acquires a video signal input from the connectivity 1321 (FIG. 30) and converts the video signal into digital image data. The first image enlargement/reduction section 1402 performs a format conversion process, an image enlargement/reduction process, or the like on image data. The second image enlargement/reduction section 1403 performs the image enlargement/reduction process on the image data according to a format in a destination to which the image data is output via the video output processing section 1404 or perform format conversion, an image enlargement/reduction process or the like, and the like as in the first image enlargement/reduction section 1420. The video output processing section 1404 performs the format conversion, the conversion into an analog signal, or the like on the image data and outputs a conversion result as a reproduced video signal, for example, to the connectivity 1321 (FIG. 30) and the like.

The frame memory 1405 is a memory for image data to be shared by the video input processing section 1401, the first image enlargement/reduction section 1402, the second image enlargement/reduction section 1403, a video output processing section 1404, and an encoding and decoding engine 1407. The frame memory 1405, for example, is implemented as a semiconductor memory such as a DRAM.

The memory control section 1406 receives a synchronization signal from the encoding and decoding engine 1407 and controls access of writing/reading to/from the frame memory 1405 according to an access schedule for the frame memory written to an access management table 1406A. The access management table 1406A is updated by the memory control section 1406 according to a process to be executed by the encoding and decoding engine 1407, the first image enlargement/reduction section 1402, the second image enlargement/reduction section 1403, or the like.

The encoding and decoding engine 1407 performs an image data encoding process and a process of decoding a video stream which is data in which image data is encoded. For example, the encoding and decoding engine 1407 encodes image data read from the frame memory 1405 and sequentially writes the encoded image data as a video stream to the video ES buffer 1408. In addition, for example, a video stream from the video ES buffer 1408B is sequentially read and decoded and the decoded video stream is sequentially written as image data to the frame memory 1405. The encoding and decoding engine 1407 uses the frame memory 1405 as a work area in the encoding or decoding of the image data. In addition, the encoding and decoding engine 1407, for example, outputs a synchronization signal to the memory control section 1406 at the timing at which processing for every macro block starts.

The video ES buffer 1408A buffers a video stream generated by the encoding and decoding engine 1407 and supplies the video stream to the multiplexing section (MUX) 1412. The video ES buffer 1408B buffers a video stream supplied from the inverse multiplexing section (DMUX) 1413 and supplies the video stream to the encoding and decoding engine 1407.

The audio ES buffer 1409A buffers an audio stream generated by an audio encoder 1410 and supplies the audio stream to the multiplexing section (MUX) 1412. The audio ES buffer 1409B buffers an audio stream supplied from the inverse multiplexing section (DMUX) 1413 and supplies the audio stream to the audio decoder 1411.

The audio encoder 1410, for example, digitally converts an audio signal input from the connectivity 1321 (FIG. 30) or the like, and for example, encodes the digitally converted audio signal in a predetermined scheme such as an MPEG audio scheme or an audio code number 3 (AC3) scheme. The audio encoder 1410 sequentially writes an audio data stream which is data in which an audio signal is encoded to the audio ES buffer 1409A. The audio decoder 1411 decodes an audio stream supplied from the audio ES buffer 1409B and supplies the decoded audio stream as a reproduced audio signal, for example, to the connectivity 1321 (FIG. 30) or the like, for example, by performing the conversion into the analog signal or the like.

The multiplexing section (MUX) 1412 multiplexes a video stream and an audio stream. This multiplexing method (that is, a format of the bitstream generated by multiplexing) is optional. In addition, at the time of multiplexing, the multiplexing section (MUX) 1412 can add predetermined header information or the like to the bitstream. That is, the multiplexing section (MUX) 1412 can convert a format of the stream by the multiplexing. For example, the multiplexing section (MUX) 1412 performs conversion into a transport stream which is a bitstream of a transmission format by multiplexing the video stream and the audio stream. In addition, the multiplexing (MUX) 1412 performs conversion into data (file data) of a recording file format by multiplexing the video stream and the audio stream.

The inverse multiplexing section (DMUX) 1413 demultiplexes the bitstream in which the video stream and the audio stream are multiplexed in a method corresponding to multiplexing by the multiplexing section (MUX) 1412. That is, the inverse multiplexing section (DMUX) 1413 extracts the video stream and the audio stream from the bitstream read from the stream buffer 1414 (demultiplexes the video stream and the audio stream). That is, the inverse multiplexing section (DMUX) 1413 can convert the format of the inversely multiplexed stream (inverse conversion to the conversion by the multiplexing section (MUX) 1412). For example, the inverse multiplexing section (DMUX) 1413, for example, acquires a transport stream supplied from the connectivity 1321, the broadband modem 1333, or the like (all in FIG. 30) via the stream buffer 1414 and demultiplexes the acquired transport stream, thereby converting the transport stream into the video stream and the audio stream. In addition, for example, the inverse multiplexing section (DMUX) 1413 can acquire file data read from various types of recording media, for example, by the connectivity 1321 (FIG. 30) via the stream buffer 1414 and inversely multiplex the acquired file data to perform conversion into a video stream and an audio stream.

The stream buffer 1414 buffers the bitstream. For example, the stream buffer 1414 buffers the transport stream supplied from the multiplexing section (MUX) 1412 and supplies the transport stream, for example, to the connectivity 1321, the broadband modem 1333, or the like (all in FIG. 30) at a predetermined timing or based on an external request or the like.

In addition, for example, the stream buffer 1414 buffers file data supplied from the multiplexing section (MUX) 1412 and supplies the buffer file data, for example, to the connectivity 1321 (FIG. 30) or the like, at a predetermined timing or based on an external request or the like to cause various types of recording media to record the file data.

Further, the stream buffer 1414, for example, buffers transport stream acquired via the connectivity 1321, the broadband modem 1333, or the like (all in FIG. 30) and supplies the transport stream to the inverse multiplexing section (DMUX) 1413 at a predetermined timing or based on an external request or the like.

In addition, the stream buffer 1414, for example, buffers file data read from various types of recording media in the connectivity 1321 (FIG. 30) and the like and supplies the file data to the inverse multiplexing section (DMUX) 1413 at a predetermined timing or based on an external request or the like.

Next, an example of an operation of the video processor 1332 of this configuration will be described. For example, a video signal input to the video processor 1332 from the connectivity 1321 (FIG. 30) or the like is converted into digital image data of a predetermined scheme such as a 4:2:2Y/Cb/Cr scheme in the video input processing section 1401 and the digital image data is sequentially written to the frame memory 1405. This digital image data is read to the first image enlargement/reduction section 1402 or the second image enlargement/reduction section 1403, the format conversion into a predetermined scheme such as a 4:2:0Y/Cb/Cr scheme and the enlargement/reduction process are performed and the image data is written to the frame memory 1405 again. The image data is encoded by the encoding and decoding engine 1407 and the encoded image data is written as a video stream to the video ES buffer 1408A.

In addition, an audio signal input from the connectivity 1321 (FIG. 30) or the like to the video processor 1332 is encoded by the audio encoder 1410 and the encoded audio signal is written as an audio stream to the audio ES buffer 1409A.

The video stream of the video ES buffer 1408A and the audio stream of the audio ES buffer 1409A are read to the multiplexing section (MUX) 1412 and multiplexed to be converted into a transport stream, file data, or the like. After the transport stream generated by the multiplexing section (MUX) 1412 is buffered in the stream buffer 1414, for example, the transport stream is output to an external network via (any one (FIG. 30) of) the connectivity 1321, the broadband modem 1333, and the like. In addition, after the file data generated by the multiplexing section (MUX) 1412 is buffered in the stream buffer 1414, for example, the file data is output to the connectivity 1321 (FIG. 30) and the like and recorded to various types of recording media.

In addition, for example, after the transport stream input from the external network to the video processor 1332 via (any one (FIG. 30) of) the connectivity 1321, the broadband modem 1333, and the like is buffered in the stream buffer 1414, the transport stream is inversely multiplexed by the inverse multiplexing section (DMUX) 1413. In addition, for example, after file data read from various types of recording media in the connectivity 1321 (FIG. 30) and the like and input to the video processor 1332 is buffered in the stream buffer 1414, the file data is inversely multiplexed by the inverse multiplexing section (DMUX) 1413. That is, the transport stream or the file data input to the video processor 1332 is demultiplexed into a video stream and an audio stream by the inverse multiplexing section (DMUX) 1413.

An audio signal is reproduced by supplying the audio stream to the audio decoder 1411 via the audio ES buffer 1409B and decoding the audio stream. In addition, after the video stream is written to the video ES buffer 1408B, the video stream is sequentially read and decoded by the encoding and decoding engine 1407 and written to the frame memory 1405. The second image enlargement/reduction section 1403 performs the decoded image data on the enlargement/reduction process and the processed data is written to the frame memory 1405. Then, a video signal is reproduced and output by reading the decoded image data to the video output processing section 1404, converting the format of the decoded image data in a predetermined scheme such as 4:2:2Y/Cb/Cr scheme, and further converting the decoded image data into an analog signal.

When the present technology is applied to the video processor 1332 configured as described above, it is only necessary to apply the present technology according to each embodiment described above to the encoding and decoding engine 1407. That is, for example, it is only necessary to configure the encoding and decoding engine 1407 having functions of the image encoding device (FIG. 4) according to the first embodiment and the image decoding device (FIG. 14) according to the second embodiment. As described above, the video processor 1332 can obtain effects similar to those described above with reference to FIGS. 1 to 21.

Also, in the encoding and decoding engine 1407, the present technology (that is, the functions of the image encoding device and the image decoding device according to the embodiments described above) may be implemented by hardware such as a logic circuit, implemented by software such as an embedded program, or implemented by both thereof.

[Other Configuration Example of Video Processor]

Figure 32:
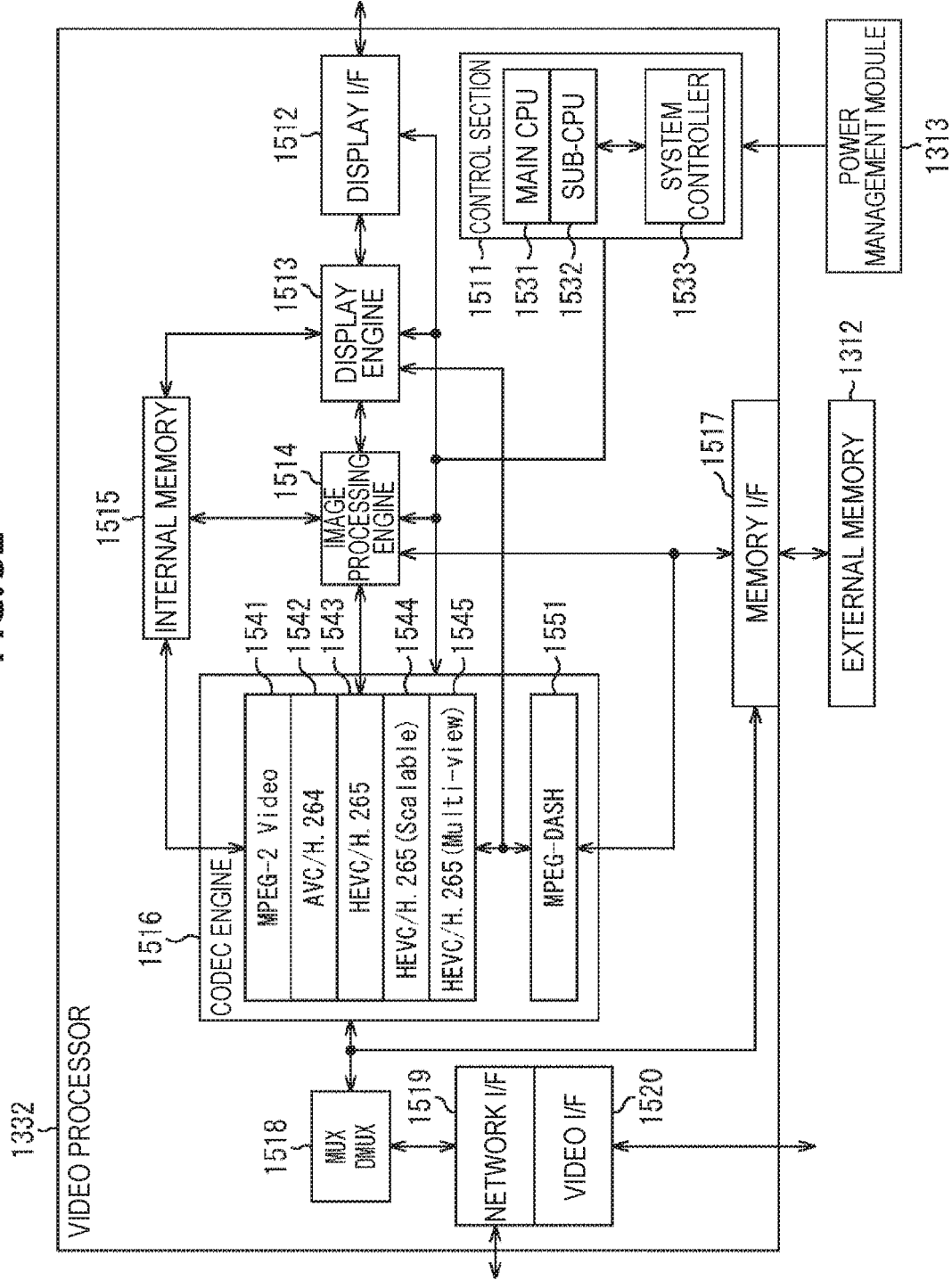
FIG. 32 is a block diagram illustrating another example of the schematic configuration of the video processor.

FIG. 32 illustrates another example of a schematic configuration of the video processor 1332 (FIG. 30) to which the present technology is applied. In the case of the example of FIG. 32, the video processor 1332 has a function of encoding and decoding video data in a predetermined scheme.

More specifically, as illustrated in FIG. 32, the video processor 1332 has a control section 1511, a display I/F 1512, a display engine 1513, an image processing engine 1514, and an internal memory 1515. In addition, the video processor 1332 has a codec engine 1516, a memory I/F 1517, a multiplexing/inverse multiplexing section (MUX/DMUX) 1518, a network I/F 1519, and a video I/F 1520.

The control section 1511 controls operations of processing sections within the video processor 1332 such as the display I/F 1512, the display engine 1513, the image processing engine 1514, the codec engine 1516, and the like.

As illustrated in FIG. 32, the control section 1511, for example, has a main CPU 1531, a sub-CPU 1532, and a system controller 1533. The main CPU 1531 executes a program for controlling the operations of the processing sections within the video processor 1332. The main CPU 1531 generates a control signal according to the program or the like and supplies the control signal to each processing section (that is, controls the operation of each processing section). The sub-CPU 1532 plays an auxiliary role of the main CPU 1531. For example, the sub-CPU 1532 executes a child process, a sub-routine, or the like of a program or the like to be executed by the main CPU 1531. The system controller 1533 controls operations of the main CPU 1531 and the sub-CPU 1532 such as designations of programs to be executed by the main CPU 153 and the sub CPU 1532.

The display I/F 1512 outputs image data, for example, to the connectivity 1321 (FIG. 30) and the like, under control of the control section 1511. For example, the display I/F 1512 converts image data of digital data into an analog signal and outputs the analog signal as the reproduced video signal, or the image data of the digital data without change, to the monitor device or the like of the connectivity 1321 (FIG. 30).

The display engine 1513 performs various types of conversion processes such as format conversion, size conversion, and color gamut conversion so that image data is suitable for hardware specs of a monitor device and the like for displaying its image under control of the control section 1511.

The image processing engine 1514 performs predetermined image processing, for example, such as filtering processing for improving image quality, on the image data under control of the control section 1511.

The internal memory 1515 is shared by the display engine 1513, the image processing engine 1514, and the codec engine 1516, and is a memory provided inside the video processor 1332. The internal memory 1515, for example, is used for data exchange to be performed among the display engine 1513, the image processing engine 1514, and the codec engine 1516. For example, the internal memory 1515 stores data to be supplied from the display engine 1513, the image processing engine 1514, or the codec engine 1516 and supplies the data to the display engine 1513, the image processing engine 1514, or the codec engine 1516, if necessary (for example, according to a request). Although the internal memory 1515 may be implemented by any storage device, it is desirable to implement the internal memory 1515 by a semiconductor memory having a relatively small capacity and high response speed (as compared to those of the external memory 1312), for example, such as a static random access memory (SRAM), because a small volume of data such as image data of a block unit or parameters are generally used in many cases.

The codec engine 1516 performs a process related to encoding and decoding of image data. An encoding and decoding scheme corresponding to this codec engine 1516 is optional and the number of encoding and decoding schemes may be one or more. For example, the codec engine 1516 may have a codec function of a plurality of encoding and decoding schemes, and the encoding of image data or the decoding of encoded data may be performed in one selected from among the encoding and decoding schemes.

In the example illustrated in FIG. 32, the codec engine 1516, for example, has an MPEG-2 video 1541, an AVC/H.264 1542, an HEVC/H.265 1543, an HEVC/H.265 (scalable) 1544, an HEVC/H.265 (multi-view) 1545, and an MPEG-DASH 1551 as functional blocks for processing related to a codec.

The MPEG-2 video 1541 is a functional block for encoding or decoding image data in an MPEG-2 scheme. The AVC/H.264 1542 is a functional block for encoding or decoding image data in an AVC scheme. The HEVC/H.265 1543 is a functional block for encoding or decoding image data in an HEVC scheme. The HEVC/H.265 (scalable) 1544 is a functional block for performing scalable video coding or scalable video decoding on image data in the HEVC scheme. The HEVC/H.265 (multi-view) 1545 is a functional block for performing multi-view encoding or multi-view decoding on image data in the HEVC scheme.

The MPEG-DASH 1551 is a functional block for transmitting and receiving image data in an MPEG-DASH scheme. The MPEG-DASH is technology for performing video streaming using an HTTP and has one feature that appropriate encoded data is selected from a plurality of pieces of encoded data in which prepared resolutions and the like are different from each other in units of segments and the selected encoded data is transmitted. The MPEG-DASH 1551 performs generation of a stream based on a standard, transmission control of the stream, and the like and uses the MPEG-2 video 1541 to the HEVC/H.265 (multi-view) 1545 described above for encoding and decoding of the image data.

The memory I/F 1517 is an I/F for the external memory 1312. Data supplied from the image processing engine 1514 or the codec engine 1516 is supplied to the external memory 1312 via the memory I/F 1517. In addition, data read from the external memory 1312 is supplied to the video processor 1332 (the image processing engine 1514 or the codec engine 1516) via the memory I/F 1517.

The multiplexing/inverse multiplexing section (MUX/DMUX) 1518 performs multiplexing or demultiplexing of various types of data related to an image such as an encoded data bitstream, image data, and a video signal. A method of this multiplexing/demultiplexing is optional. For example, at the time of multiplexing, the multiplexing/inverse multiplexing section (MUX/DMUX) 1518 can not only integrate a plurality of piece data into one piece, but also add predetermined header information or the like to the data. In addition, at the time of inverse multiplexing, the multiplexing/inverse multiplexing section (MUX/DMUX) 1518 can not only divide one piece of data into a plurality of pieces of data, but also add predetermined header information or the like to each data division. That is, the multiplexing/inverse multiplexing section (MUX/DMUX) 1518 can convert a format of data by the multiplexing/demultiplexing. The multiplexing/inverse multiplexing section (MUX/DMUX) 1518 can perform conversion into a transport stream, which is a bitstream of a transmission format, or data (file data) of a recording file format by multiplexing the bitstream. Of course, inverse conversion thereof by the demultiplexing is also possible.

The network I/F 1519, for example, is an I/F for the broadband modem 1333 or the connectivity 1321 (both in FIG. 30) or the like. The video I/F 1520, for example, is an I/F for the connectivity 1321 or the camera 1322 (both in FIG. 30) or the like.

Next, an example of an operation of this video processor 1332 will be described. For example, when a transport stream is received from the external network via the connectivity 1321 or the broadband modem 1333 (both in FIG. 30) or the like, the transport stream is supplied to the multiplexing/inverse multiplexing section (MUX/DMUX) 1518 via the network I/F 1519 and inversely multiplexed, and the transport stream is decoded by the codec engine 1516. For example, the image processing engine 1514 performs predetermined image processing on image data obtained by the decoding of the codec engine 1516, the display engine 1513 performs predetermined conversion on the processed image data, the converted image data, for example, is supplied to the connectivity 1321 (FIG. 30) or the like via the display I/F 1512, and its image is displayed on a monitor. In addition, for example, the codec engine 1516 re-encodes image data obtained by the decoding of the codec engine 1516, the multiplexing/inverse multiplexing section (MUX/DMUX) 1518 multiplexes the re-encoded image data to perform conversion into file data, the file data is output, for example, to the connectivity 1321 (FIG. 30) or the like, via the video I/F 1520, and the output file data is recorded to various types of recording media.

Further, for example, the file data of the encoded data in which image data is encoded read by the connectivity 1321 (FIG. 30) or the like from a recording medium (not illustrated) is supplied to the multiplexing/inverse multiplexing section (MUX/DMUX) 1518 via the video I/F 1520 and inversely multiplexed, and decoded by the codec engine 1516. The image processing engine 1514 performs predetermined image processing on image data obtained by the decoding of the codec engine 1516, the display engine 1513 performs predetermined conversion on the processed image data, the converted image data, for example, is supplied to the connectivity 1321 (FIG. 30) or the like via the display I/F 1512, and its image is displayed on a monitor. In addition, for example, the codec engine 1516 re-encodes image data obtained by the decoding of the codec engine 1516, the multiplexing/inverse multiplexing section (MUX/DMUX) 1518 multiplexes the re-encoded image data to perform conversion into a transport stream, the transport stream is supplied, for example, to the connectivity 1321 or the broadband modem 1333 (both in FIG. 30) or the like, via the network I/F 1519 and transmitted to another device (not illustrated).

Also, the exchange of image data between processing sections within the video processor 1332 or other data, for example, is performed using the internal memory 1515 or the external memory 1312. In addition, the power management module 1313, for example, controls power supply to the control section 1511.

When the present technology is applied to the video processor 1332 configured as described above, it is only necessary to apply the present technology according to each embodiment described above to the codec engine 1516. That is, for example, it is only necessary to configure the codec engine 1516 having functional blocks that achieve the image encoding device (FIG. 4) according to the first embodiment and the image decoding device (FIG. 14) according to the second embodiment. As described above, the video processor 1332 can obtain effects similar to those described above with reference to FIGS. 1 to 21.

Also, in the codec engine 1516, the present technology (that is, the functions of the image encoding device and the image decoding device according to the embodiments described above) may be implemented by hardware such as a logic circuit, implemented by software such as an embedded program, or implemented by both thereof.

Although two examples of the configuration of the video processor 1332 have been shown above, the configuration of the video processor 1332 is optional and may be different from the above-described two examples. In addition, although the video processor 1332 is configured as one semiconductor chip, the video processor 1332 may be configured as a plurality of semiconductor chips. For example, the video processor 1332 may be configured to be three-dimensional stacked LSI in which a plurality of semiconductors are stacked. In addition, the video processor 1332 may be configured to be implemented by a plurality of pieces of LSI.

[Application Example for Device]

The video set 1300 can be embedded in various types of devices for processing image data. For example, the video set 1300 can be embedded in the television device 900 (FIG. 23), the mobile phone 920 (FIG. 24), the recording/reproduction device 940 (FIG. 25), the image capturing device 960 (FIG. 26), or the like. By embedding the video set 1300, its device can obtain effects similar to those described above with reference to FIGS. 1 to 21.

In addition, the video set 1300, for example, can also be embedded in a terminal device such as the PC 1004, the AV device 1005, the tablet device 1006, or the mobile phone 1007 in the data transmission system 1000 of FIG. 27, the broadcasting station 1101 and the terminal device 1102 in the data transmission system 1100 of FIG. 28, the image capturing device 1201 and the scalable coded data storage device 1202 in the image capturing system 1200 of FIG. 29, and the like. By embedding the video set 1300, the device can obtain effects similar to those described above with reference to FIGS. 1 to 21. Further, the video set 1300 can be embedded in each device of the content reproduction system of FIG. 33 or the wireless communication system of FIG. 39.

Also, if part of each configuration of the above-described video set 1300 includes the video processor 1332, the part may be executed as a configuration to which the present technology is applied. For example, only the video processor 1332 can be executed as the video processor to which the present technology is applied. In addition, for example, the processor indicated by the dotted line 1341 as described above, the video module 1311, and the like can be executed as the processor, the module, or the like to which the present technology is applied. Further, for example, the video module 1311, the external memory 1312, the power management module 1313, and the front-end module 1314 can be combined and executed as a video unit 1361 to which the present technology is applied. Any configuration can obtain effects similar to those described above with reference to FIGS. 1 to 21.

That is, any configuration including the video processor 1332 can be embedded in various types of devices for processing image data as in the video set 1300. For example, the video processor 1332, the processor indicated by the dotted line 1341, the video module 1311, or the video unit 1361 can be embedded in the television device 900 (FIG. 23), the mobile phone 920 (FIG. 24), the recording/reproduction device 940 (FIG. 25), the image capturing device 960 (FIG. 26), the terminal device such as the PC 1004, the AV device 1005, the tablet device 1006, or the mobile phone 1007 in the data transmission system 1000 of FIG. 27, the broadcasting station 1101 and the terminal device 1102 in the data transmission system 1100 of FIG. 28, the image capturing device 1201 and the scalable coded data storage device 1202 in the image capturing system 1200 of FIG. 29, and the like. Further, the video processor 1332 can be embedded in each device of the content reproduction system of FIG. 33 or the wireless communication system of FIG. 39. By embedding any configuration to which the present technology is applied, its device can obtain effects similar to those described above with reference to FIGS. 1 to 21 as in the case of the video set 1300.

Also, the present technology is applicable, for example, to a content reproduction system of HTTP streaming or a wireless communication system of a Wi-Fi standard such as MPEG DASH to be described later for selecting and using appropriate encoded data from a plurality of pieces of encoded data in which prepared resolutions and the like are different from each other in units of segments.

8. Application Example of MPEG-DASH

[Outline of Content Reproduction System]

Figure 33:
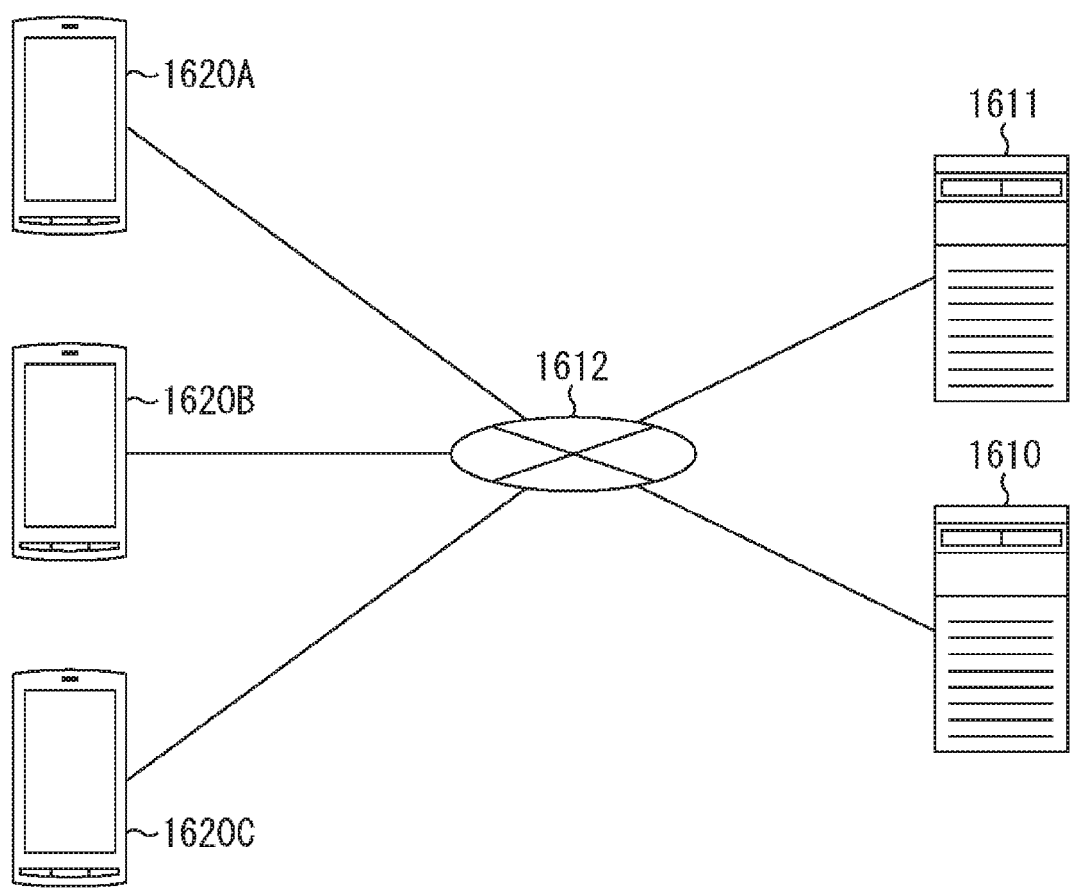
FIG. 33 is an explanatory diagram illustrating a configuration of a content reproduction system.
Figure 34:
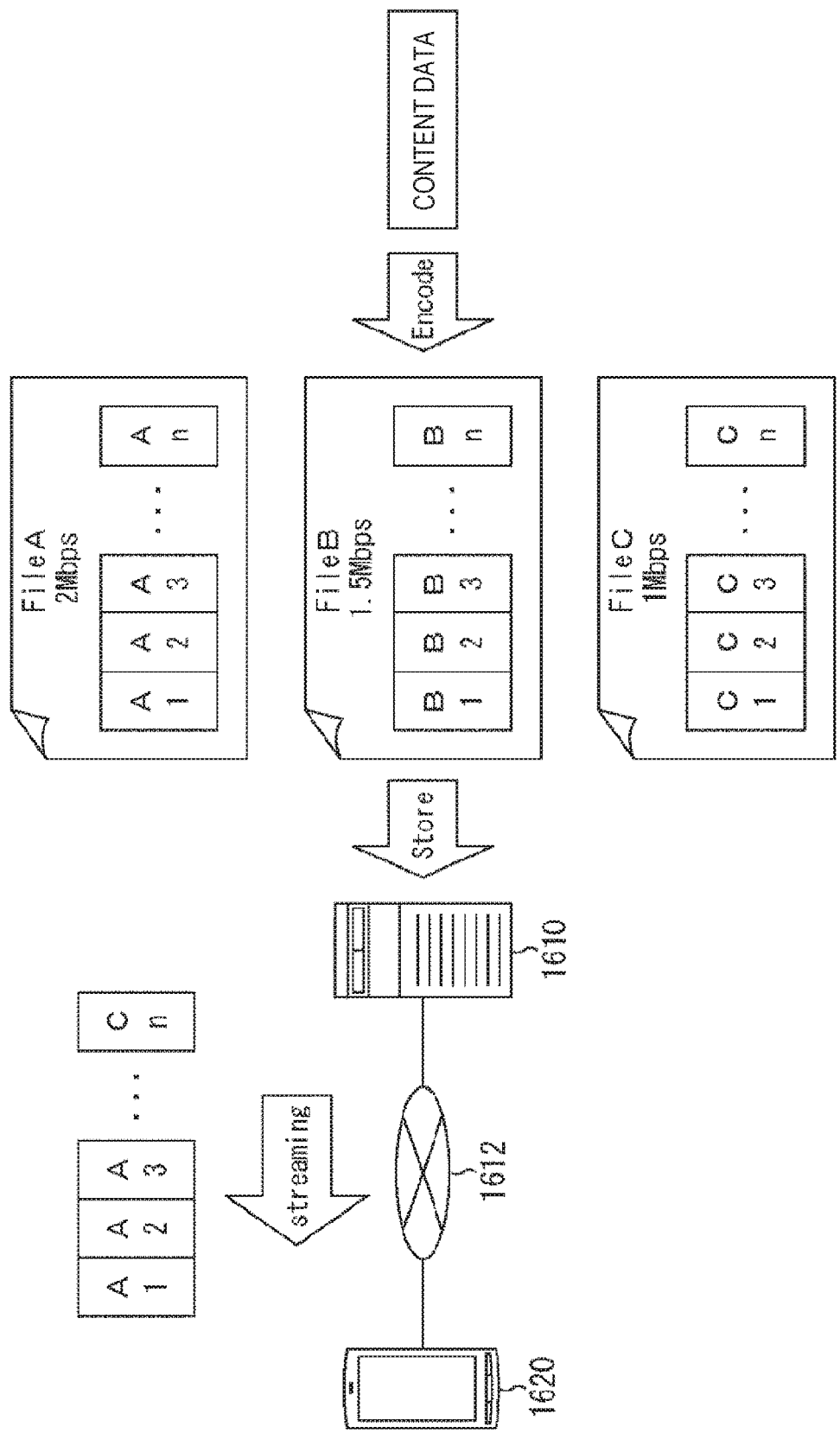
FIG. 34 is an explanatory diagram illustrating a flow of data in the content reproduction system.

First, with reference to FIGS. 33 to 35, the content reproduction system to which the present technology is applicable will be schematically described.

Hereinafter, first, a basic configuration common in these embodiments will be described with reference to FIGS. 33 and 34.

FIG. 33 is an explanatory diagram illustrating a configuration of a content reproduction system. As illustrated in FIG. 33, the content reproduction system includes content servers 1610 and 1611, a network 1612, and a content reproduction device 1620 (client device).

The content servers 1610 and 1611 and the content reproduction device 1620 are connected via the network 1612. The network 1612 is a wired or wireless transmission path of information to be transmitted from a device connected to the network 1612.

For example, the network 1612 may include public line networks such as the Internet, a telephone line network, and a satellite communication network or various types of local area networks (LANs), wide area networks (WANs), and the like including Ethernet (registered trademark). In addition, the network 1612 may include a dedicated line network such as an Internet protocol-virtual private network (IP-VPN).

The content server 1610 encodes content data and generates and stores a data file including the encoded data and meta information of the encoded data. Also, when the content server 1610 generates a data file of an MP4 format, the encoded data corresponds to "mdat" and the meta information corresponds to "moov."

In addition, the content data may music data such as music, lectures, and a radio programs, video data such as movies, television programs, video programs, photographs, documents, paintings, and charts, games, software, and the like.

Here, for a reproduction request of content from the content reproduction device 1620, the content server 1610 generates a plurality of data files at different bit rates in relation to the same content. In addition, for a reproduction request of content from the content reproduction device 1620, the content server 1611 transmits information of a uniform resource locator (URL) of the content server 1610 to the content reproduction device 1620 by including parameter information added to the URL in the content reproduction device 1620 in the URL information of the content server 1610. Hereinafter, with reference to FIG. 34, relevant items will be specifically described.

FIG. 34 is an explanatory diagram illustrating a flow of data in the content reproduction system of FIG. 33. The content server 1610 encodes the same content data at different bit rates and generates, for example, a file A of 2 Mbps, a file B of 1.5 Mbps, and a file C of 1 Mbps as illustrated in FIG. 34. Relatively, the file A has a high bit rate, the file B has a standard bit rate, and the file C has a low bit rate.

In addition, as illustrated in FIG. 34, encoded data of each file is divided into a plurality of segments. For example, the encoded data of the file A is divided into segments "A1," "A2," "A3," . . . "An," the encoded data of the file B is divided into segments "B1," "B2," "B3," . . . "Bn," and the encoded data of the file C is divided into segments "C1," "C2," "C3," . . . "Cn."

Also, each segment may include a configuration sample from one or more pieces of independently reproducible video encoded data and audio encoded data which begins with a sync sample of MP4 (for example, an instantaneous decoder refresh (IDR)-picture in video encoding of AVC/H.264). For example, when video data of 30 frames per sec is encoded in a GOP of a fixed length of 15 frames, each segment may be video and audio encoded data of 2 sec corresponding to 4 GOPs or video and audio encoded data of 10 sec corresponding to 20 GOPs.

In addition, reproduction ranges (ranges of time positions from the beginning of content) by segments having the same placement order in each file are the same. For example, when reproduction ranges of the segment "A2," the segment "B2," and the segment "C2" are the same and each segment is encoded data of 2 sec, all reproduction ranges of the segment "A2," the segment "B2," and the segment "C2" are 2 to 4 sec of content.

When the files A to C configured from the above-described plurality of segments are generated, the content server 1610 stores the files A to C. Then, as illustrated in FIG. 34, the content server 1610 sequentially transmits segments constituting different files to the content reproduction device 1620, and the content reproduction device 1620 reproduces the received segments according to streaming reproduction.

Here, the content server 1610 according to this embodiment transmits a play list file (hereinafter referred to as MPD) including bit rate information and access information of encoded data to the content reproduction device 1620, and the content reproduction device 1620 selects any one bit rate of a plurality of bit rates based on the MPD and requests the content server 1610 to transmit segments corresponding to the selected bit rate.

Although only one content server 161 is illustrated in FIG. 33, it is needless to say that the present disclosure is not limited to the relevant example.

FIG. 35 is an explanatory diagram illustrating a specific example of the MPD. As illustrated in FIG. 35, the MPD includes access information related to a plurality of pieces of encoded having different bit rates (bandwidths). For example, the MPD illustrated in FIG. 35 indicates that there are encoded data of 256 Kbps, 1.024 Mbps, 1.384 Mbps, 1.536 Mbps, and 2.048 Mbps, and includes access information related to encoded data. The content reproduction device 1620 can dynamically change the bit rate of encoded data to be reproduced according to streaming reproduction based on this MPD.

Also, although a portable terminal is illustrated as an example of the content reproduction device 1620 in FIG. 33, the content reproduction device 1620 is not limited to this example. For example, the content reproduction device 1620 may be an information processing device such as a PC, a home video processing device (a digital versatile disc (DVD) recorder, a video cassette recorder, or the like), personal digital assistants (PDA), a home game device, or a home appliance device. In addition, the content reproduction device 1620 may be an information processing device such as a mobile phone, a personal handy-phone system (PHS), a portable music reproduction device, a portable video processing device, or a portable game device.

[Configuration of Content Server 1610]

With reference to FIGS. 33 to 35, the outline of the content reproduction system has been described. Next, with reference to FIG. 36, the configuration of the content server 1610 will be described.

FIG. 36 is a functional block diagram illustrating the configuration of the content server 1610. As illustrated in FIG. 36, the content server 1610 includes a file generation section 1631, a storage section 1632, and a communication section 1633.

The file generation section 1631 includes an encoder 1641 for encoding content data, and generates a plurality of pieces of encoded having different bit rates in the same content and the above-described MPD. For example, the file generation section 1631 generates the MPD as illustrated in FIG. 35 when encoded data of 256 Kbps, 1.024 Mbps, 1.384 Mbps, 1.536 Mbps, and 2.048 Mbps is generated.

The storage section 1632 stores a plurality of pieces of encoded data having different bit rates and the MPD generated by the file generation section 1631. The storage section 1632 may be a storage medium such as a non-volatile memory, a magnetic disk, an optical disk, an magneto optical (MO) disk, or the like. As the non-volatile memory, for example, an electrically erasable programmable read-only memory (EEPROM) and an erasable programmable ROM (EPROM) may be cited. Also, as the magnetic disk, a hard disk, a discoid magnetic disk, and the like may be cited. Further, as the optical disk, a compact disc (CD), a DVD-recordable (DVD-R), a Blu-ray disc (BD) (registered trademark)), and the like may be cited.

The communication section 1633 is an I/F with the content reproduction device 1620, and communicates with the content reproduction device 1620 via the network 1612. In further detail, the communication section 1633 has a function serving as an HTTP server which communicates with the content reproduction device 1620 according to an HTTP. For example, the communication section 1633 transmits an MPD to the content reproduction device 1620, extracts encoded data requested based on the MPD from the content reproduction device 1620 according to the HTTP, and transmits the encoded data to the content reproduction device 1620 as an HTTP response.

[Configuration of Content Reproduction Device 1620]

The configuration of the content server 1610 according to this embodiment has been described above. Next, with reference to FIG. 37, the configuration of the content reproduction device 1620 will be described.

Figure 37:
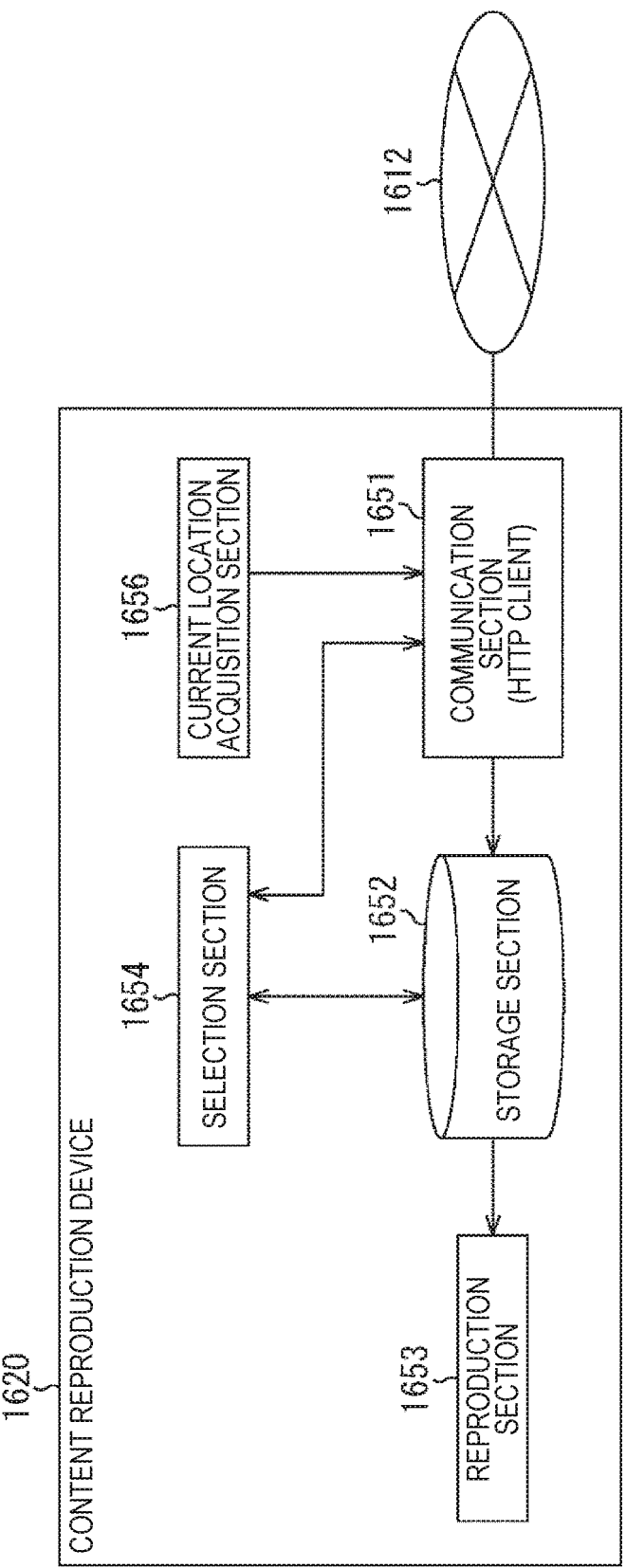
FIG. 37 is a functional block diagram illustrating a configuration of a content reproduction device of the content reproduction system.

FIG. 37 is a functional block diagram illustrating the configuration of the content reproduction device 1620. As illustrated in FIG. 37, the content reproduction device 1620 includes a communication section 1651, a storage section 1652, a reproduction section 1653, a selection section 1654, and a current location acquisition section 1656.

The communication section 1651 is an I/F with the content server 1610, requests the content server 1610 to provide data, and acquires data from the content server 1610. In further detail, the communication section 1651 has a function serving as an HTTP client for communicating with the content reproduction device 1620 according to the HTTP. For example, the communication section 1651 can selectively acquire an MPD or segments of encoded data from the content server 1610 by employing an HTTP range.

The storage section 1652 stores various types of information related to reproduction of content. For example, the storage section 1652 sequentially buffers segments acquired by the communication section 1651 from the content server 1610. The segments of the encoded data buffered in the storage section 1652 are sequentially supplied to the reproduction section 1653 in first in first output (FIFO).

In addition, the storage section 1652 stores a definition for accessing a URL to which the communication section 1651 adds a parameter based on an addition instruction of the parameter for the URL of the content described in the MPD requested from the content sever 1611 to be described later.

The reproduction section 1653 sequentially reproduces segments supplied from the storage section 1652. Specifically, the reproduction section 1653 performs decoding, D/A conversion, and rendering on the segments.

The selection section 1654 sequentially selects whether to sequentially acquire segments of the encoded data corresponding to a bit rate included in the MPD to be acquired within the same content. For example, when the selection section 1654 sequentially selects segments "A1," "B2," and "A3" according to a band of the network 1612, the communication section 1651 sequentially acquires the segments "A1," "B2," and "A3" from the content server 1610 as illustrated in FIG. 34.

The current location acquisition section 1656 may be a section for acquiring a current location of the content reproduction device 1620, and, for example, may be constituted of a module for acquiring a current location of a global positioning system (GPS) receiver or the like. In addition, the current location acquisition section 1656 may be a section for acquiring a current location of the content reproduction device 1620 using a wireless network.

[Configuration of Content Server 1611]

Figure 38:
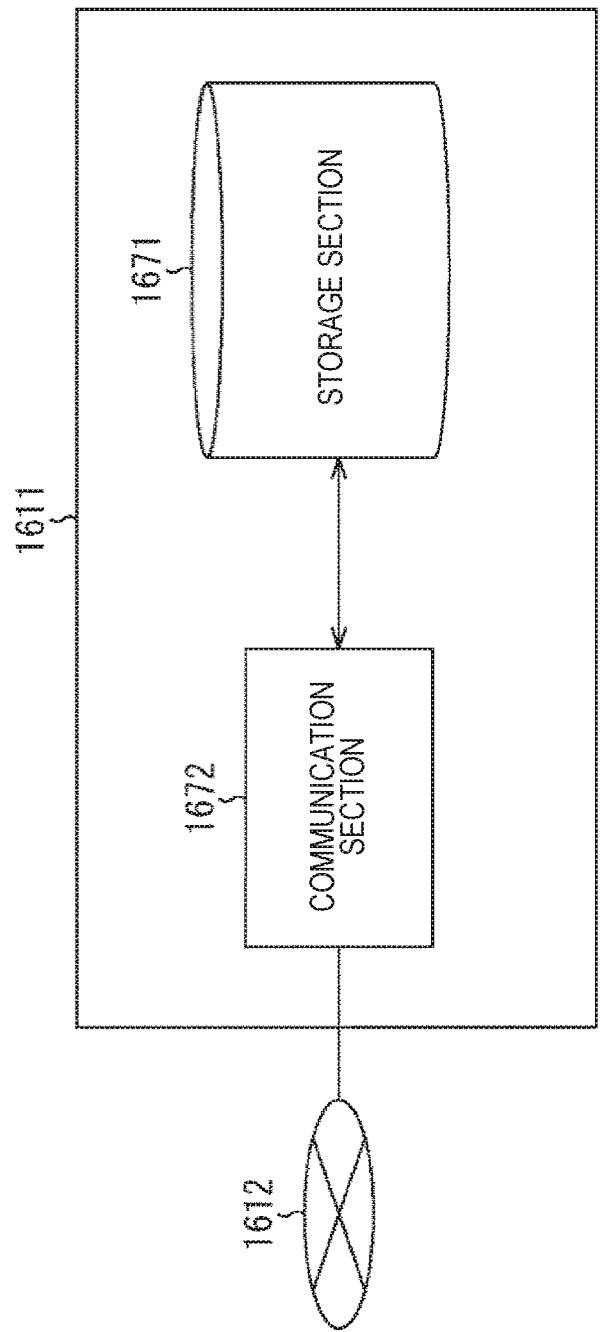
FIG. 38 is a functional block diagram illustrating the configuration of the content server of the content reproduction system.

FIG. 38 is an explanatory diagram illustrating a configuration example of the content server 1611. As illustrated in FIG. 38, the content server 1611 includes a storage section 1671 and a communication section 1672.

The storage section 1671 stores information of a URL of an MPD. The information of the URL of the MPD is transmitted from the content server 1611 to the content reproduction device 1620 according to a request from the content reproduction device 1620 for requesting reproduction of content. In addition, when the information of the URL of the MPD for the content reproduction device 1620 is provided, the storage section 1671 stores definition information when the content reproduction device 1620 adds a parameter to the URL written in the MPD.

The communication section 1672 is an I/F with the content reproduction device 1620, and communicates with the content reproduction device 1620 via the network 1612. That is, the communication section 1672 receives a request of information of a URL of the MPD from the content reproduction device 1620 for requesting the reproduction of the content and transmits the information of the URL of the MPD to the content reproduction device 1620. The URL of the MPD to be transmitted from the communication section 1672 includes information for adding a parameter in the content reproduction device 1620.

For the parameter to be added to the URL of the MPD in the content reproduction device 1620, it is possible to set various parameters in definition information to be shared by the content server 1611 and the content reproduction device 1620. For example, information of a current location of the content reproduction device 1620, a user ID of a user using the content reproduction device 1620, a memory size of the content reproduction device 1620, a capacity of a storage of the content reproduction device 1620, and the like can be added to the URL of the MPD in the content reproduction device 1620.

In the content reproduction system of the above-described configuration, it is possible to obtain effects similar to those described above with reference to FIGS. 1 to 21 by applying the present technology as described above with reference to FIGS. 1 to 21.

That is, the encoder 1641 of the content server 1610 has a function of the image encoding device (FIG. 4) according to the above-described embodiment. In addition, the reproduction section 1653 of the content reproduction device 1620 has a function of the image decoding device (FIG. 14) according to the above-described embodiment. Thereby, it is possible to improve the encoding efficiency of encoding or decoding of an MV in a multi-view image.

In addition, because it is possible to limit the V direction of the inter-view MV by transmitting and receiving encoded data according to the present technology in the content reproduction system, it is possible to improve the encoding efficiency of encoding or decoding of an MV in a multi-view image.

9. Application Example of Wireless Communication System of Wi-Fi Standard

[Basic Operation Example of Wireless Communication Device]

A basic operation example of a wireless communication device in the wireless communication system to which the present technology is applicable will be described.

Initially, radio packet transmission and reception until a specific application is operated by setting up a peer to peer (P2P) connection are done.

Next, before a connection in a second layer is made, radio packet transmission and reception until the P2P connection is set up and the specific application is operated after the specific application is designated are done. Thereafter, after the connection in the second layer, radio packet transmission and reception when the specific application is activated are done.

[Communication Example when Specific Application Operation Starts]

Figure 39:
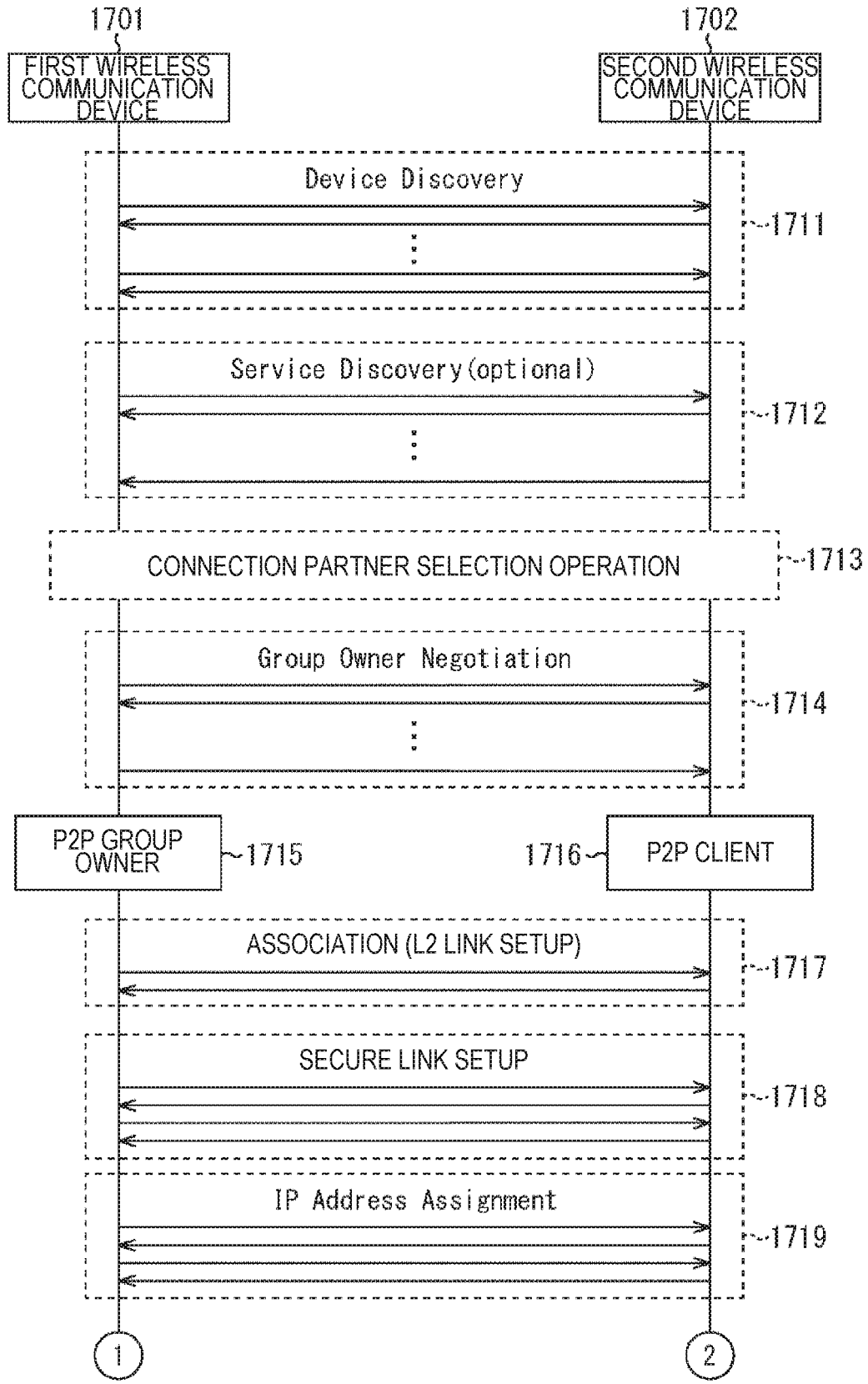
FIG. 39 is a sequence chart illustrating a communication process example by each device of a wireless communication system.
Figure 40:
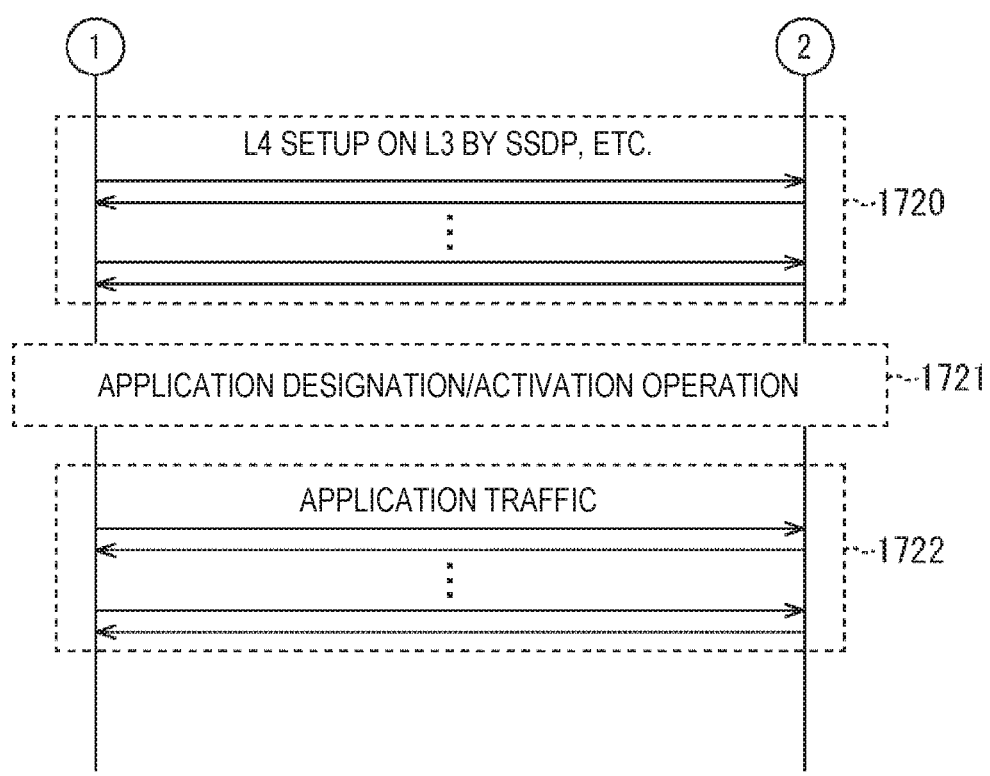
FIG. 40 is a sequence chart illustrating a communication process example by each device of a wireless communication system.

FIGS. 39 and 40 are examples of radio packet transmission and reception until a specific application is operated by setting up the above-described P2P connection and are sequence charts illustrating a communication processing example by each device based on wireless communication. Specifically, an example of a setup procedure of a direct connection leading to a connection in a Wi-Fi direct standard (also referred to as Wi-Fi P2P) standardized in Wi-Fi alliance is shown.

Here, in the Wi-Fi direct, a plurality of wireless communication devices detects the existence of one another (device discovery and service discovery). Then, a direct connection is set up by performing device authentication in Wi-Fi protected setup (WPS) with a selected device when connection device selection is performed. In addition, in the Wi-Fi direct, a communication group is formed by determining a role of each of the plurality of wireless communication devices as a parent device (group owner) or a child device (client).

However, in this communication process example, some packet transmission and reception are omitted. For example, at the time of an initial connection, as described above, packet exchange for using the WPS is necessary, and packet exchange is necessary even in exchange of Authentication Request/Response or the like. However, in FIGS. 39 and 40, the illustration of these packet exchanges is omitted and only a connection from the second time is shown.

Also, although a communication process example between a first wireless communication device 1701 and a second wireless communication device 1702 is illustrated in FIGS. 39 and 40, the same is true for communication processes with other wireless communication devices.

Initially, the device discovery is performed between the first wireless communication device 1701 and the second wireless communication device 1702 (1711). For example, the first wireless communication device 1701 transmits a probe request (response request signal), and receives a probe response (response signal) for the probe request from the second wireless communication device 1702. Thereby, the first wireless communication device 1701 and the second wireless communication device 1702 can discover the location of each other. In addition, it is possible to acquire a device name or type (TV, PC, smartphone, or the like) of a partner by the device discovery.

Subsequently, the service discovery is performed between the first wireless communication device 1701 and the second wireless communication device 1702 (1712). For example, the first wireless communication device 1701 transmits a service discovery query for querying a service corresponding to the second wireless communication device 1702 discovered in the device discovery. Then, the first wireless communication device 1701 acquires the service corresponding to the second wireless communication device 1702 by receiving a service discovery response from the second wireless communication device 1702. That is, it is possible to acquire a partner-executable service or the like by the service discovery. The partner-executable service, for example, is a service, a protocol (digital living network alliance (DLNA)), a digital media renderer (DMR), or the like.

Subsequently, the user performs an operation (connection partner selection operation) of selecting a connection partner (1713). This connection partner selection operation occurs in only any one of the first wireless communication device 1701 and the second wireless communication device 1702. For example, a connection partner selection picture is displayed on the display section of the first wireless communication device 1701, and the second wireless communication device 1702 is selected as the connection partner in the connection partner selection picture according to the user operation.

When the user performs the connection partner selection operation (1713), group owner negotiation is performed between the first wireless communication device 1701 and the second wireless communication device 1702 (1714). In FIGS. 39 and 40, an example in which the first wireless communication device 1701 becomes a group owner 1715 and the second wireless communication device 1702 becomes a client 1716 according to a result of the group owner negotiation is illustrated.

Subsequently, processes 1717 to 1720 are performed between the first wireless communication device 1701 and the second wireless communication device 1702, so that a direct connection is set up. That is, association (L2 (second layer) link setup) 1717 and secure link setup 1718 are sequentially performed. In addition, IP address assignment 1719 and L4 setup 1720 on L3 by a simple service discovery protocol (SSD) or the like are sequentially performed. Also, L2 (layer 2) refers to a second layer (data link layer), L3 (layer 3) refers to a third layer (network layer), and L4 (layer 4) refers to a fourth layer (transport layer).

Subsequently, the user performs a designation or activation operation on a specific application and an activation operation (application designation/activation operation) (1721). This application designation/activation operation occurs in only any one of the first wireless communication device 1701 and the second wireless communication device 1702. For example, an application designation/activation operation picture is displayed on the display section of the first wireless communication device 1701, and the specific application is selected by the user operation in this application designation/activation operation picture.

When the user performs the application designation/activation operation (1721), the specific application corresponding to this application designation/activation operation is executed between the first wireless communication device 1701 and the second wireless communication device 1702 (1722).

Here, the case in which a connection between an access point (AP) and a station (STA) is set up within a range of specs (specs standardized in IEEE 802.11) before the Wi-Fi direct standard is assumed. In this case, before a connection is made in the second layer (before association in the terminology of IEEE 802.11), it is difficult to know what device is connected in advance.

On the other hand, as illustrated in FIGS. 39 and 40, in the Wi-Fi direct, it is possible to acquire information of a connection partner when a connection candidate partner is found in the device discovery or service discovery (option). The information of the connection partner, for example, is a basic type of device, a corresponding specific application, or the like. Then, it is possible to allow the user to select a connection partner based on the acquired information of the connection partner.

By extending this mechanism, a wireless communication system for designating a specific application before a connection is set up in the second layer, selecting a connection partner, and automatically activating a specific application after the selection can also be implemented. An example of a sequence leading to the connection of this case is illustrated in FIG. 42. In addition, a configuration example of a format of a frame to be transmitted and received in this communication process is illustrated in FIG. 41.

[Configuration Example of Frame Format]

Figure 41:
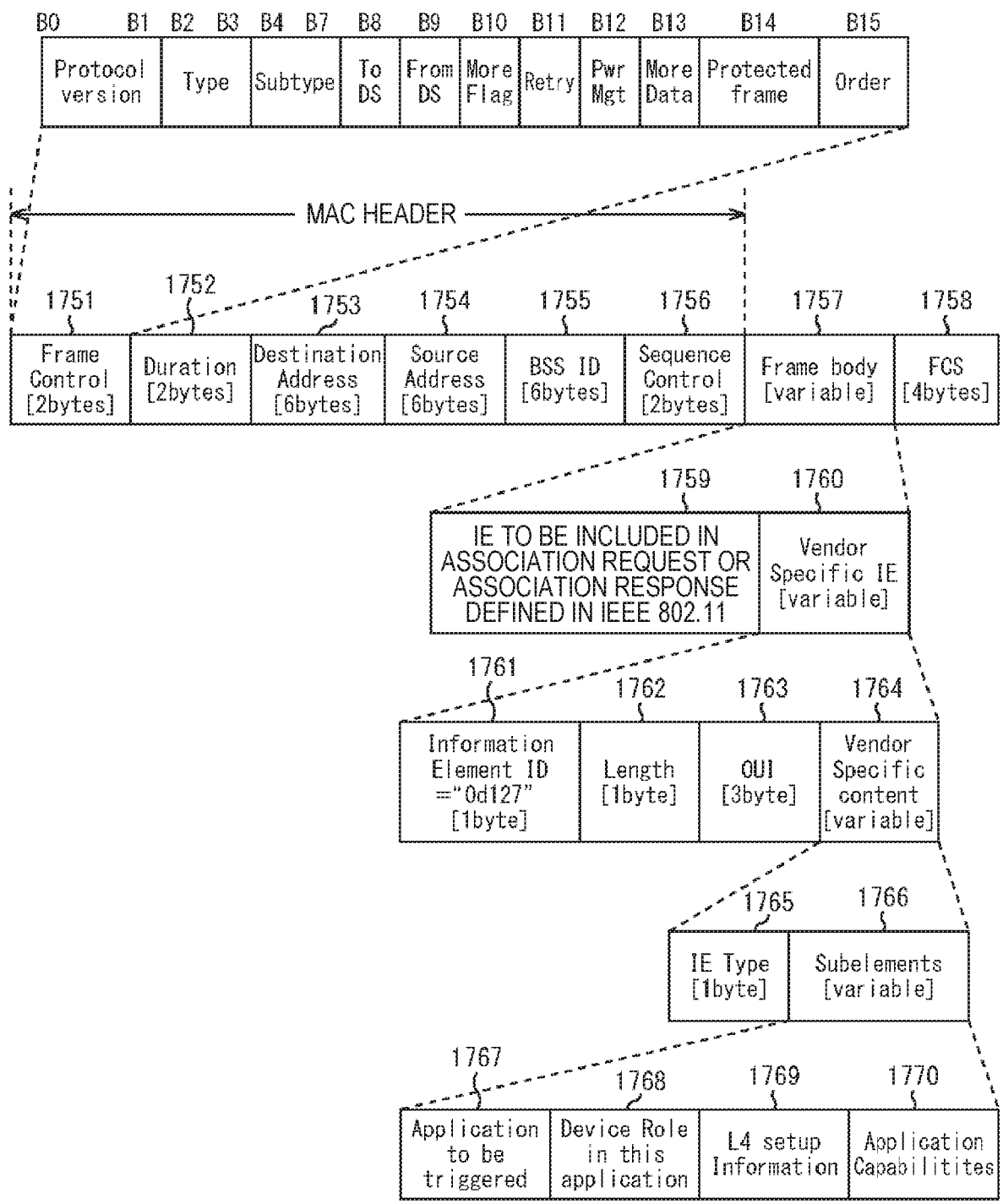
FIG. 41 is a diagram schematically illustrating a configuration example of a frame format to be transmitted and received in a communication process by each device of the wireless communication system.
Figure 42:
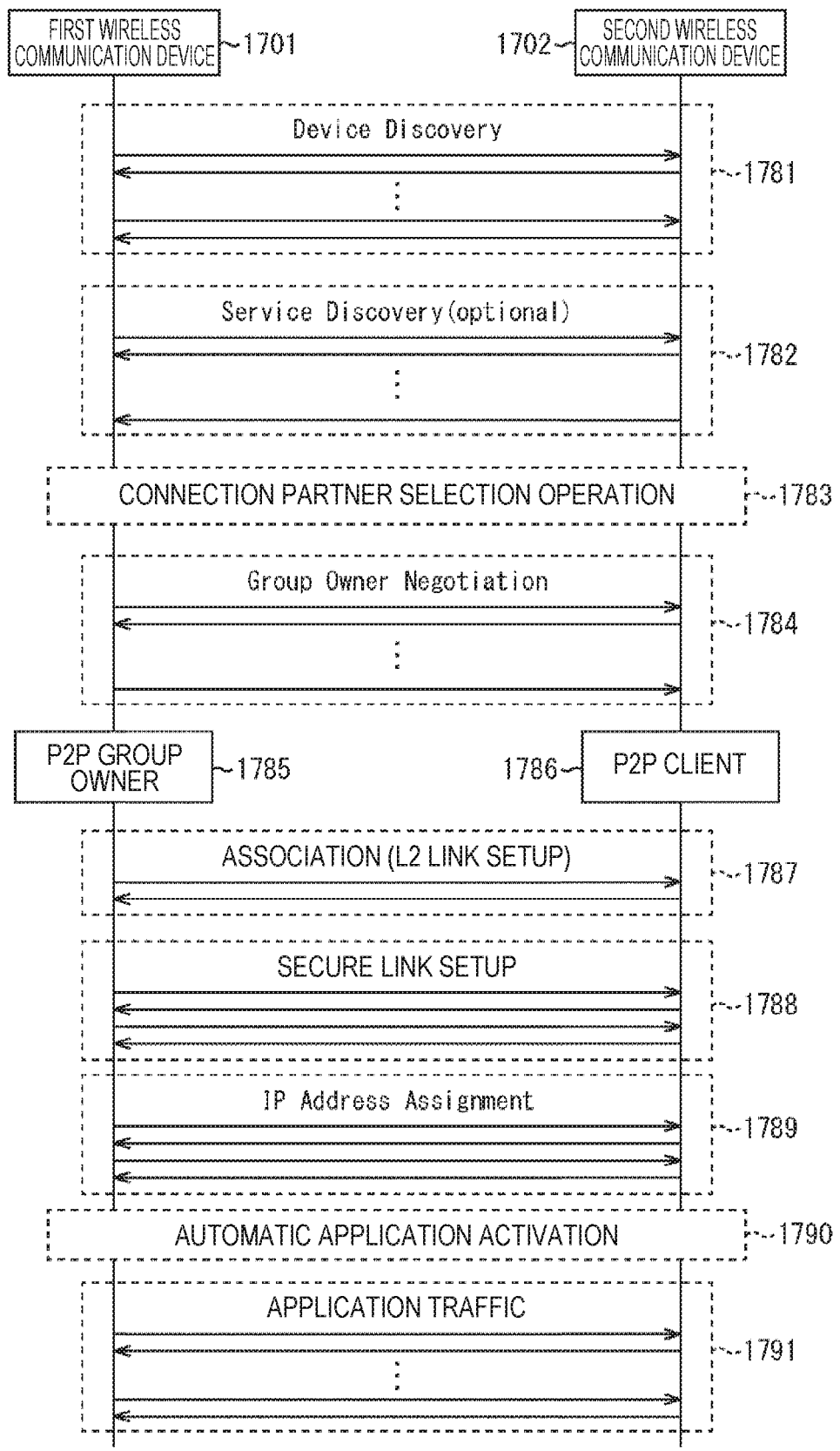
FIG. 42 is a sequence chart illustrating a communication process example by each device of the wireless communication system.

FIG. 41 is a diagram schematically illustrating a configuration example of a format of a frame to be transmitted and received in a communication process by each device used as the basis of the present technology. That is, in FIG. 41, a configuration example of a medium access control (MAC) frame for setting up the connection in the second layer is illustrated. Specifically, this is an example of a frame format of an association request/response 1787 for implementing the sequence illustrated in FIG. 42.

Also, fields from frame control 1751 to sequence control 1756 are a MAC header. In addition, when an association request is transmitted, B3B2="0b00" and B7B6B5B4="0b0000" are set in the frame control 1751. In addition, when an association response is encapsulated, B3B2="0b00" and B7B6B5B4="0b0001" are set in the frame control 1751. Also, "0b00" represents "00" in the binary notation, "0b0000" represents "0000" in the binary notation, and "0b0001" represents "0001" in the binary notation.

Here, the MAC frame illustrated in FIG. 41 is basically an association request/response frame format written in Sections 7.2.3.4 and 7.2.3.5 of IEEE 802.11-2007 specification document. However, the format is different in that an independently extended IE as well as an information element (hereinafter abbreviated as an IE) is included.

In addition, in order to indicate that there is a vendor specific IE 1760, 127 is set in decimal in an IE type 1761. In this case, according to Section 7.3.2.26 of the IEEE 802.11-2007 specification document, a length field 1762 and an organizationally unique identifier (OUI) field 1763 continue, and then vendor specific content 1764 is arranged As the content of the vendor specific content 1764, a field (IE type 1765) indicating a type of vendor specific IE is first provided. Then, thereafter, a plurality of subelements 1766 is configured to be stored.

As the content of the sub-element 1766, a name 1767 of a specific application to be used or a device role 1768 when the specific application operates is considered to be included. In addition, the specific application, information (information for L4 setup) 1769 such as a port number to be used for control, and information (capability information) related to capability is considered to be included. Here, for example, when a designated specific application is DLNA, the capability information is information for specifying correspondence to audio transmission/reproduction, correspondence to video transmission/reproduction, and the like.

In the wireless communication system of the above-described configuration, it is possible to obtain an advantageous effect similar to that described above with reference to FIGS. 1 to 21 by applying the present technology described above with reference to FIGS. 1 to 21. That is, it is possible to improve the encoding efficiency of encoding or decoding of an MV in a multi-view image. In addition, in the above-described wireless communication system, it is possible to improve the encoding efficiency of encoding or decoding of an MV in a multi-view image by transmitting and receiving data encoded by the present technology.

Also, in the present description, an example in which various types of information such as parameters of a deblocking filter or parameters of an adaptive offset filter is multiplexed in an encoded stream and transmitted from the encoding side to the decoding side has been described. However, a technique of transmitting the information is not limited to this example. For example, the information may be transmitted or recorded as individual data associated with an encoded bitstream without being multiplexed in the encoded stream. Here, the term "associate" refers to that an image included in the bitstream (which may be part of an image such a slice or a block) and information corresponding to the image is configured to be linked at the time of decoding. That is, the information may be transmitted on a separate transmission path from an image (or bitstream). In addition, the information may be recorded on a separate recording medium (or a separate recording area of the same recording medium) from the image (or bitstream). Further, the information and the image (or the bitstream), for example, may be associated with each other in an arbitrary unit such as a plurality of frames, one frame, or a portion within the frame.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image processing device including:

a predicted vector generation section configured to generate a predicted vector for use in encoding of a motion vector (MV) of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block;

an MV encoding section configured to encode the MV of the current block using the predicted vector generated by the predicted vector generation section; and an encoding section configured to generate an encoded stream by encoding the image in units having a hierarchical structure.

(2)

The image processing device according to (1), wherein the predicted vector generation section generates the predicted vector by scaling the MV of the reference block according to a reference image picture order count (POC) of the current block and a reference image POC of the reference block and employing the scaled MV as a candidate for the predicted vector.

(3)

The image processing device according to (1) or (2), further including:

a transmission section configured to transmit the MV of the current block encoded by the MV encoding section and the encoded stream generated by the encoding section.

(4)

An image processing method including:

generating, by an image processing device, a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block;

encoding, by the image processing device, the MV of the current block using the generated predicted vector; and generating, by the image processing device, an encoded stream by encoding the image in units having a hierarchical structure.

(5)

An image processing device including:

a predicted vector generation section configured to generate a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block;

an MV decoding section configured to decode the MV of the current block using the predicted vector generated by the predicted vector generation section; and a decoding section configured to generate an image by decoding an encoded stream encoded in units having a hierarchical structure.

(6)

The image processing device according to (5), wherein the predicted vector generation section generates the predicted vector by scaling the MV of the reference block according to a reference image POC of the current block and a reference image POC of the reference block and employing the scaled MV as a candidate for the predicted vector.

(7)

The image processing device according to (5) or (6), further including:

a reception section configured to receive the encoded stream and the encoded MV of the current block.

(8)

An image processing method including:

generating, by an image processing device, a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block;

decoding, by the image processing device, the MV of the current block using the generated predicted vector; and generating, by the image processing device, an image by decoding an encoded stream encoded in units having a hierarchical structure.

REFERENCE SIGNS LIST

11-1, 11-N, 11-M encoder
26 lossless encoding section
32-1, 32-N, 32-M DPB
34 motion prediction/compensation section
36-1, 36-N, 36-M MV memory
51 motion prediction mode generation section
52 automatic reference index generation section
53 AMVP mode vector prediction section
54 M/S mode vector prediction section
55 mode determination section
61 vector search section
62 predicted image generation section
63 vector cost determination section
64 spatial MV memory
65, 66 predicted vector generation section
67 switch
68 subtraction section
69 POC transform section
81 predicted vector index generation section
82 intra-view reference vector generation section
83 inter-view reference vector generation section
211-1, 211-N, 211-M decoder
222 lossless decoding section
233-1, 233-N, 233-M DPB
231 motion compensation section
229-1, 229-N, 229-M MV memory
251 automatic reference index generation section
252 AMVP mode vector prediction section
253 M/S mode vector prediction section
261 predicted image generation section
262 spatial MV memory
263 addition section
264, 265 predicted vector generation section
266 switch
267 POC transform section
281 intra-view reference vector generation section
282 inter-view reference vector generation section

The invention claimed is:

1. An image processing device comprising:
   circuitry configured to
   generate a predicted vector for use in encoding of a motion vector (MV) of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, wherein the predicted vector is generated by employing the scaled MV as a candidate for the predicted vector when a reference image picture order count (POC) of the current block is different from a reference POC of the reference block in a different view;
   encode the MV of the current block using the predicted vector; and
   generate an encoded stream by encoding the image in units having a hierarchical structure,
   wherein the hierarchical structure comprises scalable coded data comprising a base layer and an enhancement layer, and wherein, the MV of the reference block is scaled according to a distance between the reference image POC of the current block and the reference image POC of the reference block.

2. The image processing device according to claim 1, wherein the circuitry is further configured to transmit the MV of the current block encoded by the MV encoding section and the encoded stream generated by the encoding section.

3. An image processing method comprising:
generating, by an image processing device, a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, wherein the predicted vector is generated by employing the scaled MV as a candidate for the predicted vector when the reference image POC of the current block is different from the reference POC of the reference block in a different view;
encoding, by the image processing device, the MV of the current block using the generated predicted vector; and
generating, by the image processing device, an encoded stream by encoding the image in units having a hierarchical structure,
wherein the hierarchical structure comprises scalable coded data comprising a base layer and an enhancement layer, and
wherein, the MV of the reference block is scaled according to a distance between the reference image POC of the current block and the reference image POC of the reference block.

4. An image processing device comprising:
circuitry configured to
generate a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, wherein the predicted vector is generated by employing the scaled MV as a candidate for the predicted vector when the reference image POC of the current block is different from the reference POC of the reference block in a different view;
decode the MV of the current block using the predicted vector; and
generate an image by decoding an encoded stream encoded in units having a hierarchical structure,
wherein the hierarchical structure comprises scalable coded data comprising a base layer and an enhancement layer, and
wherein, the MV of the reference block is scaled according to a distance between the reference image POC of the current block and the reference image POC of the reference block.

5. The image processing device according to claim 4, wherein the circuitry is further configured to receive the encoded stream and the encoded MV of the current block.

6. An image processing method comprising:
generating, by an image processing device, a predicted vector for use in encoding of an MV of a current block by scaling the MV of a reference block, which is a block of a position shifted from a position of the current block in an image of a different view, by a disparity obtained from a periphery of the current block in an image of a non-base view according to a reference destination of the current block and a reference destination of the reference block, wherein the predicted vector is generated by employing the scaled MV as a candidate for the predicted vector when the reference image POC of the current block is different from the reference POC of the reference block in a different view;
decoding, by the image processing device, the MV of the current block using the generated predicted vector; and
generating, by the image processing device, an image by decoding an encoded stream encoded in units having a hierarchical structure,
wherein the hierarchical structure comprises scalable coded data comprising a base layer and an enhancement layer, and
wherein, the MV of the reference block is scaled according to a distance between the reference image POC of the current block and the reference image POC of the reference block.

7. The image processing device according to claim 1, wherein the circuitry is further configured to
generate a motion prediction mode;
determine whether the motion prediction mode is an inter prediction mode; and
when it is determined that the motion prediction mode is the inter prediction mode, perform a vector search using a reference image index.

8. The image processing device according to claim 7, wherein the circuitry is further configured to
when it is determined that the motion prediction mode is not the inter prediction mode, automatically generate a reference image.

9. The image processing device according to claim 7, wherein the circuitry is further configured to
when it is determined that the motion prediction mode is a merge mode or a skip mode, perform vector prediction of the merge mode or the skip mode.

10. The image processing device according to claim 7, wherein the circuitry is further configured to
transform the reference image index into a POC.

11. The image processing device according to claim 1, wherein the circuitry is further configured to
determine a prediction mode having a lowest encoding cost as an optimum prediction mode, wherein the prediction mode is one of an inter prediction mode and an inter-view prediction mode; and
select encoding mode information of the optimum prediction mode.

12. The image processing device according to claim 1, wherein the circuitry is further configured to
generate a non-spatially predicted vector;
compute residuals of the predicted vector and the non-spatially predicted vector;
select either the predicted vector or the non-spatially predicted based vector having a lowest encoding cost, wherein the encoding cost is determined using the residuals; and encode vector information of the selected one of the predicted vector and the non-spatially predicted vector having the lowest encoding cost.

\* \* \* \* \*